United States Patent
Bergheim et al.

(10) Patent No.: US 12,551,322 B2
(45) Date of Patent: Feb. 17, 2026

(54) APPARATUS AND METHODS FOR CLEANING TEETH

(71) Applicant: SONENDO, INC., Laguna Hills, CA (US)

(72) Inventors: Bjarne Bergheim, Mission Viejo, CA (US); Mehrzad Khakpour, Laguna Beach, CA (US)

(73) Assignee: SONENDO, INC., Laguna Hills, CA (US)

( * ) Notice: Subject to any disclaimer, the term of this patent is extended or adjusted under 35 U.S.C. 154(b) by 0 days.

(21) Appl. No.: 17/454,725

(22) Filed: Nov. 12, 2021

(65) Prior Publication Data

US 2022/0313405 A1    Oct. 6, 2022

Related U.S. Application Data

(63) Continuation of application No. 14/386,558, filed as application No. PCT/US2013/032635 on Mar. 15, 2013, now Pat. No. 11,173,019.
(Continued)

(51) Int. Cl.
*A61C 17/02* (2006.01)
*A61C 17/00* (2006.01)
(Continued)

(52) U.S. Cl.
CPC ........ *A61C 17/0202* (2013.01); *A61C 17/005* (2013.01); *A61C 17/0208* (2013.01); *A61C 17/028* (2013.01); *A61C 17/20* (2013.01)

(58) Field of Classification Search
CPC .............. A61C 17/0202; A61C 17/005; A61C 17/0208; A61C 17/028; A61C 17/20; A61C 17/02; A61C 17/00; A61C 17/16
(Continued)

(56) References Cited

U.S. PATENT DOCUMENTS

| 1,500,107 A | 7/1924 | Chandler |
|---|---|---|
| 2,108,558 A | 2/1938 | Jackman |
| (Continued) | | |

FOREIGN PATENT DOCUMENTS

| CA | 2031739 | 6/1991 |
|---|---|---|
| CA | 2771397 | 2/2011 |
| (Continued) | | |

OTHER PUBLICATIONS

ADA American Dental Association, "Glossary of Dental Clinical and Administrative Terms,"http://www.ada.org/en/publications/cdt/glossary-of-dental-clinical-and-administrative-ter, downloaded May 4, 2017, in 46 pages.
(Continued)

*Primary Examiner* — Eric J Rosen
*Assistant Examiner* — Mirayda A Aponte
(74) *Attorney, Agent, or Firm* — Knobbe Martens Olson and Bear LLP

(57) ABSTRACT

Various embodiments for cleaning carious regions of a tooth are disclosed herein. For example, a dental apparatus can include a fluid platform having a chamber sized and shaped to retain fluid. The chamber can be configured to be coupled to the tooth over the carious region. A pressure wave generator having a distal end may be configured to be positioned in the chamber. The pressure wave generator may be configured to generate pressure waves in the retained fluid sufficient to clean the carious region.

19 Claims, 14 Drawing Sheets

Related U.S. Application Data

(60) Provisional application No. 61/614,463, filed on Mar. 22, 2012.

(51) Int. Cl.
    *A61C 17/028*      (2006.01)
    *A61C 17/20*      (2006.01)

(58) Field of Classification Search
    USPC .................................................. 433/50, 80
    See application file for complete search history.

(56) References Cited

U.S. PATENT DOCUMENTS

| | | | |
|---|---|---|---|
| 3,023,306 | A | 2/1962 | Kester |
| 3,225,759 | A | 12/1965 | Drapen et al. |
| 3,401,690 | A | 9/1968 | Martin |
| 3,460,255 | A | 8/1969 | Hutson |
| 3,514,328 | A | 5/1970 | Malin |
| 3,521,359 | A | 7/1970 | Harris |
| 3,522,801 | A | 8/1970 | Seymour |
| 3,547,110 | A | 12/1970 | Balamuth |
| 3,561,433 | A | 2/1971 | Kovach |
| 3,590,813 | A | 7/1971 | Roszyk |
| 3,593,423 | A | 7/1971 | Jones et al. |
| 3,624,907 | A | 12/1971 | Brass et al. |
| 3,703,170 | A | 11/1972 | Ryckman, Jr. |
| 3,731,675 | A | 5/1973 | Kelly |
| 3,739,983 | A | 6/1973 | Jousson |
| 3,745,655 | A | 7/1973 | Malmin |
| 3,747,216 | A | 7/1973 | Bassi et al. |
| 3,756,225 | A | 9/1973 | Moret et al. |
| 3,828,770 | A | 8/1974 | Kuris et al. |
| 3,871,099 | A | 3/1975 | Kahn |
| 3,921,296 | A | 11/1975 | Harris |
| 3,930,505 | A | 1/1976 | Wallach |
| 3,962,790 | A | 6/1976 | Riitano et al. |
| 4,021,921 | A | 5/1977 | Detaille |
| 4,060,600 | A | 11/1977 | Vit |
| 4,071,956 | A | 2/1978 | Andress |
| 4,215,476 | A | 8/1980 | Armstrong |
| 4,247,288 | A | 1/1981 | Yoshii et al. |
| 4,274,555 | A | 6/1981 | Sneider |
| 4,276,880 | A | 7/1981 | Malmin |
| 4,293,188 | A | 10/1981 | McMahon |
| 4,308,603 | A | 12/1981 | Overby, III |
| 4,330,278 | A | 5/1982 | Martin |
| 4,376,835 | A | 3/1983 | Schmitt et al. |
| 4,386,911 | A | 6/1983 | Maloney et al. |
| 4,424,036 | A | 1/1984 | Lokken |
| 4,462,803 | A | 7/1984 | Landgraf et al. |
| 4,474,251 | A | 10/1984 | Johnson, Jr. |
| 4,492,575 | A | 1/1985 | Mabille |
| 4,522,597 | A | 6/1985 | Gallant |
| 4,534,542 | A | 8/1985 | Russo |
| 4,539,987 | A | 9/1985 | Nath et al. |
| 4,554,088 | A | 11/1985 | Whitehead et al. |
| 4,595,365 | A | 6/1986 | Edel et al. |
| 4,608,017 | A | 8/1986 | Sadohara |
| 4,659,218 | A | 4/1987 | de Lasa et al. |
| 4,661,070 | A | 4/1987 | Friedman |
| 4,671,259 | A | 6/1987 | Kirchner |
| 4,676,586 | A | 6/1987 | Jones et al. |
| 4,676,749 | A | 6/1987 | Mabille |
| 4,684,781 | A | 8/1987 | Frish et al. |
| 4,732,193 | A | 3/1988 | Gibbs |
| 4,789,335 | A | 12/1988 | Geller et al. |
| 4,818,230 | A | 4/1989 | Myers et al. |
| 4,872,837 | A | 10/1989 | Issalene et al. |
| 4,917,603 | A | 4/1990 | Haack |
| 4,935,635 | A | 6/1990 | O'Harra |
| 4,941,459 | A | 7/1990 | Mathur |
| 4,957,436 | A | 9/1990 | Ryder |
| 4,973,246 | A | 11/1990 | Black et al. |
| 4,985,027 | A | 1/1991 | Dressel |
| 4,992,048 | A | 2/1991 | Goof |
| 4,993,947 | A | 2/1991 | Grosrey |
| 5,013,241 | A | 5/1991 | Gutfeld et al. |
| 5,013,300 | A | 5/1991 | Williams |
| 5,020,995 | A | 6/1991 | Levy |
| 5,029,576 | A | 7/1991 | Evans, Sr. |
| 5,037,431 | A | 8/1991 | Summers et al. |
| 5,046,950 | A | 9/1991 | Favonio |
| 5,055,048 | A | 10/1991 | Vassiliadis et al. |
| 5,066,232 | A | 11/1991 | Negri et al. |
| 5,094,256 | A | 3/1992 | Barth |
| 5,112,224 | A | 5/1992 | Shirota |
| 5,116,227 | A | 5/1992 | Levy |
| 5,118,293 | A | 6/1992 | Levy |
| 5,122,060 | A | 6/1992 | Vassiliadis et al. |
| 5,123,845 | A | 6/1992 | Vassiliadis et al. |
| 5,151,029 | A | 9/1992 | Levy |
| 5,151,031 | A | 9/1992 | Levy |
| 5,169,318 | A | 12/1992 | Levy |
| 5,171,150 | A | 12/1992 | Levy |
| 5,173,049 | A | 12/1992 | Levy |
| 5,173,050 | A | 12/1992 | Dillon |
| 5,180,304 | A | 1/1993 | Vassiliadis et al. |
| 5,188,532 | A | 2/1993 | Levy |
| 5,188,634 | A | 2/1993 | Hussein et al. |
| 5,194,005 | A | 3/1993 | Levy |
| 5,194,723 | A | 3/1993 | Cates et al. |
| 5,195,952 | A | 3/1993 | Solnit et al. |
| 5,224,942 | A | 7/1993 | Beuchat et al. |
| 5,228,852 | A | 7/1993 | Goldsmith et al. |
| 5,232,366 | A | 8/1993 | Levy |
| 5,232,367 | A | 8/1993 | Vassiliadis et al. |
| 5,236,360 | A | 8/1993 | Levy |
| 5,249,964 | A | 10/1993 | Levy |
| 5,257,935 | A | 11/1993 | Vassiliadis et al. |
| 5,267,856 | A | 12/1993 | Wolbarsht et al. |
| 5,267,995 | A | 12/1993 | Doiron et al. |
| 5,269,777 | A | 12/1993 | Doiron et al. |
| 5,273,713 | A | 12/1993 | Levy |
| 5,275,564 | A | 1/1994 | Vassiliadis et al. |
| 5,281,141 | A | 1/1994 | Kowalyk |
| 5,290,274 | A | 3/1994 | Levy et al. |
| 5,292,253 | A | 3/1994 | Levy |
| 5,295,828 | A | 3/1994 | Grosrey |
| 5,304,167 | A | 4/1994 | Freiberg |
| 5,306,143 | A | 4/1994 | Levy |
| 5,307,839 | A | 5/1994 | Loebker et al. |
| 5,310,344 | A | 5/1994 | Vassiliadis et al. |
| 5,318,562 | A | 6/1994 | Levy et al. |
| 5,322,504 | A | 6/1994 | Doherty et al. |
| 5,324,200 | A | 6/1994 | Vassiliadis et al. |
| 5,326,263 | A | 7/1994 | Weissman |
| 5,326,264 | A | 7/1994 | Al Kasem |
| 5,334,016 | A | 8/1994 | Goldsmith et al. |
| 5,334,019 | A | 8/1994 | Goldsmith et al. |
| 5,342,196 | A | 8/1994 | Van Hale |
| 5,342,198 | A | 8/1994 | Vassiliadis et al. |
| 5,365,624 | A | 11/1994 | Berns |
| 5,374,266 | A | 12/1994 | Kataoka et al. |
| 5,380,201 | A | 1/1995 | Kawata |
| 5,387,376 | A | 2/1995 | Gasser |
| 5,390,204 | A | 2/1995 | Yessik et al. |
| D356,866 | S | 3/1995 | Meller |
| 5,399,089 | A | 3/1995 | Eichman et al. |
| 5,409,376 | A | 4/1995 | Murphy |
| 5,415,652 | A | 5/1995 | Mueller et al. |
| 5,422,899 | A | 6/1995 | Freiberg et al. |
| 5,428,699 | A | 6/1995 | Pon |
| 5,435,724 | A | 7/1995 | Goodman et al. |
| 5,474,451 | A | 12/1995 | Dalrymple et al. |
| 5,484,283 | A | 1/1996 | Franetzki |
| 5,490,779 | A | 2/1996 | Malmin |
| 5,503,559 | A | 4/1996 | Vari |
| 5,507,739 | A | 4/1996 | Vassiliadis et al. |
| 5,540,587 | A | 7/1996 | Malmin |
| 5,545,039 | A | 8/1996 | Mushabac |
| 5,547,376 | A | 8/1996 | Harrel |
| 5,554,896 | A | 9/1996 | Hogan |
| 5,562,692 | A | 10/1996 | Bair |

(56) References Cited

U.S. PATENT DOCUMENTS

| | | |
|---|---|---|
| 5,564,929 A | 10/1996 | Alpert |
| 5,570,182 A | 10/1996 | Nathel et al. |
| 5,591,184 A | 1/1997 | McDonnell et al. |
| 5,601,430 A | 2/1997 | Kutsch et al. |
| 5,611,797 A | 3/1997 | George |
| 5,620,414 A | 4/1997 | Campbell, Jr. |
| 5,621,745 A | 4/1997 | Yessik et al. |
| 5,622,501 A | 4/1997 | Levy |
| 5,639,239 A | 6/1997 | Earle |
| 5,642,997 A | 7/1997 | Gregg et al. |
| 5,643,299 A | 7/1997 | Bair |
| 5,660,817 A | 8/1997 | Masterman et al. |
| 5,662,501 A | 9/1997 | Levy |
| 5,674,226 A | 10/1997 | Doherty et al. |
| 5,688,486 A | 11/1997 | Watson et al. |
| 5,720,894 A | 2/1998 | Neev et al. |
| 5,730,727 A | 3/1998 | Russo |
| 5,735,815 A | 4/1998 | Bair |
| 5,740,291 A | 4/1998 | De Lasa et al. |
| 5,741,247 A | 4/1998 | Rizoiu et al. |
| 5,748,655 A | 5/1998 | Yessik et al. |
| 5,755,752 A | 5/1998 | Segal |
| 5,759,031 A | 6/1998 | Goldsmith et al. |
| 5,759,159 A | 6/1998 | Masreliez |
| 5,762,501 A | 6/1998 | Levy |
| 5,785,521 A | 7/1998 | Rizoiu et al. |
| 5,795,153 A | 8/1998 | Rechmann |
| 5,797,745 A | 8/1998 | Ruddle |
| 5,810,037 A | 9/1998 | Sasaki et al. |
| 5,816,807 A | 10/1998 | Matsutani et al. |
| 5,820,373 A | 10/1998 | Okano et al. |
| 5,825,958 A | 10/1998 | Gollihar et al. |
| 5,832,013 A | 11/1998 | Yessik et al. |
| 5,839,896 A | 11/1998 | Hickok et al. |
| 5,842,863 A | 12/1998 | Bruns et al. |
| 5,846,080 A | 12/1998 | Schneider |
| 5,853,384 A | 12/1998 | Bair |
| 5,865,790 A | 2/1999 | Bair |
| 5,868,570 A | 2/1999 | Hickok et al. |
| 5,874,677 A | 2/1999 | Bab et al. |
| 5,879,160 A | 3/1999 | Ruddle |
| 5,885,082 A | 3/1999 | Levy |
| 5,897,314 A | 4/1999 | Hack et al. |
| 5,911,711 A | 6/1999 | Pelkey |
| 5,915,965 A | 6/1999 | Ohlsson et al. |
| 5,921,775 A | 7/1999 | Buchanan |
| 5,968,037 A | 10/1999 | Rizoiu et al. |
| 5,968,039 A | 10/1999 | Deutsch |
| 5,971,755 A | 10/1999 | Liebermann et al. |
| 5,975,897 A | 11/1999 | Propp et al. |
| 5,989,023 A | 11/1999 | Summer et al. |
| 6,004,319 A | 12/1999 | Goble et al. |
| 6,019,605 A | 2/2000 | Myers |
| 6,022,309 A | 2/2000 | Celliers et al. |
| 6,030,221 A | 2/2000 | Jones et al. |
| 6,033,431 A | 3/2000 | Segal |
| 6,045,516 A | 4/2000 | Phelan |
| 6,053,735 A | 4/2000 | Buchanan |
| 6,079,979 A | 6/2000 | Riitano |
| 6,086,367 A | 7/2000 | Levy |
| 6,096,029 A | 8/2000 | O'Donnell, Jr. |
| 6,104,853 A | 8/2000 | Miyagi et al. |
| 6,106,514 A | 8/2000 | O'Donnell, Jr. |
| 6,122,300 A | 9/2000 | Frieberg et al. |
| 6,129,721 A | 10/2000 | Kataoka et al. |
| 6,139,319 A | 10/2000 | Sauer et al. |
| 6,139,320 A | 10/2000 | Hahn |
| 6,143,011 A | 11/2000 | Hood et al. |
| D435,651 S | 12/2000 | Hartwein |
| 6,159,006 A | 12/2000 | Cook et al. |
| 6,162,052 A | 12/2000 | Kokubu |
| 6,162,177 A | 12/2000 | Bab et al. |
| 6,162,202 A | 12/2000 | Sicurelli et al. |
| 6,164,966 A | 12/2000 | Turdiu et al. |
| 6,179,617 B1 | 1/2001 | Ruddle |
| 6,190,318 B1 | 2/2001 | Bab et al. |
| 6,197,020 B1 | 3/2001 | O'Donnell, Jr. |
| 6,213,972 B1 | 4/2001 | Butterfield et al. |
| 6,221,031 B1 | 4/2001 | Heraud |
| 6,224,378 B1 | 5/2001 | Valdes et al. |
| 6,227,855 B1 | 5/2001 | Hickok et al. |
| 6,231,567 B1 | 5/2001 | Rizoiu et al. |
| 6,245,032 B1 | 6/2001 | Sauer et al. |
| 6,254,597 B1 | 7/2001 | Rizoiu et al. |
| 6,270,342 B1 | 8/2001 | Neuberger et al. |
| 6,282,013 B1 | 8/2001 | Ostler et al. |
| 6,288,499 B1 | 9/2001 | Rizoiu et al. |
| 6,290,502 B1 | 9/2001 | Hugo |
| 6,309,340 B1 | 10/2001 | Nakagawa |
| 6,312,440 B1 | 11/2001 | Hood et al. |
| 6,315,557 B1 | 11/2001 | Messick |
| 6,315,565 B1 | 11/2001 | Slotke et al. |
| 6,319,002 B1 | 11/2001 | Pond |
| 6,343,929 B1 | 2/2002 | Fischer |
| 6,350,123 B1 | 2/2002 | Rizoiu et al. |
| 6,354,660 B1 | 3/2002 | Friedrich |
| 6,386,871 B1 | 5/2002 | Rossell |
| 6,389,193 B1 | 5/2002 | Kimmel et al. |
| 6,390,815 B1 | 5/2002 | Pond |
| 6,428,319 B1 | 8/2002 | Lopez et al. |
| 6,440,103 B1 | 8/2002 | Hood et al. |
| D463,556 S | 9/2002 | Bareth et al. |
| 6,454,566 B1 | 9/2002 | Lynch et al. |
| 6,464,498 B2 | 10/2002 | Pond |
| 6,485,304 B2 | 11/2002 | Beerstecher et al. |
| 6,497,572 B2 | 12/2002 | Hood et al. |
| 6,511,493 B1 | 1/2003 | Moutafis et al. |
| 6,514,077 B1 | 2/2003 | Wilk |
| 6,527,766 B1 | 3/2003 | Bair |
| 6,533,775 B1 | 3/2003 | Rizoiu |
| 6,538,739 B1 | 3/2003 | Visuri et al. |
| 6,544,256 B1 | 4/2003 | Rizoiu et al. |
| 6,561,803 B1 | 5/2003 | Rizoiu et al. |
| 6,562,050 B1 | 5/2003 | Owen |
| 6,567,582 B1 | 5/2003 | Rizoiu et al. |
| 6,572,709 B1 | 6/2003 | Kaneda et al. |
| 6,592,371 B2 | 7/2003 | Durbin et al. |
| 6,602,074 B1 | 8/2003 | Suh et al. |
| 6,610,053 B1 | 8/2003 | Rizoiu et al. |
| 6,616,447 B1 | 9/2003 | Rizoiu et al. |
| 6,616,451 B1 | 9/2003 | Rizolu et al. |
| 6,638,219 B1 | 10/2003 | Asch et al. |
| 6,641,394 B2 | 11/2003 | Garman |
| 6,644,972 B1 | 11/2003 | Mays |
| 6,663,386 B1 | 12/2003 | Moelsgaard |
| 6,669,685 B1 | 12/2003 | Rizoiu et al. |
| 6,676,409 B2 | 1/2004 | Grant |
| 6,679,837 B2 | 1/2004 | Daikuzono |
| 6,695,686 B1 | 2/2004 | Frohlich et al. |
| 6,744,790 B1 | 6/2004 | Tilleman et al. |
| 6,783,364 B1 | 8/2004 | Juan |
| 6,817,862 B2 | 11/2004 | Hickok |
| 6,821,272 B2 | 11/2004 | Rizoiu et al. |
| D499,486 S | 12/2004 | Kuhn et al. |
| 6,827,766 B2 | 12/2004 | Carnes et al. |
| 6,829,427 B1 | 12/2004 | Becker |
| 6,881,061 B2 | 4/2005 | Fisher |
| 6,886,371 B2 | 5/2005 | Arai et al. |
| 6,893,259 B1 | 5/2005 | Reizenson |
| 6,910,887 B2 | 6/2005 | Van Den Houdt |
| 6,942,658 B1 | 9/2005 | Rizoiu et al. |
| 6,948,935 B2 | 9/2005 | Nusstein |
| 6,971,878 B2 | 12/2005 | Pond |
| 6,976,844 B2 | 12/2005 | Hickok et al. |
| 6,981,869 B2 | 1/2006 | Ruddle |
| 6,997,714 B1 | 2/2006 | Schoeffel |
| 7,008,224 B1 | 3/2006 | Browning et al. |
| 7,011,521 B2 | 3/2006 | Sierro et al. |
| 7,011,644 B1 | 3/2006 | Andrew et al. |
| 7,014,465 B1 | 3/2006 | Marais |
| 7,029,278 B2 | 4/2006 | Pond |
| 7,044,737 B2 | 5/2006 | Fu |
| 7,068,912 B1 | 6/2006 | Becker |
| 7,090,497 B1 | 8/2006 | Harris |

(56) References Cited

U.S. PATENT DOCUMENTS

| | | |
|---|---|---|
| 7,108,693 B2 | 9/2006 | Rizoiu et al. |
| 7,115,100 B2 | 10/2006 | McRury et al. |
| 7,144,249 B2 | 12/2006 | Rizoiu et al. |
| 7,147,468 B2 | 12/2006 | Snyder et al. |
| 7,163,400 B2 | 1/2007 | Cozean et al. |
| 7,187,822 B2 | 3/2007 | Rizoiu et al. |
| 7,194,180 B2 | 3/2007 | Becker |
| 7,226,288 B2 | 6/2007 | Schoeffel |
| 7,234,937 B2 | 6/2007 | Sachdeva et al. |
| 7,238,342 B2 | 7/2007 | Torabinejad et al. |
| 7,261,558 B2 | 8/2007 | Rizoiu et al. |
| 7,261,561 B2 | 8/2007 | Ruddle et al. |
| D550,358 S | 9/2007 | Nakanishi |
| 7,269,306 B1 | 9/2007 | Koeneman et al. |
| 7,270,544 B2 | 9/2007 | Schemmer et al. |
| 7,270,657 B2 | 9/2007 | Rizoiu et al. |
| 7,288,086 B1 | 10/2007 | Andriasyan |
| 7,290,940 B2 | 11/2007 | Boutoussov |
| 7,292,759 B2 | 11/2007 | Boutoussov et al. |
| 7,296,318 B2 | 11/2007 | Mourad et al. |
| 7,303,397 B2 | 12/2007 | Boutoussov |
| 7,306,459 B1 | 12/2007 | Williams et al. |
| 7,306,577 B2 | 12/2007 | Lemoine et al. |
| 7,320,594 B1 | 1/2008 | Rizoiu et al. |
| 7,326,054 B2 | 2/2008 | Todd et al. |
| 7,356,208 B2 | 4/2008 | Becker |
| 7,356,225 B2 | 4/2008 | Loebel |
| 7,384,419 B2 | 6/2008 | Jones et al. |
| 7,415,050 B2 | 8/2008 | Rizoiu et al. |
| 7,421,186 B2 | 9/2008 | Boutoussov et al. |
| 7,424,199 B2 | 9/2008 | Rizoiu et al. |
| 7,445,618 B2 | 11/2008 | Eggers et al. |
| 7,448,867 B2 | 11/2008 | Aloise et al. |
| 7,458,380 B2 | 12/2008 | Jones et al. |
| 7,461,658 B2 | 12/2008 | Jones et al. |
| 7,461,982 B2 | 12/2008 | Boutoussov et al. |
| 7,467,946 B2 | 12/2008 | Rizoiu et al. |
| 7,470,124 B2 | 12/2008 | Bornstein |
| 7,485,116 B2 | 2/2009 | Cao |
| 7,549,861 B2 | 6/2009 | Ruddle et al. |
| 7,563,226 B2 | 7/2009 | Boutoussov |
| 7,575,381 B2 | 8/2009 | Boutoussov |
| 7,578,622 B2 | 8/2009 | Boutoussov |
| 7,620,290 B2 | 11/2009 | Rizoiu et al. |
| 7,621,745 B2 | 11/2009 | Bornstein |
| 7,630,420 B2 | 12/2009 | Boutoussov |
| 7,641,668 B2 | 1/2010 | Perry et al. |
| 7,665,467 B2 | 2/2010 | Jones et al. |
| 7,670,141 B2 | 3/2010 | Thomas et al. |
| 7,695,469 B2 | 4/2010 | Boutoussov et al. |
| 7,696,466 B2 | 4/2010 | Rizoiu et al. |
| 7,697,814 B2 | 4/2010 | Rizoiu et al. |
| 7,702,196 B2 | 4/2010 | Boutoussov et al. |
| 7,748,979 B2 | 7/2010 | Nahlieli |
| 7,751,895 B2 | 7/2010 | Jones et al. |
| 7,766,656 B1 | 8/2010 | Feine |
| 7,778,306 B2 | 8/2010 | Marincek et al. |
| 7,815,630 B2 | 10/2010 | Rizoiu et al. |
| 7,817,687 B2 | 10/2010 | Rizoiu et al. |
| 7,833,016 B2 | 11/2010 | Gharib et al. |
| 7,833,017 B2 | 11/2010 | Hof et al. |
| 7,845,944 B2 | 12/2010 | DiGasbarro |
| 7,867,223 B2 | 1/2011 | Van Valen |
| 7,867,224 B2 | 1/2011 | Lukac et al. |
| 7,878,204 B2 | 2/2011 | Van Valen |
| 7,891,363 B2 | 2/2011 | Jones et al. |
| 7,891,977 B2 | 2/2011 | Riva |
| 7,901,373 B2 | 3/2011 | Tavger |
| 7,909,040 B2 | 3/2011 | Jones et al. |
| 7,909,817 B2 | 3/2011 | Griffin et al. |
| 7,916,282 B2 | 3/2011 | Duineveld et al. |
| 7,942,667 B2 | 5/2011 | Rizoiu et al. |
| 7,957,440 B2 | 6/2011 | Boutoussov |
| 7,959,441 B2 | 6/2011 | Glover et al. |
| 7,967,017 B2 | 6/2011 | Jones et al. |
| 7,970,027 B2 | 6/2011 | Rizoiu et al. |
| 7,970,030 B2 | 6/2011 | Rizoiu et al. |
| 7,980,854 B2 | 7/2011 | Glover et al. |
| 7,980,923 B2 | 7/2011 | Olmo et al. |
| 7,997,279 B2 | 8/2011 | Jones et al. |
| 7,998,136 B2 | 8/2011 | Jones et al. |
| 8,002,544 B2 | 8/2011 | Rizoiu et al. |
| 8,011,923 B2 | 9/2011 | Lukac et al. |
| 8,023,795 B2 | 9/2011 | Rizoiu et al. |
| 8,033,825 B2 | 10/2011 | Rizoiu et al. |
| 8,037,566 B2 | 10/2011 | Grez |
| 8,047,841 B2 | 11/2011 | Jefferies |
| 8,052,627 B2 | 11/2011 | Gromer et al. |
| 8,056,564 B2 | 11/2011 | Jones et al. |
| 8,062,673 B2 | 11/2011 | Figuly et al. |
| 8,100,482 B2 | 1/2012 | Kito et al. |
| 8,128,401 B2 | 3/2012 | Ruddle et al. |
| 8,152,797 B2 | 4/2012 | Boutoussov et al. |
| 8,204,612 B2 | 6/2012 | Feine et al. |
| 8,221,117 B2 | 7/2012 | Rizoiu et al. |
| 8,235,719 B2 | 8/2012 | Ruddle et al. |
| 8,241,035 B2 | 8/2012 | Jones et al. |
| 8,256,431 B2 | 9/2012 | Van Valen |
| D669,180 S | 10/2012 | Takashi et al. |
| D669,583 S | 10/2012 | Kagawa |
| 8,276,593 B2 | 10/2012 | Jones et al. |
| 8,295,025 B2 | 10/2012 | Edel et al. |
| 8,297,540 B1 | 10/2012 | Vijay |
| 8,298,215 B2 | 10/2012 | Zinn |
| 8,317,514 B2 | 11/2012 | Weill |
| 8,322,910 B2 | 12/2012 | Gansmuller et al. |
| 8,328,552 B2 | 12/2012 | Ruddle |
| 8,366,702 B2 | 2/2013 | Van Valen |
| 8,371,848 B2 | 2/2013 | Okawa et al. |
| 8,388,345 B2 | 3/2013 | Ruddle |
| 8,403,922 B2 | 3/2013 | Boutoussov et al. |
| 8,419,719 B2 | 4/2013 | Rizoiu et al. |
| 8,439,676 B2 | 5/2013 | Florman |
| 8,439,904 B2 | 5/2013 | Jones et al. |
| 8,448,645 B2 | 5/2013 | Jones et al. |
| 8,470,035 B2 | 6/2013 | Cruise et al. |
| 8,474,635 B2 | 7/2013 | Johnson |
| 8,479,745 B2 | 7/2013 | Rizoiu |
| 8,485,818 B2 | 7/2013 | Boutoussov et al. |
| 8,506,293 B2 | 8/2013 | Pond |
| 8,525,059 B2 | 9/2013 | Berger et al. |
| 8,544,473 B2 | 10/2013 | Rizoiu et al. |
| 8,568,392 B2 | 10/2013 | Jones et al. |
| 8,588,268 B2 | 11/2013 | Boutoussov et al. |
| 8,602,033 B2 | 12/2013 | Jones et al. |
| 8,603,079 B2 | 12/2013 | Van Valen |
| 8,617,090 B2 | 12/2013 | Fougere et al. |
| 8,653,392 B2 | 2/2014 | Berger et al. |
| 8,672,678 B2 | 3/2014 | Gramann et al. |
| D701,971 S | 4/2014 | Van Valen et al. |
| 8,684,956 B2 | 4/2014 | McDonough et al. |
| 8,709,057 B2 | 4/2014 | Tettamanti et al. |
| RE44,917 E | 5/2014 | Tuttle |
| 8,740,957 B2 | 6/2014 | Masotti |
| 8,747,005 B2 | 6/2014 | Kemp et al. |
| 8,753,121 B2 | 6/2014 | Gharib et al. |
| 8,758,010 B2 | 6/2014 | Yamanaka et al. |
| 8,764,739 B2 | 7/2014 | Boutoussov et al. |
| 8,792,251 B2 | 7/2014 | Shih |
| 8,801,316 B1 | 8/2014 | Abedini |
| D713,538 S | 9/2014 | Van Valen et al. |
| 8,821,483 B2 | 9/2014 | Boutoussov et al. |
| 8,827,990 B2 | 9/2014 | Van Valen et al. |
| 8,834,450 B1 | 9/2014 | McCrary et al. |
| 8,834,457 B2 | 9/2014 | Cao |
| 8,926,323 B2 | 1/2015 | Mossle |
| 8,944,814 B2 | 2/2015 | Mossle |
| 8,977,085 B2 | 3/2015 | Walsh et al. |
| 8,978,930 B2 | 3/2015 | Bublewitz et al. |
| D726,324 S | 4/2015 | Duncan et al. |
| 9,022,959 B2 | 5/2015 | Fusi, II et al. |
| 9,022,961 B2 | 5/2015 | Fougere et al. |
| 9,025,625 B2 | 5/2015 | Skrabelj et al. |
| 9,050,157 B2 | 6/2015 | Boyd et al. |

(56) References Cited

U.S. PATENT DOCUMENTS

| | | |
|---|---|---|
| 9,052,805 B2 | 6/2015 | Boutoussov et al. |
| 9,060,845 B2 | 6/2015 | Van Valen et al. |
| 9,084,651 B2 | 7/2015 | Laufer |
| 9,101,377 B2 | 8/2015 | Boutoussov et al. |
| 9,186,222 B2 | 11/2015 | Marincek et al. |
| D745,966 S | 12/2015 | Piorek et al. |
| 9,204,946 B2 | 12/2015 | Kotlarchik et al. |
| 9,216,073 B2 | 12/2015 | McDonough et al. |
| 9,308,326 B2 | 4/2016 | Hunter et al. |
| 9,333,060 B2 | 5/2016 | Hunter |
| 9,341,184 B2 | 5/2016 | Dion et al. |
| 9,408,781 B2 | 8/2016 | Qian et al. |
| 9,492,244 B2 | 11/2016 | Bergheim et al. |
| 9,504,536 B2 | 11/2016 | Bergheim et al. |
| 9,545,295 B2 | 1/2017 | Sung et al. |
| 9,566,129 B2 | 2/2017 | Browning et al. |
| 9,572,632 B2 | 2/2017 | Lukac et al. |
| 9,579,174 B2 | 2/2017 | Yamamoto et al. |
| 9,597,168 B2 | 3/2017 | Black et al. |
| 9,603,676 B1 | 3/2017 | Bochi |
| 9,610,125 B2 | 4/2017 | Kazic et al. |
| 9,675,426 B2 | 6/2017 | Bergheim et al. |
| 9,696,893 B2 | 7/2017 | Boutoussov et al. |
| 9,700,382 B2 | 7/2017 | Pond et al. |
| 9,700,384 B2 | 7/2017 | Yamamoto et al. |
| 9,700,394 B2 | 7/2017 | Yamamoto et al. |
| 9,713,511 B2 | 7/2017 | Lifshitz |
| 9,730,773 B2 | 8/2017 | Uchitel et al. |
| 9,743,999 B2 | 8/2017 | Policicchio |
| 9,788,899 B2 | 10/2017 | Sivriver et al. |
| 9,820,827 B2 | 11/2017 | Feine et al. |
| 9,820,834 B2 | 11/2017 | Maxwell et al. |
| 9,864,485 B2 | 1/2018 | Patton et al. |
| 9,867,997 B2 | 1/2018 | Boutoussov et al. |
| 9,872,748 B2 | 1/2018 | Schoeffel |
| 9,877,801 B2 | 1/2018 | Khakpour et al. |
| D812,231 S | 3/2018 | Duncan et al. |
| D813,391 S | 3/2018 | Duncan et al. |
| 9,931,187 B2 | 4/2018 | Fregoso et al. |
| 9,956,039 B2 | 5/2018 | Boutoussov et al. |
| 9,987,200 B2 | 6/2018 | Kishen |
| 10,010,388 B2 | 7/2018 | Gharib et al. |
| 10,016,263 B2 | 7/2018 | Gharib et al. |
| D824,935 S | 8/2018 | Boutoussov et al. |
| 10,039,625 B2 | 8/2018 | Gharib et al. |
| 10,039,932 B2 | 8/2018 | Van Valen |
| 10,098,708 B2 | 10/2018 | Pond |
| 10,098,717 B2 | 10/2018 | Bergheim et al. |
| 10,105,289 B2 | 10/2018 | Guzman |
| 10,130,424 B2 | 11/2018 | Boutoussov et al. |
| 10,314,671 B2 | 6/2019 | Lifshitz et al. |
| 10,321,957 B2 | 6/2019 | Boutoussov et al. |
| 10,327,866 B2 | 6/2019 | Lifshitz et al. |
| 10,335,249 B2 | 7/2019 | Hiemer et al. |
| 10,363,120 B2 | 7/2019 | Khakpour et al. |
| 10,420,629 B2 | 9/2019 | Buchanan |
| 10,420,630 B2 | 9/2019 | Bergheim et al. |
| 10,430,061 B2 | 10/2019 | Boutoussov et al. |
| 10,450,656 B2 | 10/2019 | Sivriver et al. |
| 10,518,299 B2 | 12/2019 | Lukac et al. |
| 10,561,560 B2 | 2/2020 | Boutoussov et al. |
| D881,394 S | 4/2020 | Classen et al. |
| 10,617,498 B2 | 4/2020 | Gharib et al. |
| 10,631,962 B2 | 4/2020 | Bergheim et al. |
| 10,702,355 B2 | 7/2020 | Bergheim et al. |
| 10,722,325 B2 | 7/2020 | Khakpour et al. |
| 10,729,514 B2 | 8/2020 | Buchanan |
| D896,827 S | 9/2020 | Boutoussov et al. |
| 10,779,908 B2 | 9/2020 | Dresser et al. |
| 10,779,920 B2 | 9/2020 | Buchanan |
| 10,806,543 B2 | 10/2020 | Bergheim et al. |
| 10,806,544 B2 | 10/2020 | Khakpour et al. |
| 10,835,355 B2 | 11/2020 | Gharib et al. |
| D903,868 S | 12/2020 | Goisser et al. |
| 10,877,630 B2 | 12/2020 | Patton et al. |
| D923,038 S | 6/2021 | Boutoussov et al. |
| 11,103,309 B2 | 8/2021 | Boutoussov et al. |
| 11,103,333 B2 | 8/2021 | Khakpour et al. |
| 11,141,249 B2 | 10/2021 | Evans et al. |
| 11,160,455 B2 | 11/2021 | Islam |
| 11,160,645 B2 | 11/2021 | Bergheim et al. |
| 11,173,010 B2 | 11/2021 | Boutoussov et al. |
| 11,173,019 B2 * | 11/2021 | Bergheim .............. A61C 17/20 |
| 11,193,209 B2 | 12/2021 | Sivriver et al. |
| 11,202,687 B2 | 12/2021 | Boutoussov et al. |
| 11,213,375 B2 | 1/2022 | Khakpour et al. |
| 11,250,941 B2 | 2/2022 | Patton et al. |
| 11,284,978 B2 | 3/2022 | Bergheim et al. |
| 11,350,993 B2 | 6/2022 | DiVito et al. |
| 11,426,239 B2 | 8/2022 | DiVito et al. |
| 11,547,538 B2 | 1/2023 | Ertl et al. |
| 11,680,141 B2 | 6/2023 | Gomurashvili et al. |
| 11,684,421 B2 | 6/2023 | DiVito et al. |
| 11,701,202 B2 | 7/2023 | Khakpour et al. |
| D997,355 S | 8/2023 | Schultz et al. |
| 11,801,119 B2 | 10/2023 | Al Shehadat |
| 11,918,432 B2 | 3/2024 | Gharib et al. |
| 12,114,924 B2 | 10/2024 | DiVito et al. |
| 12,186,151 B2 | 1/2025 | Bergheim et al. |
| 12,213,731 B2 | 2/2025 | DiVito et al. |
| 12,268,565 B2 | 4/2025 | Bergheim et al. |
| 2001/0041324 A1 | 11/2001 | Riitano |
| 2002/0012897 A1 | 1/2002 | Tingley et al. |
| 2002/0014855 A1 | 2/2002 | Rizoiu et al. |
| 2002/0072032 A1 | 6/2002 | Senn et al. |
| 2002/0086264 A1 | 7/2002 | Okawa et al. |
| 2002/0090594 A1 | 7/2002 | Riitano et al. |
| 2002/0108614 A1 | 8/2002 | Schultz |
| 2002/0142260 A1 | 10/2002 | Pond |
| 2002/0168610 A1 | 11/2002 | Papanek et al. |
| 2002/0183728 A1 | 12/2002 | Rosenberg et al. |
| 2003/0013063 A1 | 1/2003 | Goldman |
| 2003/0013064 A1 | 1/2003 | Zirkel |
| 2003/0022126 A1 | 1/2003 | Buchalla et al. |
| 2003/0023234 A1 | 1/2003 | Daikuzono |
| 2003/0027100 A1 | 2/2003 | Grant |
| 2003/0096213 A1 | 5/2003 | Hickok et al. |
| 2003/0121532 A1 | 7/2003 | Coughlin et al. |
| 2003/0124485 A1 | 7/2003 | Teraushi |
| 2003/0129560 A1 | 7/2003 | Atkin |
| 2003/0158544 A1 | 8/2003 | Slatkine |
| 2003/0191429 A1 | 10/2003 | Andrew et al. |
| 2003/0207231 A1 | 11/2003 | Nance |
| 2003/0207232 A1 | 11/2003 | Todd et al. |
| 2003/0211083 A1 | 11/2003 | Vogel et al. |
| 2003/0215768 A1 | 11/2003 | Aumuller et al. |
| 2003/0236517 A1 | 12/2003 | Appling |
| 2004/0038170 A1 | 2/2004 | Hiszowicz et al. |
| 2004/0048226 A1 | 3/2004 | Garman |
| 2004/0063073 A1 | 4/2004 | Kajimoto et al. |
| 2004/0063074 A1 | 4/2004 | Fisher |
| 2004/0068256 A1 | 4/2004 | Rizoiu et al. |
| 2004/0072122 A1 | 4/2004 | Hegemann |
| 2004/0073374 A1 | 4/2004 | Lockhart et al. |
| 2004/0092925 A1 | 5/2004 | Rizoiu et al. |
| 2004/0101809 A1 | 5/2004 | Weiss et al. |
| 2004/0102782 A1 | 5/2004 | Vercellotti et al. |
| 2004/0126732 A1 | 7/2004 | Nusstein |
| 2004/0127892 A1 | 7/2004 | Harris |
| 2004/0166473 A1 | 8/2004 | Cohen |
| 2004/0193236 A1 | 9/2004 | Altshuler |
| 2004/0210276 A1 | 10/2004 | Altshuler et al. |
| 2004/0224288 A1 | 11/2004 | Bornstein |
| 2004/0259053 A1 | 12/2004 | Bekov et al. |
| 2005/0026106 A1 | 2/2005 | Jefferies |
| 2005/0064371 A1 | 3/2005 | Soukos et al. |
| 2005/0065497 A1 | 3/2005 | Levatino |
| 2005/0096529 A1 | 5/2005 | Cooper et al. |
| 2005/0112525 A1 | 5/2005 | McPherson et al. |
| 2005/0136375 A1 | 6/2005 | Sicurelli, Jr. et al. |
| 2005/0142517 A1 | 6/2005 | Frysh et al. |
| 2005/0155622 A1 | 7/2005 | Leis |
| 2005/0170312 A1 | 8/2005 | Pond |
| 2005/0175960 A1 | 8/2005 | Wiek et al. |

(56) References Cited

U.S. PATENT DOCUMENTS

| | | |
|---|---|---|
| 2005/0186530 A1 | 8/2005 | Eagle |
| 2005/0199261 A1 | 9/2005 | Vanhauwemeiren et al. |
| 2005/0256517 A1 | 11/2005 | Boutoussov |
| 2005/0271531 A1 | 12/2005 | Brown, Jr. et al. |
| 2005/0272001 A1 | 12/2005 | Blain et al. |
| 2005/0277898 A1 | 12/2005 | Dimalanta et al. |
| 2005/0281530 A1 | 12/2005 | Rizoiu et al. |
| 2005/0281887 A1 | 12/2005 | Rizoiu |
| 2005/0283143 A1 | 12/2005 | Rizoiu |
| 2006/0019220 A1 | 1/2006 | Loebel et al. |
| 2006/0021642 A1 | 2/2006 | Sliwa et al. |
| 2006/0036172 A1 | 2/2006 | Abe |
| 2006/0064037 A1 | 3/2006 | Shalon et al. |
| 2006/0110710 A1 | 5/2006 | Schemmer et al. |
| 2006/0142743 A1 | 6/2006 | Rizoiu et al. |
| 2006/0142744 A1 | 6/2006 | Boutoussov |
| 2006/0142745 A1 | 6/2006 | Boutoussov |
| 2006/0184071 A1 | 8/2006 | Klopotek |
| 2006/0189965 A1 | 8/2006 | Litvak et al. |
| 2006/0227653 A1 | 10/2006 | Keller |
| 2006/0234182 A1 | 10/2006 | Ruddle et al. |
| 2006/0234183 A1 | 10/2006 | Ruddle et al. |
| 2006/0240381 A1 | 10/2006 | Rizoiu et al. |
| 2006/0240386 A1 | 10/2006 | Yaniv et al. |
| 2006/0241574 A1 | 10/2006 | Rizoiu |
| 2006/0246395 A1 | 11/2006 | Pond |
| 2006/0257819 A1 | 11/2006 | Johnson |
| 2006/0264808 A1 | 11/2006 | Staid et al. |
| 2007/0003604 A1 | 1/2007 | Jones |
| 2007/0009449 A1 | 1/2007 | Kanca |
| 2007/0014517 A1 | 1/2007 | Rizoiu et al. |
| 2007/0016176 A1 | 1/2007 | Boutoussov et al. |
| 2007/0016177 A1 | 1/2007 | Vaynberg et al. |
| 2007/0016178 A1 | 1/2007 | Vaynberg et al. |
| 2007/0020576 A1 | 1/2007 | Osborn et al. |
| 2007/0042315 A1 | 2/2007 | Boutoussov et al. |
| 2007/0042316 A1 | 2/2007 | Pichat et al. |
| 2007/0049911 A1 | 3/2007 | Brown |
| 2007/0054233 A1 | 3/2007 | Rizoiu et al. |
| 2007/0054235 A1 | 3/2007 | Rizoiu et al. |
| 2007/0054236 A1 | 3/2007 | Rizoiu et al. |
| 2007/0059660 A1 | 3/2007 | Rizoiu et al. |
| 2007/0060917 A1 | 3/2007 | Andriasyan |
| 2007/0072153 A1 | 3/2007 | Gross et al. |
| 2007/0083120 A1 | 4/2007 | Cain et al. |
| 2007/0087303 A1 | 4/2007 | Papanek et al. |
| 2007/0088295 A1 | 4/2007 | Bankiewicz |
| 2007/0099149 A1 | 5/2007 | Levy et al. |
| 2007/0104419 A1 | 5/2007 | Rizoiu et al. |
| 2007/0128576 A1 | 6/2007 | Boutoussov |
| 2007/0135797 A1 | 6/2007 | Hood et al. |
| 2007/0148615 A1 | 6/2007 | Pond |
| 2007/0175502 A1 | 8/2007 | Sliwa |
| 2007/0179486 A1 | 8/2007 | Welch et al. |
| 2007/0184402 A1 | 8/2007 | Boutoussov et al. |
| 2007/0190482 A1 | 8/2007 | Rizoiu |
| 2007/0208328 A1 | 9/2007 | Boutoussov et al. |
| 2007/0224575 A1 | 9/2007 | Dieras et al. |
| 2007/0248932 A1* | 10/2007 | Gharib ............... A61C 17/024 433/81 |
| 2007/0265605 A1 | 11/2007 | Vaynberg et al. |
| 2007/0276290 A1* | 11/2007 | Boecker ........... A61B 5/150068 600/583 |
| 2007/0287125 A1 | 12/2007 | Weill |
| 2007/0298369 A1 | 12/2007 | Rizoiu et al. |
| 2008/0014545 A1 | 1/2008 | Schippers |
| 2008/0032259 A1 | 2/2008 | Schoeffel |
| 2008/0033411 A1 | 2/2008 | Manvel Artyom et al. |
| 2008/0044789 A1 | 2/2008 | Johnson |
| 2008/0065057 A1 | 3/2008 | Andriasyan |
| 2008/0070185 A1 | 3/2008 | Rizoiu et al. |
| 2008/0070195 A1 | 3/2008 | DiVito et al. |
| 2008/0085490 A1 | 4/2008 | Jabri |
| 2008/0097417 A1 | 4/2008 | Jones et al. |
| 2008/0102416 A1 | 5/2008 | Karazivan et al. |
| 2008/0125677 A1 | 5/2008 | Van Valen |
| 2008/0138761 A1 | 6/2008 | Pond |
| 2008/0138764 A1 | 6/2008 | Rizoiu |
| 2008/0138772 A1 | 6/2008 | Bornstein |
| 2008/0151953 A1 | 6/2008 | Rizoiu et al. |
| 2008/0155770 A1 | 7/2008 | Grez |
| 2008/0157690 A1 | 7/2008 | Rizoiu et al. |
| 2008/0159345 A1 | 7/2008 | Bornstein |
| 2008/0160479 A1 | 7/2008 | Ruddle et al. |
| 2008/0160480 A1 | 7/2008 | Ruddle et al. |
| 2008/0160481 A1 | 7/2008 | Schoeffel |
| 2008/0188848 A1 | 8/2008 | Deutmeyer et al. |
| 2008/0199831 A1 | 8/2008 | Teichert et al. |
| 2008/0209650 A1 | 9/2008 | Brewer et al. |
| 2008/0219629 A1 | 9/2008 | Rizoiu et al. |
| 2008/0221558 A1 | 9/2008 | Becker |
| 2008/0255498 A1 | 10/2008 | Houle |
| 2008/0274438 A1 | 11/2008 | Schemmer |
| 2008/0276192 A1 | 11/2008 | Jones et al. |
| 2008/0285600 A1 | 11/2008 | Marincek et al. |
| 2008/0311045 A1 | 12/2008 | Hardy |
| 2008/0311540 A1 | 12/2008 | Gottenbos et al. |
| 2008/0314199 A1 | 12/2008 | Niemi et al. |
| 2008/0319453 A1 | 12/2008 | Tavger |
| 2009/0004621 A1 | 1/2009 | Quan et al. |
| 2009/0011380 A1 | 1/2009 | Wang |
| 2009/0031515 A1 | 2/2009 | Rizoiu et al. |
| 2009/0035717 A1 | 2/2009 | Rizoiu et al. |
| 2009/0042171 A1 | 2/2009 | Rizoiu et al. |
| 2009/0047624 A1 | 2/2009 | Tsai |
| 2009/0047634 A1 | 2/2009 | Calvert |
| 2009/0054881 A1 | 2/2009 | Krespi |
| 2009/0059994 A1 | 3/2009 | Nemes et al. |
| 2009/0067189 A1 | 3/2009 | Boutoussov et al. |
| 2009/0092947 A1 | 4/2009 | Cao et al. |
| 2009/0105597 A1 | 4/2009 | Abraham |
| 2009/0105707 A1 | 4/2009 | Rizoiu et al. |
| 2009/0111068 A1 | 4/2009 | Martinez |
| 2009/0111069 A1 | 4/2009 | Wagner |
| 2009/0130622 A1 | 5/2009 | Bollinger et al. |
| 2009/0143775 A1 | 6/2009 | Rizoiu et al. |
| 2009/0170052 A1 | 7/2009 | Borczyk |
| 2009/0208898 A1 | 8/2009 | Kaplan |
| 2009/0211042 A1 | 8/2009 | Bock |
| 2009/0225060 A1 | 9/2009 | Rizoiu et al. |
| 2009/0227185 A1 | 9/2009 | Summers et al. |
| 2009/0263759 A1 | 10/2009 | Van Herpern |
| 2009/0275935 A1 | 11/2009 | McKee |
| 2009/0281531 A1 | 11/2009 | Rizoiu et al. |
| 2009/0298004 A1 | 12/2009 | Rizoiu |
| 2010/0015576 A1 | 1/2010 | Altshuler et al. |
| 2010/0042040 A1 | 2/2010 | Arentz |
| 2010/0047734 A1 | 2/2010 | Harris et al. |
| 2010/0068679 A1 | 3/2010 | Zappini |
| 2010/0086892 A1 | 4/2010 | Riozoui et al. |
| 2010/0092922 A1 | 4/2010 | Ruddle |
| 2010/0125291 A1 | 5/2010 | Rizoiu et al. |
| 2010/0143861 A1 | 6/2010 | Gharib |
| 2010/0151406 A1 | 6/2010 | Boutoussov et al. |
| 2010/0151407 A1 | 6/2010 | Rizoiu et al. |
| 2010/0152634 A1 | 6/2010 | Dove |
| 2010/0160838 A1 | 6/2010 | Krespi |
| 2010/0160904 A1 | 6/2010 | McMillan et al. |
| 2010/0167226 A1 | 7/2010 | Altshuler et al. |
| 2010/0167228 A1 | 7/2010 | Rizoiu et al. |
| 2010/0185188 A1 | 7/2010 | Boutoussov et al. |
| 2010/0190133 A1 | 7/2010 | Martinez |
| 2010/0206324 A1 | 8/2010 | Paschke |
| 2010/0209867 A1 | 8/2010 | Becker et al. |
| 2010/0229316 A1 | 9/2010 | Hohlbein et al. |
| 2010/0233645 A1 | 9/2010 | Rizoiu |
| 2010/0233649 A1 | 9/2010 | McPeek et al. |
| 2010/0261136 A1 | 10/2010 | Schulte et al. |
| 2010/0272764 A1 | 10/2010 | Latta et al. |
| 2010/0273125 A1 | 10/2010 | Janssen et al. |
| 2010/0279250 A1 | 11/2010 | Pond et al. |
| 2010/0279251 A1 | 11/2010 | Pond |
| 2010/0330539 A1 | 12/2010 | Glover et al. |
| 2011/0020765 A1 | 1/2011 | Maxwell et al. |

(56) References Cited

U.S. PATENT DOCUMENTS

| | | |
|---|---|---|
| 2011/0027746 A1 | 2/2011 | McDonough et al. |
| 2011/0027747 A1 | 2/2011 | Fougere et al. |
| 2011/0046262 A1 | 2/2011 | Bublewitz et al. |
| 2011/0070552 A1 | 3/2011 | Bornstein |
| 2011/0072605 A1 | 3/2011 | Steur |
| 2011/0076638 A1 | 3/2011 | Gottenbos et al. |
| 2011/0087605 A1 | 4/2011 | Pond |
| 2011/0096549 A1 | 4/2011 | Boutoussov et al. |
| 2011/0111365 A1 | 5/2011 | Gharib et al. |
| 2011/0129789 A1 | 6/2011 | Rizoiu et al. |
| 2011/0136935 A1 | 6/2011 | Khor et al. |
| 2011/0143310 A1 | 6/2011 | Hunter |
| 2011/0151394 A1 | 6/2011 | Rizoiu et al. |
| 2011/0183284 A1 | 7/2011 | Yamanaka et al. |
| 2011/0189627 A1 | 8/2011 | Gharib et al. |
| 2011/0189630 A1 | 8/2011 | Koubi |
| 2011/0198370 A1 | 8/2011 | Ho |
| 2011/0200959 A1 | 8/2011 | Rizoiu et al. |
| 2011/0217665 A1 | 9/2011 | Walsh et al. |
| 2011/0229845 A1 | 9/2011 | Chen |
| 2011/0256503 A1 | 10/2011 | Fraser |
| 2011/0269099 A1 | 11/2011 | Glover et al. |
| 2011/0270241 A1 | 11/2011 | Boutoussov |
| 2011/0281230 A1 | 11/2011 | Rizoiu et al. |
| 2011/0281231 A1 | 11/2011 | Rizoiu et al. |
| 2012/0021375 A1 | 1/2012 | Binner et al. |
| 2012/0065711 A1 | 3/2012 | Netchitailo et al. |
| 2012/0077144 A1 | 3/2012 | Fougere et al. |
| 2012/0094251 A1 | 4/2012 | Mössle |
| 2012/0099815 A1 | 4/2012 | Boutoussov et al. |
| 2012/0135368 A1 | 5/2012 | Rizoiu et al. |
| 2012/0135373 A1 | 5/2012 | Cheng et al. |
| 2012/0141953 A1 | 6/2012 | Mueller |
| 2012/0148979 A1 | 6/2012 | Ruddle |
| 2012/0237893 A1* | 9/2012 | Bergheim ............... A61C 5/40 433/81 |
| 2012/0240647 A1 | 9/2012 | Montemurro |
| 2012/0276497 A1 | 11/2012 | Gharib |
| 2012/0282566 A1 | 11/2012 | Rizoiu et al. |
| 2012/0282570 A1 | 11/2012 | Mueller |
| 2013/0040267 A1 | 2/2013 | Bergheim |
| 2013/0066324 A1 | 3/2013 | Engqvist et al. |
| 2013/0084544 A1 | 4/2013 | Boutoussov et al. |
| 2013/0084545 A1 | 4/2013 | Netchitailo et al. |
| 2013/0085485 A1 | 4/2013 | Van Valen et al. |
| 2013/0085486 A1 | 4/2013 | Boutoussov et al. |
| 2013/0086758 A1 | 4/2013 | Boutoussov et al. |
| 2013/0089829 A1 | 4/2013 | Boutoussov et al. |
| 2013/0110101 A1 | 5/2013 | Van Valen et al. |
| 2013/0115568 A1 | 5/2013 | Jelovac et al. |
| 2013/0131656 A1 | 5/2013 | Marincek et al. |
| 2013/0143180 A1 | 6/2013 | Glover et al. |
| 2013/0177865 A1 | 7/2013 | Ostler |
| 2013/0178847 A1 | 7/2013 | Rizoiu et al. |
| 2013/0190738 A1 | 7/2013 | Lukac et al. |
| 2013/0190743 A1 | 7/2013 | Boutoussov et al. |
| 2013/0216980 A1 | 8/2013 | Boronkay et al. |
| 2013/0236857 A1 | 9/2013 | Boutoussov et al. |
| 2013/0273494 A1 | 10/2013 | Boutoussov et al. |
| 2013/0274724 A1 | 10/2013 | Rizoiu |
| 2013/0288195 A1 | 10/2013 | Mueller |
| 2013/0296910 A1 | 11/2013 | Deng |
| 2013/0330684 A1 | 12/2013 | Dillon et al. |
| 2013/0337404 A1 | 12/2013 | Feine |
| 2014/0032183 A1 | 1/2014 | Fisker et al. |
| 2014/0072931 A1 | 3/2014 | Fougere et al. |
| 2014/0080090 A1 | 3/2014 | Laufer |
| 2014/0087333 A1 | 3/2014 | DiVito et al. |
| 2014/0113243 A1 | 4/2014 | Boutoussov et al. |
| 2014/0124969 A1 | 5/2014 | Blaisdell et al. |
| 2014/0127641 A1 | 5/2014 | Hilscher et al. |
| 2014/0134965 A1 | 5/2014 | Karmi et al. |
| 2014/0147804 A1 | 5/2014 | Yamamoto et al. |
| 2014/0170588 A1 | 6/2014 | Miller et al. |
| 2014/0205965 A1 | 7/2014 | Boutoussov et al. |
| 2014/0220511 A1 | 8/2014 | DiVito et al. |
| 2014/0242551 A1 | 8/2014 | Downs |
| 2014/0257254 A1 | 9/2014 | Boutoussov et al. |
| 2014/0261534 A1 | 9/2014 | Schepis |
| 2014/0272782 A1 | 9/2014 | Luettgen et al. |
| 2014/0303692 A1 | 10/2014 | Pignatelli et al. |
| 2014/0342303 A1 | 11/2014 | Altshuler et al. |
| 2014/0349246 A1 | 11/2014 | Johnson et al. |
| 2015/0010878 A1 | 1/2015 | Seibel et al. |
| 2015/0017599 A1 | 1/2015 | Marincek et al. |
| 2015/0017607 A1 | 1/2015 | Nelson et al. |
| 2015/0030991 A1 | 1/2015 | Sung et al. |
| 2015/0044630 A1 | 2/2015 | Gharib et al. |
| 2015/0056567 A1 | 2/2015 | Fregoso et al. |
| 2015/0056570 A1 | 2/2015 | Kansal |
| 2015/0126984 A1 | 5/2015 | Boutoussov et al. |
| 2015/0147715 A1 | 5/2015 | Breysse |
| 2015/0147717 A1 | 5/2015 | Taylor et al. |
| 2015/0150650 A1 | 6/2015 | Netchitailo et al. |
| 2015/0173850 A1 | 6/2015 | Garrigues et al. |
| 2015/0182283 A1 | 7/2015 | Boutoussov et al. |
| 2015/0190597 A1 | 7/2015 | Zachar et al. |
| 2015/0216398 A1 | 8/2015 | Yang et al. |
| 2015/0216597 A1 | 8/2015 | Boutoussov et al. |
| 2015/0216622 A1 | 8/2015 | Vartanian et al. |
| 2015/0230865 A1 | 8/2015 | Sivriver et al. |
| 2015/0268803 A1 | 9/2015 | Patton et al. |
| 2015/0277738 A1 | 10/2015 | Boutoussov et al. |
| 2015/0283277 A1 | 10/2015 | Schafer et al. |
| 2015/0327964 A1 | 11/2015 | Bock |
| 2015/0335410 A1 | 11/2015 | Zhao |
| 2015/0342679 A1 | 12/2015 | Boutoussov et al. |
| 2015/0359672 A1 | 12/2015 | Van Valen et al. |
| 2015/0367142 A1 | 12/2015 | Kazic et al. |
| 2015/0374471 A1 | 12/2015 | Stangel et al. |
| 2016/0022392 A1 | 1/2016 | Chang et al. |
| 2016/0067149 A1 | 3/2016 | Kishen |
| 2016/0100921 A1 | 4/2016 | Ungar |
| 2016/0113733 A1 | 4/2016 | Pond et al. |
| 2016/0113745 A1 | 4/2016 | Golub et al. |
| 2016/0128815 A1 | 5/2016 | Birdee et al. |
| 2016/0135581 A1 | 5/2016 | Pai |
| 2016/0149370 A1 | 5/2016 | Marincek et al. |
| 2016/0149372 A1 | 5/2016 | Marincek et al. |
| 2016/0220200 A1 | 8/2016 | Sandholm et al. |
| 2016/0270889 A1 | 9/2016 | Casabonne et al. |
| 2016/0334283 A1 | 11/2016 | Scurtescu et al. |
| 2017/0036253 A1 | 2/2017 | Lukac et al. |
| 2017/0056143 A1 | 3/2017 | Hyun |
| 2017/0189149 A1 | 7/2017 | Golub et al. |
| 2017/0196658 A1 | 7/2017 | Schoeffel |
| 2017/0197071 A1 | 7/2017 | Gottenbos |
| 2017/0216579 A1 | 8/2017 | Becker et al. |
| 2017/0265965 A1 | 9/2017 | Chow et al. |
| 2017/0274220 A1 | 9/2017 | Ertl et al. |
| 2017/0281305 A1 | 10/2017 | Bergheim |
| 2017/0300220 A1 | 10/2017 | Boutoussov et al. |
| 2017/0325889 A1 | 11/2017 | DiVito et al. |
| 2017/0340523 A1 | 11/2017 | Guzman |
| 2018/0008347 A9 | 1/2018 | DeVito et al. |
| 2018/0021104 A1 | 1/2018 | Duncan et al. |
| 2018/0104020 A1 | 4/2018 | Boutoussov et al. |
| 2018/0125608 A1 | 5/2018 | Gottenbos et al. |
| 2018/0140865 A1 | 5/2018 | Boutoussov et al. |
| 2018/0214247 A1 | 8/2018 | Sharma et al. |
| 2018/0228581 A1 | 8/2018 | Ouyang |
| 2018/0228582 A1 | 8/2018 | Shin |
| 2018/0257962 A1 | 9/2018 | Montemurro |
| 2019/0059996 A1 | 2/2019 | Duncan et al. |
| 2019/0117078 A1 | 4/2019 | Sharma et al. |
| 2019/0142516 A1 | 5/2019 | Boutoussov et al. |
| 2019/0175401 A1 | 6/2019 | Van Valen et al. |
| 2019/0282332 A1 | 9/2019 | Lifshitz et al. |
| 2019/0336219 A9 | 11/2019 | DiVito |
| 2020/0069402 A1 | 3/2020 | Gharib |
| 2020/0085534 A1 | 3/2020 | Kim et al. |
| 2020/0139146 A1 | 5/2020 | Khakpour |
| 2020/0179209 A1 | 6/2020 | Boutoussov et al. |
| 2020/0197143 A1 | 6/2020 | Snyder et al. |

(56) References Cited

U.S. PATENT DOCUMENTS

| | | | |
|---|---|---|---|
| 2020/0205934 | A1 | 7/2020 | Groves, Jr. et al. |
| 2020/0253369 | A1 | 8/2020 | De Gentile et al. |
| 2020/0253702 | A1 | 8/2020 | De Gentile et al. |
| 2020/0254586 | A1 | 8/2020 | Sanders et al. |
| 2020/0268491 | A1 | 8/2020 | Shotton et al. |
| 2020/0281688 | A1 | 9/2020 | Lares et al. |
| 2020/0297455 | A1 | 9/2020 | Bergheim |
| 2020/0330184 | A1 | 10/2020 | Boutoussov et al. |
| 2020/0360108 | A1 | 11/2020 | Gomurashvili et al. |
| 2021/0038344 | A1 | 2/2021 | Khakpour |
| 2021/0069756 | A1 | 3/2021 | Lukac et al. |
| 2021/0077234 | A1 | 3/2021 | Gharib et al. |
| 2021/0082562 | A1 | 3/2021 | Patton et al. |
| 2021/0085435 | A1 | 3/2021 | Bergheim |
| 2021/0106402 | A1 | 4/2021 | Khakpour et al. |
| 2021/0121275 | A1 | 4/2021 | Parham et al. |
| 2021/0145538 | A1 | 5/2021 | Boutoussov et al. |
| 2021/0153937 | A1 | 5/2021 | Duncan et al. |
| 2021/0186824 | A1 | 6/2021 | Gomurashvili et al. |
| 2021/0386510 | A1 | 12/2021 | Li et al. |
| 2021/0386532 | A1 | 12/2021 | Khakpour et al. |
| 2022/0015829 | A1 | 1/2022 | Boutoussov et al. |
| 2022/0022961 | A1 | 1/2022 | Boutoussov et al. |
| 2022/0031548 | A1 | 2/2022 | Boutoussov et al. |
| 2022/0054230 | A1 | 2/2022 | Lifshitz et al. |
| 2022/0071735 | A1 | 3/2022 | Boutoussov et al. |
| 2022/0186376 | A1 | 6/2022 | Sivriver et al. |
| 2022/0202525 | A1 | 6/2022 | Boutoussov et al. |
| 2022/0208334 | A1 | 6/2022 | Patton et al. |
| 2022/0233291 | A1 | 7/2022 | DeZan et al. |
| 2022/0370177 | A1 | 11/2022 | Khakpour et al. |
| 2023/0022589 | A1 | 1/2023 | Bergheim et al. |
| 2023/0028923 | A1 | 1/2023 | Gharib et al. |
| 2023/0310132 | A1 | 10/2023 | Khakpour et al. |
| 2024/0016706 | A1 | 1/2024 | Gomurashvili et al. |
| 2024/0207017 | A1 | 6/2024 | Khakpour et al. |
| 2024/0335252 | A1 | 10/2024 | Bergheim et al. |
| 2025/0160956 | A1 | 5/2025 | DiVito et al. |
| 2025/0177086 | A1 | 6/2025 | Bergheim et al. |

FOREIGN PATENT DOCUMENTS

| | | |
|---|---|---|
| CN | 2189448 Y | 2/1995 |
| CN | 1127982 | 7/1996 |
| CN | 2693189 Y | 4/2005 |
| CN | 2936192 Y | 8/2007 |
| CN | 200953143 | 10/2007 |
| CN | 201070397 Y | 6/2008 |
| CN | 201370644 Y | 12/2009 |
| CN | 101632849 A | 1/2010 |
| CN | 103027762 A | 4/2013 |
| CN | 107080697 A | 8/2017 |
| CN | 107411976 | 12/2017 |
| DE | 3708801 | 9/1988 |
| DE | 4404983 | 9/1994 |
| DE | 10248336 | 5/2004 |
| DE | 102005028925 | 1/2007 |
| EP | 0261466 | 3/1988 |
| EP | 0436316 | 7/1991 |
| EP | 0685454 | 12/1995 |
| EP | 0830852 | 3/1998 |
| EP | 0902654 | 8/2004 |
| EP | 1886659 | 2/2008 |
| EP | 4534039 | 4/2025 |
| FR | 1225547 | 7/1960 |
| FR | 2831050 | 4/2003 |
| GB | 917633 | 2/1963 |
| GB | 2011305 | 7/1979 |
| JP | 51-064791 A | 4/1976 |
| JP | S60195008 U | 12/1985 |
| JP | H01-313048 | 12/1989 |
| JP | 05-169039 A | 9/1993 |
| JP | H07-155335 | 6/1995 |
| JP | H08-117335 A | 5/1996 |
| JP | H08-1118 A | 9/1996 |
| JP | 09-84809 A | 3/1997 |
| JP | 09-276292 | 10/1997 |
| JP | 10-33548 | 2/1998 |
| JP | H11-28219 A | 2/1999 |
| JP | 11-113927 A | 4/1999 |
| JP | H11-504843 | 5/1999 |
| JP | 11-244303 A | 9/1999 |
| JP | 2000-254153 A | 9/2000 |
| JP | 2002-209911 | 7/2002 |
| JP | 2004-313659 | 11/2003 |
| JP | 3535685 B2 | 6/2004 |
| JP | 2004-261288 | 9/2004 |
| JP | 2005-052754 | 3/2005 |
| JP | 2005-080802 | 3/2005 |
| JP | 2005-095374 | 4/2005 |
| JP | 2006-247619 | 9/2006 |
| JP | 2008-93080 | 4/2008 |
| JP | 2008-132099 | 6/2008 |
| JP | 2009-114953 | 5/2009 |
| JP | 2010-247133 | 11/2010 |
| JP | 2016-534786 | 11/2016 |
| KR | 10-2008-0105713 A | 12/2008 |
| KR | 10-2012-0084897 A | 7/2012 |
| KR | 10-2013-0022553 A | 3/2013 |
| KR | 10-2013-0141103 A | 12/2013 |
| KR | 2004-72508 Y1 | 5/2014 |
| RU | 2326611 C1 | 12/2011 |
| TW | M 336 027 U | 7/2008 |
| WO | WO 1992/004871 | 4/1992 |
| WO | WO 1992/012685 | 8/1992 |
| WO | WO 1995/035069 | 12/1995 |
| WO | WO 1997/021420 | 6/1997 |
| WO | WO 1998/023219 | 6/1998 |
| WO | WO 1998/025536 | 6/1998 |
| WO | WO 1999/63904 | 12/1999 |
| WO | WO 2000/045731 | 8/2000 |
| WO | WO 2000/074587 | 12/2000 |
| WO | WO 2001/026577 | 4/2001 |
| WO | WO 2001/26735 | 4/2001 |
| WO | WO 2001/036117 | 5/2001 |
| WO | WO 2001/93773 | 12/2001 |
| WO | WO 2002/078644 | 10/2002 |
| WO | WO 2003/086223 | 10/2003 |
| WO | WO 2004/032881 | 4/2004 |
| WO | WO 2006/082101 | 8/2006 |
| WO | WO 2008/120018 | 10/2008 |
| WO | WO 2009/151983 | 12/2009 |
| WO | WO 2011/114718 | 9/2011 |
| WO | WO 2012/074918 | 6/2012 |
| WO | WO 2013/15700 | 1/2013 |
| WO | WO 2013/057519 | 4/2013 |
| WO | WO 2013/061251 | 5/2013 |
| WO | WO 2013/160888 | 10/2013 |
| WO | WO 2022/099258 | 5/2022 |
| WO | WO 2024/211619 | 10/2024 |

OTHER PUBLICATIONS

Adachi et al; Jet Structure Analyses on High-Speed Submerged Water Jets through Cavitation 110 Noises; pp. 568-574; The Japan Society of Mechanical Engineers International Journal-Series B, vol. 39, No. 3; Nov. 1996.

Ahmad et al., "Ultrasonic Debridement of Root Canals: Acoustic Cavitation and Its Relevance," Journal of Endontics, vol. 14, No. 10, pp. 486-493, Oct. 1988.

Al-Jadaa et al; Acoustic Hypochlorite Activation in Simulated Curved Canals; pp. 1408-1411; Journal of Endodontics, vol. 35, No. 10; Oct. 2009.

Alomairy, Evaluating two techniques on removal of fractured rotary nickel-titanium endodontic instruments from root canals: an in vitro study. J Endod 2009;35:559-62.

Anand et al; Prevention of Nozzle Wear in High-Speed Slurry Jets Using Porous Lubricated Nozzles; pp. 1-13; Department of Mechanical Engineering, The Johns Hopkins University, Oct. 2000.

Anantharamaiah et al; A simple expression for predicting the inlet roundness of micro-nozzles; pp. N31-N39; Journal of Micromechanics and Microengineering, vol. 17; Mar. 21, 2007.

(56) References Cited

OTHER PUBLICATIONS

Anantharamaiah et al; A study on flow through hydroentangling nozzles and their degradation; pp. 4582-4594; Chemical Engineering Science, vol. 61; May 2006.
Anantharamaiah et al; Numerical Simulation of the Formation of Constricted Waterjets inHydroentangling Nozzles Effects of Nozzle Geometry; pp. 31-238; Chemical Engineering Research and Design, vol. 84; Mar. 2006.
Attin et al; Clinical evaluation of the cleansing properties of the nonistrumental technique for cleaning root canals; pp. 929-933; International Endodontic Journal, vol. 35, Issue 11; Nov. 2002.
Bader et al., "Indications and limitations of Er:YAG laser applications in dentistry," archive ouverte UNIGE, http://archive-ouverte. unige.ch. American Journal of Denistry, 2006, vol. 19, No. 3, p. 178-186.
Bahia, et al.: Physical and mechanical characterization and the influence of cyclic loading on the behaviour of nickel-titanium wires employed in the manufacture of rotary endodontic instruments. Int Endod. J. 2005;38:795-801.
Batchelor et al; Analysis of the stability of axisymmetric jets; pp. 529-551; Journal of Fluid Mechanics, vol. 14; Dec. 1962.
Begenir et al; Effect of Nozzle Geometry on Hydroentangling Water Jets: Experimental Observations; pp. 178-184; Textile Research Journal, vol. 74; Feb. 2004.
Begenir, Asli; The Role of Orifice Design in Hydroentanglement; Thesis submitted to North Carolina State University; dated Dec. 2002, in 107 pages.
Borkent et al; Is there gas entrapped on submerged silicon wafers? Visualizing nano-scale bubbles with cavitation; pp. 225-228; Solid State Phenomena, vol. 134 (2008); available online Nov. 2007.
Bremond et al; Cavitation on surfaces; pp. S3603-S3608; Journal of Physics: Condensed Matter, vol. 17; Oct. 28, 2005.
Brennen, Christopher E.; Fission of collapsing cavitation bubbles; pp. 153-166; Journal of Fluid Mechanics, vol. 472; Dec. 2002.
Buchanan, "Closed-System Negative Pressure Irrigation: A Serious Inflection Point in Root Canal Cleaning," Apr. 1, 2020. https://www.dentistrytoday.com/articles/10666.
Chang et al; Effects of Inlet Surface Roughness, Texture, and Nozzle Material on Cavitation; pp. 299-317; Atomization and Sprays, vol. 16 (2006).
Charara, et al.: "Assessment of apical extrusion during root canal procedure with the novel GentleWave system in a simulated apical environment," J Endod 2015. In Press.
Crump et al., "Relationship of broken root canal instruments to endodontic case prognosis: a clinical investigation," J Am Dent Assoc 1970;80:1341-7.
Culjat et al., "B-Scan Imaging of Human Teeth Using Ultrasound," Apr. 2003, in 4 pages.
D'Arcangelo, et al.: "Broken instrument removal-two cases," J Endod 2000;26:368-70.
Didenkulov et al; Nonlinear Acoustic Diagnostics of Scatterer Spatial Distribution in a Cavitation Jet; Nov. 19-23, 2001, pp. 276-278, XI Session of the Russion Acoustical Society.
Divito et al.: "Cleaning and debriding efficacy of new radial and stripped tips using an Erbium laser on human root canal dentin walls—an in vitro study: SEM observations," undated.
Dumouchel, Christophe; On the experimental investigation on primary atomization of liquid streams; pp. 371-422; Experimental Fluids, vol. 45; Jun. 22, 2008.
Ebihara et al.: "Er:YAG laser modification of root canal dentine: Influence of pulse duration, repetitive irradiation and water spray," Lasers in Medical Science, 17(3), 198-207, Aug. 2002.
Eddingfield et al; Mathematical Modeling of High Velocity Water Jets; pp. 25-39; Proceedings of 1st U.S. Water Jet Conference; 1981.
EMS Electro Medical Systems, "Cleaning", in 2 pages, dated 2005, downloaded from http://www.ems-dent.com/en/endodontics cleaning. htm.
Esen, et al.: "Apical microleakage of root-end cavities prepared by CO2 laser," J Endod 2004;30:662-4.

ESI Endo Soft Instruments, EMS Electro Medical Systems, Brochure in 2 pages, downloaded from www.emsdent.com, dated Jan. 2004.
Feldman, et al.: "Retrieving broken endodontic instruments," J Am Dent Assoc. 1974:88:588-91.
Feng et al; Enhancement of ultrasonic cavitation yield by multi-frequency sonication; pp. 231-236; Ultrasonics Sonochemistry, vol. 9; Oct. 2002.
Flint, E. B., et al., "The Temperature of Cavitation", Science, vol. 253, Sep. 20, 1991, pp. 1397-1399.
Foldyna et al; Acoustic wave propagation in high-pressure system; pp. e1457-e1460; Ultrasonics vol. 44 (Supplement 1); Jun. 8, 2006.
Fors, et al.: "A method for the removal of broken endodontic instruments from root canals," J Endod 1983;9:156-9.
Fuchs, "Ultrasonic Cleaning: Fundamental Theory and Application," Blackstone-Ney Ultrasonics, Jamestown, NY, May 2002.
G.E. Reisman and C.E. Brennen, "Pressure Pulses Generated by Cloud Cavitation", FED—vol. 236, 1996 Fluids Engineering Division Conference, vol. 1, pp. 319-328, ASME 1996.
G.E. Reisman, Y.-C. Wang and C.E. Brennen, "Observations of shock waves in cloud cavitation", J. Fluid Mech. (1998), vol. 355, pp. 255-283.
Gencoglu, et al.: Comparison of the different techniques to remove fractured endodontic instruments from root canal systems. Eur J Dent 2009;3:90-5.
Ghassemieh et al; Effect of Nozzle Geometry on the Flow Characteristics of Hydroentangling Jets; pp. 444-450; Textile Research Journal, vol. 73; May 2003.
Ghassemieh et al; The effect of nozzle geometry on the flow characteristics of small water jets; pp. 1739-1753; Proceedings of the Institute of Mechanical Engineers, Part C: Mechanical Engineering Science, vol. 12, Sep. 2006.
Gordon, DMD, et al., "The antimicrobial efficacy of the erbium, chromium:yttrium-scandium-gallium-garnet laser with radial emitting tips on root canal dentin walls infected with Enterococcus faecalis," Research—Advances in Dental Products, JADA, vol. 138, Jul. 2007. RFT endolase, Root Calan Therapy System for the Waterlase MD YSGG Laser, Peer-Reviewed Clincal Articles.
Haapasalo, et al.: "Tissue dissolution by a novel multisonic ultra-cleaning system and sodium hypochlorite," J Endod 2014;40:1178-81.
Hahn et al; Acoustic resonances in the bubble plume formed by a plunging water jet; pp. 1751-1782; Proceedings of the Royal Society of London A, vol. 459; May 16, 2003.
Haikel, et al.: Dynamic and cyclic fatigue of engine-driven rotary nickel-titanium endodontic instruments. J Endod 1999;25:434-40.
Haikel, et al.: Dynamic fracture of hybrid endodontic hand instruments compared with traditional files. J Endod 1991;17:217-20.
Hashish, Mohamed; Experimental Studies of Cutting with Abrasive Waterjets; pp. 402-416; Proceedings of 2nd American Water Jet Conference; 1983.
Herbert et al; Cavitation pressure in water; pp. 041603-1 to 041603-22; Physical Review E, vol. 74; Oct. 2006.
Hiroyasu, Hiro; Spray Breakup Mechanism from the Hole-Type Nozzle and its Applications; pp. 511-527; Atomization and Sprays, vol. 10 (2000).
Hmud R. et al. "Cavitational Effects in Aqueous Endodontic Irrigants Generated by Near-Infrared Lasers", Journal of Endodontics, vol. 36, Issue 2, Feb. 2010, available online Dec. 4, 2009, in 4 pages.
Hoque et al; Air entrainment and associated energy dissipation in steady and unsteady plunging jets at free surface; pp. 37-45; Applied Ocean Research, vol. 30; May 2008.
Hulsmann, et al.: Influence of several factors on the success or failure of removal of fractured instruments from the root canal. Endod Dent Traumatol 199;15:252-8.
Hulsmann: "Methods for removing metal obstructions from the root canal," Endod Dent Traumatol 1993;9:223-37.
Hydrocision Products: SpineJet Hydrosurgery; system webpage in 2 pages, copyright 2010, downloaded from http://www.hydrocision.com on Apr. 22, 2010.
Hydrocision SpineJet XL HydroSurgery System; Brochure in 2 pages, copyright 2004-2006, downloaded from http://www.hydrocision.com on Apr. 22, 2010.

(56) References Cited

OTHER PUBLICATIONS

Iqbal, et al.: "A comparison of three methods for preparing centered platforms around separated instruments in curved canals," J Endod 2006; 32:48-51.
Jackson et al; Nozzle Design for Coherent Water Jet Production; pp. 53-89; Proceeding of the 2nd US Water Jet Conference; May 1983.
Jonathan, et al., "Comparative Evaluation of the Antibacterial Efficacy of Four Different DisinfectionTechniques in Minimally Instrumented Experimentally Infected Root Canals: An in vitro Study," International Journal of Laser Densitry, May-Aug. 2013; 3(2): 49-54.
Junge et al; Cell Detachment Method Using Shock-Wave-Induced Cavitation; pp. 1769-1776; Ultrasound in Medicine & Biology, vol. 29, No. 12; Dec. 2003.
Kalumuck et al; Development of High Erosivity Well Scale Cleaning Tools; pp. 1-36; Dynaflow, Inc.; Report 98012 conducted under Contract No. DE-FG07-981013684 for the US Dept. of Energy; Jul. 1999, in 36 pages.
Karasawa et al; Effect of Nozzle Configuration on the Atomization of a Steady Spray; pp. 411-426; Atomization and Sprays, vol. 2 (1992).
Kato, Hiroharu; Utilization of Cavitation for Environmental Protection—Killing Planktons and Dispersing Spilled Oil; pp. 1-8; In CAV2001: Fourth International Symposium on Caviation; California Institute of Technology, Pasadena, CA; dated Jun. 2001.
Kimura et al., "Lasers in endodontics: a review," International Endodontic Journal, 33, 173-185, 2000.
Lee et al; The efficacy of ultrasonic irrigation to remove artificially placed dentine debris from different-sized simulated plastic root canals; pp. 607-612; International Endodontic Journal, vol. 37; May 2004.
Li et al; Cavitation Resonance; pp. 031302-1 to 031302-7; Journal of Fluids Engineering, vol. 130; Mar. 2008.
Lienhard V et al; Velocity Coefficients for Free Jets From Sharp-Edged Orifices; pp. 13-17; Reprinted from Mar. 1984, vol. 106, Journal of Fluids Engineering.
Lin et al; Drop and Spray Formation from a Liquid Jet; pp. 85-105; Jan. 1998: vol. 30; Annual Review of Fluid Mechanics.
Linfield, Kevin William; A Study of the Discharge Coefficient of Jets From Angled Slots and Conical Orifices; Thesis submitted to Dept. of Aerospace Science and Engineering; University of Toronto; dated 2000; in 148 pages.
Lukac et al.: "Photoacoustic Endodontics Using the Novel SWEEPS Er:YAG Laser Modality," Journal of the Laser and Health Academy, vol. 2017, No. 1; www.laserlaserandhealth.com.
Lumkes, Jr., Control Strategies for Dynamic Systems: Design and Implementation, 2002, pp. 117-118.
Lussi et al; A new non-instrumental technique for cleaning and filling root canals; pp. 1-6; International Endodontic Journal, vol. 28; Jan. 1995.
Lussi et al; A Novel Noninstrumented Technique for Cleansing the Root Canal System; pp. 549-553; Journal of Endodontics, vol. 19, No. 11; Nov. 1993.
Lussi et al; In vivo performance of the new non-instrumentation technology (NIT) for root canal obturation; pp. 352-358; International Endodontic Journal, vol. 35; Apr. 2002.
Ma, et al.: "In vitro study of calcium hydroxide removal from mandibular molar root canals," J Endod 2015;41:553-8.
Madarati, et al.: "Efficiency of a newly designed ultrasonic unit and tips in reducing temperature rise on root surface during the removal of fractured files," J Endod 2009;35:896-9.
Madarati, et al.: "Management of intracanal separated instruments," J Endod 2013;39:569-81.
Madarati, et al.: "Qualtrough AJ. Factors contributing to the separation of endodontic files," Br Dent J 2008;204:241-5.
Maximum Dental Inc., "Canal Clean Max", "Intra Canal Irrigation and Aspiration Device", and "SonicMax, Endo-Perio Sonic Handpiece", in 3 pages, downloaded from www.dentalmaximum.com on May 8, 2008.

Molina, et al.: "Histological evaluation of root canal debridement of human molars using the GentleWaveTM system," J Endod 2015;41:1702-5.
Nammour et al.: "External temperature during KTP-nd:YAG laser irradiation in root canals: An in vitro study," Lasers in Medical Science, 19(1), 27-32, Jul. 2004.
Nevares, et al.: "Success rates for removing or bypassing fractured instruments: a prospective clinical study," J Endod 2012;38:442-4.
Ohrn et al; Geometric Effects on Spray Cone Angle for Plain-Orifice Atomizers; pp. 253-268; Atomization and Sprays, vol. 1 (1991).
Ohrn et al; Geometrical Effects on Discharge Coefficients for Plain-Orifice Atomizers; pp. 137-153; Atomization and Sprays, vol. 1, No. 2 (1991).
Phinney, Ralph E.; The breakup of a turbulent liquid jet in a gaseous atmosphere; pp. 689-701; J. Fluid Mechanics, vol. 60, Part 4; Oct. 1973.
Piezon Master 600 Ultrasound a la carte, EMS Electro Medical Systems, EMS SA FA-319.EN ed. Mar. 2009; Brochure dated Mar. 2009, in 2 pages.
Quinn, W. R.; Experimental study of the near field and transition region of a free jet issuing from asharp-edged elliptic orifice plate; pp. 583-614; European Journal of Mechanics—B/Fluids, vol. 26; Jul.-Aug. 2007; available online Dec. 2006.
Ramamurthi et al; Disintegration of Liquid Jets from Sharp-Edged Nozzles; pp. 551-564; Atomization and Sprays, vol. 4 (1994).
Reitz et al; Mechanism of atomization of a liquid jet; pp. 1730-1742; Physics Fluids, vol. 25, No. 10; Oct. 1982.
Roth, et al.: "A study of the strength of endodonitc files: potential for torsional breakage and relative flexibility," J Endod 1983; 9:228-32.
Ruddle, "Nonsurgical retreatment," J Endod 2004;30:827-45.
Sabeti, "Healing of apical periodontitis after endodontic treatment with and without obturation in dogs," Journal of Endodontics, Jul. 2006, pp. 628-633.
Sallam et al; Liquid breakup at the surface of turbulent round liquid jets in still gases; pp. 427-449; International Journal of Multiphase Flow, vol. 28; Mar. 2002.
Sawant et al; Effect of hydrodynamic cavitation on zooplankton: A tool for disinfection; pp. 320-328; Biochemical Engineering Journal, vol. 42, Issue 3; Dec. 2008.
Schoop et al., "The impact of an erbium, chromium: yttrium-scandium-gallium-garnet laser with radial-firing tips on endodontic treatment," Lasers in Medical Science, vol. 24(1):59-65, published online Nov. 20, 2007.
Schoop et al., "The use of the erbium, chromium:yttrium-scandium-gallium-garnet laser in endodontic treatment", JADA, vol. 138(7):949-955 (2007).
Schneider, et al.: "A comparison of canal preparations in straight and curved root canals," Oral Surg Oral Med Oral Pathol 1971;32:271-5.
Schneider, et al.: "NIH Image to ImageJ: 25 years of image analysis," Nat Methods 2012;9:671-5.
Shen, et al.: "Factors associated with the removal of fractured NiTi instruments from root canal systems," Oral Surg Oral Med Oral Pathol Oral Radiol Endod 2004;98:605-10.
Shi et al; Comparison-speed liquid jets; Experiments in Fluids, vol. 35; pp. 486-492; Oct. 7, 2003.
Skyttner, "Endodontic instrument separations: evaluation of a patient cases series with separatedendodontic instruments and factors related to the treatment regarding separated instruments [thesis]," Stockholm: Karolinska Institutet; 2007.
Sou et al; Effects of cavitation in a nozzle on liquid jet atomization; pp. 3575-3582; International Journal of Heat and Mass Transfer, vol. 50; Mar. 2007.
Souter, et al.: "Complications associated with fractured file removal using an ultrasonic technique," J Endod 2005;31:450-2.
Soyama et al; High-Speed Observation of Ultrahigh-Speed Submerged Water Jets; pp. 411-416; Experimental Thermal and Fluid Science, vol. 12 1996).
Soyama, Hitoshi; High-Speed Observation of a Cavitating Jet in Air; Journal of Fluids Engineering, vol. 127; pp. 1095-1101; Nov. 2005.

(56) References Cited

OTHER PUBLICATIONS

Stamos et al., "Retreatodontics and ultrasonics", Journal of Endodontics, vol. 14., No. 1, pp. 39-42, Jan. 1, 1988.
Stamos et al., "Use of ultrasonics in single-visit endodontic therapy," Journal of Endodontics, vol. 13, No. 5, pp. 246-249, May 1, 1987.
Summers, David A; Considerations in the Comparison of Cavitating and Plain Water Jets; pp. 178-184; Rock Mechanics and Explosive Research Center, Rolla, Missouri, 1983.
Summers, David A; The Volume Factor in Cavitation Erosion; Proceedings of 6th International Conference on Erosion by Liquid and Solid Impact; University of Missouri-Rolla; Rolla, Missouri, 1983, in 12 pages.
Suslick, K. S., et al., "The Sonochemical Hot Spot", Journal of the American Chemical Society, vol. 108, No. 18, Sep. 3, 1986, pp. 5641-5642.
Suslick, K. S., et al., "Heterogeneous Sonocatalysis with Nickel Powder", Journal of the American Chemical Society, vol. 109, No. 11, May 27, 1987, pp. 3459-3461.
Suter, et al.: "Probability of removing fractured instruments from root canals," Int Endod J 2005;38:112-23.
Tafreshi et al; Simulating Cavitation and Hydraulic Flip Inside Hydroentangling Nozzles; pp. 359-364; Textile Research Journal, vol. 74, Apr. 2004.
Tafreshi et al; Simulating the Flow Dynamics in Hydroentangling Nozzles: Effect of Cone Angle and Nozzle Aspect Ratio; pp. 700-704; Textile Research Journal, vol. 73; Aug. 2003.
Tafreshi et al; The effects of nozzle geometry on waterjet breakup at high Reynolds numbers; pp. 364-371; Experiments in Fluids, vol. 35; Sep. 2, 2003.
Takeda et al., "A comparative study of the removal smear layer by three endodontic irrigants and two types of laser," International Endodontic Journal, 32, 32 39, 1999.
Takeda et al., "Comparative Study about the Removal of Smear Layer by Three Types of Laser Devices," Journal of Clinical Laser Medicine & Surgery, vol. 16, No. 2, 1998 Mary Ann Liebert, Inc. pp 117-122.
Terauchi, et al.: "Evaluation of the efficiency of a new file removal system in comparison with two conventional systems," J. Endod 2007;33:585-8.
Ward Jr.: "The use of an ultrasonic technique to remove a fractured rotary nickel-titanium instrument from the apical third of a curved root canal," Aust Endod J 2003;29:25-30.
Wohlemuth et al.: "Effectiveness of GentleWave System in Removing Separated Instruments," JOE, vol. 41, No. 11, Nov. 2015.
Yoldas, et al.: "Perforation risks associated with the use of Masserann endodontic kit drills in mandibular molars," Oral Surg Oral Med Oral Pathol Oral Radiol Endod 2004;97:513-7.
Yu et al.: "Study on removal effects of filling materials and broken files from root canals using pulsed Nd:YAG laser," J Clin Laser Med Surg 2000;18:23-8.
Zehnder, "Root Canal Irrigants", Journal of Endodontics, vol. 32, No. 5, pp. 389-398, May 2006.
Zuo et al; An Attribution of Cavitation Resonance: Volumetric Oscillations of Cloud; pp. 152-158; Journal of Hydrodynamics, vol. 21; Apr. 2009.
European Extended Search Report re EP Application No. 09743801.4, dated Jun. 4, 2012.
European Extended Search Report re EP Application No. 14187012.1, dated Mar. 3, 2015, in 10 pages.
European Extended Search Report, dated Sep. 22, 2011, for EP Application No. 07755777.5, in 7 pages.
European Extended Search Report, re EP Application No. 08728345.3, dated Mar. 3, 2014.
European Extended Search Report, re EP Application No. 10830829.7, dated Oct. 21, 2015.
European Extended Search Report, re EP Application No. 11835265.7, dated Mar. 30, 2016, in 9 pages.
European Extended Search Report, re EP Application No. 13763534.8, dated Jan. 15, 2016.
International Search Report and Written Opinion dated Apr. 11, 2008, for International Appl. No. PCT/US07/09633, in 8 pages.
International Preliminary Report on Patentability dated Oct. 30, 2008, for International Appl. No. PCT/US07/09633, in 5 pages.
International Search Report and Written Opinion dated Aug. 8, 2008, for International Appl. No. PCT/US08/52122, in 18 pages.
International Preliminary Report on Patentability dated Aug. 6, 2009, for International Appl. No. PCT/US08/52122, in 13 pages.
International Search Report and Written Opinion dated Jul. 29, 2009, for International Appl. No. PCT/US09/43386, in 8 pages.
International Preliminary Report and Written Opinion dated Nov. 9, 2010 for International Appl. No. PCT/US09/43386, in 6 pages.
International Search Report and Written Opinion re App. No. PCT/US2010/056620, dated Jan. 12, 2011, in 17 pages.
International Preliminary Report on Patentability re App. No. PCT/US2010/056620, issued May 15, 2012, in 10 pages.
International Preliminary Report on Patentability, re PCT Application No. PCT/US11/57401, mailed Jan. 25, 2013 in 13 pages.
International Search Report and Written Opinion from International Application No. PCT/US2011/057401, Jan. 30, 2012, in 20 pages.
International Search Report and Written Opinion, re PCT Application No. PCT/US 13/32635, mailed Jun. 17, 2013 in 14 pages.
International Search Report and Written Opinion mailed Jun. 28, 2013, re PCT Application No. PCT/US2013/036493, in 21 pages.
International Preliminary Report on Patentability and Written Opinion, mailed Oct. 14, 2014, re PCT Application No. PCT/US2013/036493, in 14 pages.
International Search Report and Written Opinion, re PCT Application No. PCT/US2013/077286, mailed May 27, 2014.
International Preliminary Report on Patentability, re PCT Application No. PCT/US2013/077286, issued Jun. 23, 2015, in 8 pages.
International Search Report and Written Opinion re App. No. PCT/US2014/014732, mailed Jul. 18, 2014.
International Preliminary Report on Patentability re PCT Application No. PCT/US2014/014732, issued Aug. 4, 2015.
International Search Report and Written Opinion, re PCT Application No. PCT/US2014/044186, mailed Jan. 21, 2015, in 19 pages.
International Preliminary Report on Patentability, re PCT Application No. PCT/US2014/044186, mailed Dec. 29, 2015, in 19 pages.
International Search Report and Written Opinion, re PCT Application No. PCT/US2015/028360, mailed Sep. 28, 2015, in 25 pages.
International Search Report and Written Opinion, re PCT Application No. PCT/US2014/036451, mailed Jan. 21, 2015, in 20 pages.
Abad-Gallegos et al., "In vitro evaluation of the temperature increment at the external root surfaceafter Er,Cr:YSGG laser irradiation of the root canal", Med Oral Patol Oral Cir Bucal, vol. 14(12):658-662 (2009).
Abdelkarim-Elafifi et al., "Aerosols generation using Er,Cr:YSGG laser compared to rotary instruments in conservative dentistry: A preliminary study", J Clin Exp Dent, vol. 13(1):e30-6 (2021).
Altundasar et al., "Ultramorphological and histochemical changes after ER,CR:YSGG laser irradiation and two different irrigation regimes", Basic Research-Technology, vol. 32(5):465-468 (2006).
Arnabat et al., "Bactericidal activity of erbium, chromium: yttrium-scandium-gallium-garnet laser in root canals", Lasers Med Sci vol. 25:805-810 (2010).
Aydin, et al., "Fracture resistance of root-filled teeth after cavity preparation with conventional burs, Er:YAG and Er,Cr:YSGG Lasers," Eur Oral Res 2018; 52: 59-63.
Aydin et al., "Efficacy of erbium, chromium-doped yttrium, scandium, gallium and garnet laser-activated irrigation compared with passive ultrasonic irrigation, conventional irrigation, and photodynamic therapy against *Enterococcus faecalis*", ResearchGate, https://www.researchgate.net/publication/338906248, Article in The Journal of Contemporary Dental Practice, Jan. 2020.
Beader et al., "Efficacy of three different lasers on eradication of enterococcus faecalis and candida albicans biofilms in root canal system", ResearchGate, https://www.researchgate.net/publication/316287465, Article in Photomedicine and Laser Surgery, Apr. 2017.
Betancourt et al., "Er,Cr:YSGG laser-activated irrigation and passive ultrasonic irrigation:comparison of two strategies for root canal disinfection", Photobiomodulation, Photomedicine, and Laser Surgery, vol. 383(2):91-97 (2020).

(56) References Cited

OTHER PUBLICATIONS

Betancourt et al., "ER/Cr:YSGG laser-activation enhances antimicrobial and antibiofilm action of low concentrations of sodium hypochlorite in root canals", Antibiotics, vol. 8(232):1-10 (2019).

Biolase Study, Efficacy of the Er,Cr:YSGG laser in the Laser Assisted Endodontic Treatment, Blind Randomized Clinical Trial, in 332 pages, Apr. 11, 2014. URL: https://repositorio-aberto.up.pt/handle/10216/82757.

Bolhari et al., "Efficacy of Er,Cr:YSGG laser in removing smear layer and debris with two different output powers", Photomedicine and Laser Surgery, vol. 32(10):527-532 (2014).

Bornstein, Eric. "Proper use of Er: YAG lasers and contact sapphire tips when cutting teeth and bone: scientific principles and clinical application." Dentistry today 23.8 (2004): 84-89.

Cheng et al., "Evaluation of the bactericidal effect of Nd:YAG, Er:YAG, Er,Cr:YSGG laser radiation, and antimicrobial photodynamic therapy (aPDT) in experimentally infected root canals", Lasers in Surgery and Medicine, vol. 44:824-831 (2012).

Christo, Jonathan Dr., "Efficacy of Sodium Hypochlorite and Er,Cr:YSGG Laser Energised Irrigation Against an Enterococcus faecalis Biofilm", Sep. 2012.

Christo et al., "Efficacy of low concentrations of sodium hypochlorite and low-powered Er,Cr:YSGG laser activated irrigation against an *Enterococcus faecalis* biofilm", International Endodontic Journal, vol. 49:279-286 (2016).

De Groot, et al., "Laser-activated irrigation within root canals: cleaning efficacy and flow visualization," Int Endod J. 2009;42:1077-83.

De Moor et al., "Laser induced explosive vapor and cavitation resulting in effective irrigation of the root canal. Part 2: Evaluation of the efficacy", Lasers in Surgery and Medicine, vol. 41:520-523 (2009).

De Moor et al., "Efficacy of ultrasonic versus laser-activated irrigation to remove artificially placed dentin debris plugs", Basic Research Technology, JOE vol. 36(9):1580-1583 (2010).

Dewsnup et al., "Comparison of bacterial reduction in straight and curved canals using erbium,chromium:Yttrium-Scandium-Gallium-Garnet laser treatment versus a traditional irrigation technique with sodium hypochlorite", Basich Research-Technology, JOE, vol. 36(4):725-728 (2010).

Divito et al., "The Photoacoustic Efficacy of an Er:YAG Laser with Radial and Stripped Tips on Root Canal Dentin Walls: An SEM Evaluation," J Laser Dent 2011; 19(1):156-161.

El-Din, et al., "Antibacterial Effect of Er,Cr:YSGG Laser Under Various Irradiation Conditions in RootCanals Contaminated With Enterococcus Faecalis," Alexandria Dental Journal. (2017) vol. 42 pp. 108-112.

Erken, "Evaluation of apically extruded debris using two niti systems associated with two irrigation techniques in primary teeth", ResearchGate, https://www.researchgate.net/publication/310465261, The Journal of Clinical Pediatric Dentistry, Nov. 2016.

Fogarty, "What is an acoustic wave?", https://www.allthescience.org/what-is-an-acoustic-wave.htm, 7 pages (2022).

George, M.D.Sc., Ph.D, et al., "Thermal Effects from Modified Endodontic Laser Tips Used in the Apical Third of Root Canals with Erbium-Doped Yttrium Aluminium Garnet and Erbium, Chromium-Doped Yttrium Scandium Gallium Garnet Lasers," Photomedicine and Laser Surgery vol. 28, No. 2, 2010, ª Mary Ann Liebert, Inc., pp. 161-165.

George et al., "Laser activation of endodontic irrigants with improved conical laser fiber tips forremoving smear layer in the apical third of the root canal", Basic Research-Technology, JOE, vol. 34(12):1524-1521 (2008).

George et al., Apical extrusion of root canal irrigants when using Er:YAG and ER,Cr:YSGG lasers with optical fibers: An in vitro dye study, Basic Research-Technology, JOE, vol. 34(6):706-708 (2008).

Gregorcic et al., "Optodynamic energy-conversion efficiency during an Er: YAG-laser-pulse delivery into a liquid through different fiber-tip geometries." Journal of biomedical optics 17.7 (2012): 075006.

Guidotti R, et al., "Er:YAG 2,940-nm laser fiber in endodontic treatment: a help in removing smear layer," Lasers Med Sci. 2014;29:69-75.

Ishizaki et al., "Thermographical and morphological studies of Er,Cr:YSFF laser irradiation on root canal walls", Photomedicine and Laser Surgery, vol. 22(4):291-297 (2004).

Jlad, Fall 2015, Issue 3.

Jiang, et al., "Evaluation of A Sonic Device Designed to Activate Irrigant in the Root Canal," Journal of endodontics, 36(1): 143-146, Jan. 2010.

Koch et al., "Irrigant flow during photon-induced photoacoustic streaming (PIPS) using Particle Image Velocimetry (PIV)", Clin. Oral Invest. vol. 20:381-386 (2016).

Kolnick, Justin. "Managing Refractory Endodontic Disease With Radial Apical Cleansing (Report Of Two Clinical Cases)." (Sep. 2018).

Kourti, E. et al., "Smear Layer Removal By Means of Erbium, Chromium: Yttrium Scandium GalliumGarnet (er,Cr:YSGG) Laser Irradiatin From Apical Third of Mesial Root Canals," International Journal of Recent Scientific Research, vol. 12, Issue, 05, p. 41804-41808, May 2021.

Kustarci et al., "Efficacy of laser activated irrigation on apically extruded debris with different preparation systems", Photomedicine and Laser Surgery, vol. 33(7):384-389 (2015).

Licata et al., "Effectiveness of a new method of disinfecting the root canal, using Er,Cr:YSGG laser to kill Enterococcus faecaslis in an infected tooth model", ResearchGate, https://www.researchgate.net/publication/255688995, Article in Lasers in Medical Science, Aug. 2013.

Lopes et al., "Evaluation of chemical and morphological changes in radicular dentin after different final surface treatments", Micros. Res. Tech. vol. 81:973-979 (2018).

Lukac, et al., "Modeling Photoacoustic Efficiency during Erbium Laser Endodontics," Journal of the Laser and Health Academy, vol. 2013, No. 2.

Lukac, et al., "Wavelength dependence of photoninduced photoacoustic streaming technique for root canal irrigation," Journal of Biomedical Optics 21(7), 075007 (Jul. 2016).

Macedo et al., "Cavitation measurement during sonic and ultrasonic activated irrigation", Journal of Endodontics, vol. 40(4):580-583 (2014).

Martins et al., "Outcome of Er,Cr:YSGG laser-assisted treatment of teeth with apical periodontitis: A blind randomized clinical trial", Photomedicine and Laser Surgery, vol. 32(1):3-9, (2014).

Martins et al., "Efficacy of Er,Cr:YSGG laser with endodontical radial firing tips on the outcome of endodontic treatment: blind randomized controlled clinical trial with six-month evaluation", Lasers Med Sci vol. 28:1049-1055 (2013).

Matsumoto, et al. "Visualization of irrigant flow and cavitation induced by Er: YAG laser within a root canal model." Journal of endodontics 37.6 (2011): 839-843.

Matsuoka et al., "Morphological study of the Er,Cr:YSGG laser for root canal preparation inmandibular incisors with curved root canals", Photomedicine and Laser Surgery, vol. 23(5):480-484 (2005).

Merigo, et al., "Bactericidal effect of Er,Cr:YSGG laser irradiation on endodontic biofilm: An ex vivo study," Journal of Photochemistry & Photobiology, B: Biology 218 (2021) 112185.

Minas et al., "In vitro investigation of intra-canal dentine-laser beam interaction aspects: II. Evaluation of ablation zone extent and morphology", Lasers Med Sci vol. 25:867-872 (2010).

Montero-Miralles, et al., "Comparative study of debris and smear layer removal with EDTA and Er,Cr:YSGG laser," J Clin Exp Dent. 2018; 10(6):e598-602.

Mrochen, et al. "Erbium: yttrium-aluminum-garnet laser induced vapor bubbles as a function of thequartz fiber tip geometry Erbium: yttrium-aluminum-garnet laser induced vapor bubbles as a function of the quartz fiber tip geometry." Journal of biomedical optics 6.3 (2001): 344-350.

Nagahashi et al., "Er:YAG laser-induced cavitation can activate irrigation for the removal of intraradicular biofilm", Scientific Reports, https://doi.org/10.1038/s41598-022-08963-x, pp. 1-11 (2022).

(56) References Cited

OTHER PUBLICATIONS

Nasher et al., "Debris and smear layer removal in curved root canals using the dual wavelength Er,Cr:YSGG/Diode 940 nm laser and the XP_Endoshaper and finisher technique", ResearchGate, https://www.researchgate.net/publication/338755431, Article in Photobiomodulation Photomedicine and Laser Surgery, Jan. 2020.
Nowazesh et al., "Efficacy of root canal preparation by Er,Cr:YSGG laser irradiation with crown-down technique in Vitro", Photomedicine and Laser Surgery, vol. 23(2):196-201 (2005).
Olivi, et al., "Lasers in Endodontics," Scientific Background and Clinical Applications, 2016.
Oral Health, Special Issue, Laser Dentistry, Photo-Acoustic, Root Canal, Decontamination, in 52 pages.
Peeters et al., "Efficacy of smear layer removal at the root tip by using ethylenediaminetetraaceticacid and erbium, chromium: Yttrium, candium, and gallium garnet laser", Basic Research-Technology, JOE, vol. 37(11):1585-1589 (2011).
Peeters, et al., "Measurement of temperature changes during cavitation generated by an erbium, chromium: Yttrium, scandium, gallium garnet laser," OJST. 2012;2:286-91.
Peeters et al., "Extrusion of irrigant in open apex teeth with periapical lesions following laser-activated irrigation and passive ultrasonic irrigation", Iranian Endodontic Journal, vol. 13(2):169-175 (2018).
Peeters et al., "Measurement of pressure changes during laser-activated irrigant by an erbium,chronium: yttrium, scandium, gallium, garnet laser", Lasers in Medical Science, DOI 10.1007/s10103-014-1605-5, Received Jan. 23, 2014, Springer-Verlag London.
Peeters et al., "Radiographic examination of apical extrusion of root canal irrigants during cavitation induced by Er,Cr:YSGG laser irradiation: an in vivo study", Clin Oral Invest vol. 17:2105-2112 (2013).
Prasad, et al., Introduction to biophotonics. John Wiley & Sons, 2003.
Race et al., "Efficacy of laser and ultrasonic-activated irrigation on eradicating a mixed-species biofilm in human mesial roots", Australian Endodontic Journal, vol. 45:317-324 (2019).
Rahimi et al., "Comparison of the effect of Er,Cr-YSGG laser ultrasonic retrograde root-end cavity preparation on the integrity of root apices", Journal of Oral Science, vol. 52(1):77-81 (2010).
Roots—international magazine of endodontics, Issn 2193-4673, vol. 15, Issue Apr. 2019.
Seet, et al., "An in-vitro Evaluation of the Effectiveness of Endodontic Irrigants, with and without Sonic and Laser Activation, in the Eradication of Enterococcus faecalis Biofilm", A report submitted to the University of Adelaide in partial fulfilment of the requirements of the Degree of Doctor of Clinical Dentistry, in 132 pages.
Sen et al., "Comparative safety of needle, EndoActivator, and laser-activated irrigation in overinstrumented root canals", Photomedicine and Laser Surgery, vol. 36(4):198-202 (2018).
Shaheed, et al., "Healing of Apical Periodontitis after Minimally Invasive Endodontics therapy using Er, Dr:YSGG laser: A Prospective Clinical Study," Sys Rev Pharm 2020; 11(2): 135-140.
Sigma-Aldrich, Product Specification, 2-propanol SDS, Product No. 190764.
Silva, et al., "Analysis of Permeability and Morphology of Root Canal Dentin After ER,Cr:YSGG Laser Irradiation," Photomedicine and Laser Surgery vol. 28, No. 1, pp. 103-108, 2010.
Soares et al., "Impact of Er,Cr:YSGG laser therapy on the cleanliness of the root canal walls of primary teeth", Basic Research-Technology, JOE, vol. 34(4):474-477 (2008).
Thoms, "Detection of intraoral lesions using a fluorescence camera", Proceedings of SPIE, vol. 6137:1-8 (2006).
Tokuc et al., "The bactericidal effect of 2780 nm Er,Cr:YSGG laser combined with 940 nm diode laserin *Enterococcus faecalis* elimination: A comparative study", Photobiomodulation, hotomedicine, and Laser Surgery, vol. XX(XX):1-6 (2019).
Vibration definition & meaning, Merriam-Webster, https://www.merriam-webster.com/dictionary/vibration (2023).

Merriam Webster definition of transversal, https://www.merriam-webster.com/dictionary/transversal , (2024).
Wang et al., "Evaluation of the bactericidal effect of Er,Cr:YSGG, and Nd:YAG lasers in experimentallyl infected root canals", Basic Research-Biology, JOE, vol. 33(7):830-832 (2007).
Yamazaki et al., "Effects of erbium, chromium:YSGG laser irradiation on root canal walls: A scanning electron microscopic and thermographic study", Journal of Endodontics, vol. 27(1):9-12 (2001).
European Extended Search Report, dated Mar. 8, 2018, for EP Application No. 17201637.0.
Examination Communication in European application No. 17201637.0, dated Apr. 2, 2019, in 5 pages.
European Search Report, re EP Application No. 13763534.8, dated Jun. 20, 2022.
European Extended Search Report, re EP Application No. 13775073.3, dated Nov. 3, 2015.
European Exam Report, re EP Application No. 14733409.8, dated May 3, 2018.
European Exam Report, re EP Application No. 14742409.7, dated Aug. 21, 2018.
International Preliminary Report on Patentability, re PCT Application No. PCT/US2014/036451, issued Nov. 3, 2015, 2015, in 11 pages.
International Preliminary Report on Patentability, re PCT Application No. PCT/US2015/028360, Issued Nov. 10, 2016, in 14 pages.
European Extended Search Report, re EP Application No. 18159618.0, dated Jul. 2, 2018.
European Extended Search Report, re EP Application No. 18195055.1, dated Mar. 13, 2019.
International Search Report and Written Opinion for PCT/US2021/072194, mailed on Jan. 27, 2022, in 15 pages.
International Preliminary Report on Patentability and Written Opinion for PCT/US2021/072194, dated May 8, 2023, in 12 pages.
European Extended Search Report, re EP Application No. 14765398.4, dated May 31, 2017.
European Supplemental Search Report, re EP Application No. 07837261.2, dated May 3, 2012.
European Supplemental Search Report, re EP Application No. 10746978.5, dated Dec. 10, 2015.
European Extended Search Report, EP Application No. 20176387.7, dated Oct. 29, 2020.
International Search Report and Written Opinion, re PCT Application No. PCT/US2017/057206, mailed Jan. 25, 2018, in 18 pages.
International Search Report and Written Opinion, re PCT Application No. PCT/US2018/050753, mailed Dec. 5, 2018, in 35 pages.
International Search Report and Written Opinion, re PCT Application No. PCT/US07/18664, mailed Sep. 23, 2008.
International Preliminary Report on Patentability, re PCT Application No. PCT/US07/18664, issued Feb. 24, 2009.
International Search Report and Written Opinion, re PCT Application No. PCT/US2014/030435, mailed Aug. 28, 2014.
International Preliminary Report on Patentability, re PCT Application No. PCT/US2014/030435, issued Sep. 15, 2015.
International Search Report and Written Opinion, re PCT Application No. PCT/US2010/025775, mailed Apr. 23, 2010.
International Preliminary Report on Patentability, re PCT Application No. PCT/US2010/025775, issued Sep. 6, 2011.
International Preliminary Report on Patentability, re PCT Application No. PCT/US2019/052990, issued Mar. 23, 2021.
International Invitation to Pay Additional Fees, re PCT Application No. PCT/US2019/052990, mailed Dec. 5, 2019.
International Search Report and Written Opinion, re PCT Application No. PCT/US2019/052990, mailed Feb. 6, 2020.
International Preliminary Report on Patentability, re PCT Application No. PCT/US2017/057206, issued on Apr. 23, 2019, in 8 pages.
International Preliminary Report on Patentability, re PCT Application No. PCT/US2018/050753, issued Mar. 17, 2020, in 10 pages.
International Search Report and Written Opinion, re PCT Application No. PCT/US2019/035884, mailed Sep. 12, 2019, in 18 pages.
International Preliminary Report on Patentability, re PCT Application No. PCT/US2019/035884, issued Dec. 8, 2020, in 1 pages.

(56) References Cited

OTHER PUBLICATIONS

International Invitation to Pay Additional Fees, re PCT Application No. PCT/US2020/033837, mailed Sep. 3, 2020.
International Search Report and Written Opinion, re PCT Application No. PCT/US2020/033837, mailed Oct. 28, 2020.
International Search Report and Written Opinion, re PCT Application No. PCT/US2020/031189, mailed Jul. 31, 2020, in 17 pages.
International Search Report and Written Opinion, re PCT Application No. PCT/US2020/033157, mailed Aug. 26, 2020, in 17 pages.
International Invitation to Pay Additional Fees, re PCT Application No. PCT/US2020/036491, mailed Sep. 18, 2020.
International Search Report and Written Opinion, re PCT Application No. PCT/US2020/036491, mailed Nov. 9, 2020.
International Preliminary Report on Patentability, re PCT Application No. PCT/IL2013/050330, dated Oct. 30, 2014.
International Preliminary Report on Patentability, re PCT Application No. PCT/IL2014/050924, dated May 6, 2016.
International Search Report and Written Opinion, re PCT Application No. PCT/IL2013/050330, mailed Jul. 30, 2013.
International Search Report and Written Opinion, re PCT Application No. PCT/IL2014/050924, mailed Mar. 19, 2015.
International Search Report and Written Opinion for PCT/US2021/053844, dated Mar. 11, 2022, in 22 pages.
Extended European Search Report and Written Opinion for European Application No. 21175783.6, dated Dec. 13, 2021, in 8 pages.
Extended European Search Report for European Application No. 22167511.9, dated Aug. 11, 2022, in 8 pages.
European Search Report in application No. EP 21160099.4, dated Sep. 26, 2022.
European Search Report in application No. EP 201902210.0, dated Jan. 5, 2023.
European Search Report in application No. EP 22216260.4, dated Jul. 12, 2023, in 8 pages.
Extended European Search Report in application No. EP 23178563.5, dated Dec. 6, 2023, in 7 pages.
European Search Report in application No. EP 18789278.1, dated Jan. 24, 2024, in 7 pages.
European Search Report in application No. EP 23214493.1, dated Jun. 11, 2024, in 8 pages.
Extended European Search Report in application No. EP 24164011.9, dated Aug. 21, 2024, in 8 pages.
International Search Report and Written Opinion in application No. PCT/US2024/023144, mailed on Sep. 12, 2024, in 22 pages.
Extended European Search Report in application No. EP 24181269, dated Dec. 11, 2024, in 10 pages.
Biolase's Opening Brief in Support of Its Motion for Leave to File Early Motion for Summary Judgmentand for Limited Stay Pending Resolution of Early Motin for Summary Judgment, *Pipstek, LLC* v. *Biolase, Inc.*, Civil Action No. 23-011-JPM, filed Feb. 2, 2024.

* cited by examiner

APPARATUS AND METHODS FOR CLEANING TEETH

CROSS-REFERENCE TO RELATED APPLICATIONS

This application claims the benefit of U.S. Provisional Patent Application No. 61/614,463, filed Mar. 22, 2012, entitled "APPARATUS AND METHODS FOR CLEANING TEETH," which is hereby incorporated by reference herein in its entirety and for all purposes.

BACKGROUND

Field

The present disclosure relates generally to dentistry, and in particular, to apparatus, methods, and compositions for treating one or more teeth.

Description of the Related Art

Dental caries, also known as tooth decay or a cavity, is one of the most common chronic diseases in the world. Caries is an infection that causes demineralization of the hard tissues (e.g., enamel, dentin and cementum) and destruction of the organic matter of the tooth, often by production of acid by hydrolysis of the food debris accumulated on the tooth surface. If demineralization exceeds remineralization from saliva, or from other factors such as the use of calcium and fluoridated toothpastes, these tissues may progressively break down, producing dental caries (e.g., cavities or holes in the teeth). If left untreated, the disease can lead to pain, tooth loss and infection. While caries may be directly visible, the caries and its extent of destruction may be detected and evaluated by imaging, e.g. radiographs, as well as by tactile inspection. Caries may form and develop anywhere on the tooth, e.g., occlusal surfaces (pits and fissure caries), proximal and cervical surfaces (smooth surface caries), root surfaces, etc.

Caries or cavities may progress in various stages. For example, early stage caries may be non-cavitated, in which decay has progressed within the enamel, but not below the enamel into dentin. If the caries do not progress any further, then no or minimal treatment may be adequate. However, if there is further progression into the enamel, then treatments, such as the application of a sealant and/or antimicrobial or fluoride agents, may be desirable. If the decay progresses below the enamel and into the dentin, but not reaching the pulp, then a clinician can treat the tooth by restoring the tooth and applying antimicrobial and/or fluoride agents. For caries that progress into the pulpal cavity, endodontic treatment is often advised.

Dental caries generally contain bacteria and their byproducts, food remnants, healthy tissue and decayed tissue, and may include other organic and/or inorganic materials. Organic material (or organic matter) includes organic substances typically found in healthy or diseased teeth or root canal systems such as, for example, soft tissue, blood vessels, nerves, connective tissue, cellular matter, pus, microorganisms, bacteria, biofilms, and plaque, whether living, inflamed, infected, diseased, necrotic, or decomposed. Inorganic matter includes calcified tissue and calcified structures, calculus, tartar, etc., which are frequently present in or on teeth.

Current treatment techniques generally include mechanical removal of the caries and diseased tissue (e.g., using dental burs, excavators, etc.), which may expose healthy dentin. However, the bur (or other mechanical instrument) may not differentiate between diseased and healthy dentin, and other instruments such as excavators and explorers may not be able to accurately determine the extent to which drilling should continue. This may result in either incomplete removal of caries or overly-aggressive removal of healthy dentin, which may in turn reduce the longevity of the tooth.

The removed portions of the tooth can then be filled with solid matter such as composite, resin, gold, porcelain, etc., and the tooth can be restored. However, this procedure may not remove all decayed material from the tooth, which can lead to inadequate bonding of the restorative material and therefore bacterial leakage and subsequently post-procedure complications such as infection. In addition, the use of a dental drill and anesthetics may be uncomfortable to the patient. Accordingly, it can advantageous to provide improved methods and apparatus for treating dental caries.

SUMMARY

Various non-limiting aspects of the present disclosure will now be provided to illustrate features of the disclosed apparatus, methods, and compositions. Examples of apparatus, methods, and compositions for endodontic treatments are provided.

In one embodiment, a system for treating a tooth having a carious region is disclosed. The system can include a fluid platform having a chamber sized and shaped to retain fluid. The chamber can be configured to be coupled to and at least partially seal against an external surface of the tooth over the carious region. A pressure wave generator can have a distal end configured to be positioned in the chamber. The pressure wave generator can be configured to generate pressure waves in the retained fluid sufficient to clean the carious region.

In another embodiment, a method for treating a tooth having a carious region is disclosed. The method can include applying a cap over the carious region of the tooth. The cap can include a chamber. At least a portion of the cap can be sealed to an exterior surface the tooth. The method can further include at least partially filling the chamber with fluid. A pressure wave generator can be positioned in the chamber such that at least a portion of the pressure wave generator is immersed in fluid in the chamber. The pressure wave generator can be activated in the chamber to clean the carious region of the tooth.

In yet another embodiment, a method for cleaning a carious region on a tooth is disclosed. The carious region can be disposed in a space at least partially between two adjacent teeth. The method can include retaining fluid in the space. The method can further include propagating pressure waves through the retained fluid in the space to substantially clean the carious region.

In another embodiment, a system for cleaning a carious region of a tooth is disclosed. The carious region can be disposed in a space at least partially between two adjacent teeth. The system can comprise a fluid retainer configured to at least partially retain fluid in the space. The system can also include a pressure wave generator configured to propagate pressure waves through the retained fluid in the space between the teeth to clean the carious region.

In another embodiment, a method for cleaning a carious region of a tooth is disclosed. The method can comprise directing a high-speed liquid jet against the tooth at or near the carious region on an exterior surface of the tooth. The method can further include maintaining the liquid jet in contact with the tooth at or near the carious region until substantially all of the carious region is removed.

Accordingly, it can be advantageous to remove diseased tissue while maintaining the healthy tissue so as to preserve the structural integrity of the tooth as much as possible. The systems and methods described herein present various embodiments of such solutions. Furthermore, the disclosed systems and methods may also be combined with traditional techniques. For example, after cleaning the tooth using the disclosed embodiments, a bur may additionally be used to shape the cavity and prepare it for restoration. As another example, fluoride therapy or other mineralization therapies may be performed after removing the caries using the disclosed embodiments to further enhance the recovery process.

For purposes of this summary, certain aspects, advantages, and novel features of certain disclosed inventions are summarized. It is to be understood that not necessarily all such advantages may be achieved in accordance with any particular embodiment of the invention. Thus, for example, those skilled in the art will recognize that the inventions disclosed herein may be embodied or carried out in a manner that achieves one advantage or group of advantages as taught herein without necessarily achieving other advantages as may be taught or suggested herein. Further, the foregoing is intended to summarize certain disclosed inventions and is not intended to limit the scope of the inventions disclosed herein.

BRIEF DESCRIPTION OF THE DRAWINGS

The foregoing and other features, aspects, and advantages of the embodiments of the apparatus and methods of cleaning teeth are described in detail below with reference to the drawings of various embodiments, which are intended to illustrate and not to limit the embodiments of the invention. The drawings comprise the following figures in which.

Throughout the drawings, reference numbers may be re-used to indicate a general correspondence between referenced elements. The drawings are provided to illustrate example embodiments described herein and are not intended to limit the scope of the disclosure.

DETAILED DESCRIPTION

The present disclosure describes apparatus, methods, and compositions for performing dental procedures, including preventative, restorative, endodontic, periodontic and other types of dental procedures. For example, the embodiments disclosed herein can be used to efficiently and non-invasively remove organic and/or inorganic matter from (and/or to disinfect) a carious region of one or more teeth, e.g., a region of the teeth having tooth decay. The carious region of the teeth may be on outer surfaces of the teeth, including, e.g., proximal, occlusal, buccal, and/or lingual surfaces. The disclosed embodiments can remove substantially the entire carious region from the teeth without harming healthy portions of the tooth, and without causing the significant pain or discomfort that often results from conventional techniques.

I. Overview of Various Disclosed Embodiments

Figure 1A:
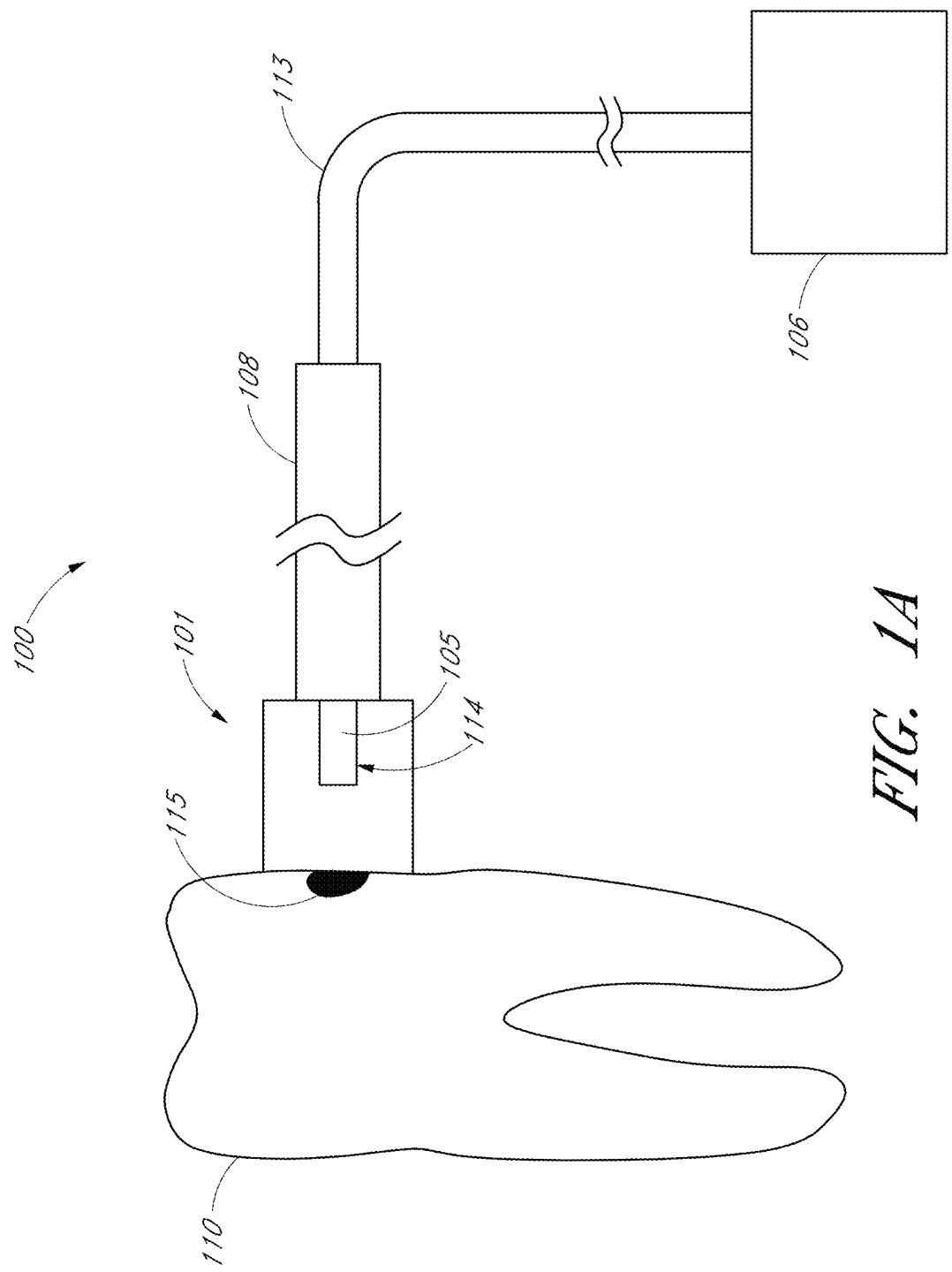
FIG. 1A illustrates a schematic diagram of a dental system that includes components capable of removing a carious region from a tooth.

FIG. 1A illustrates a schematic diagram of a dental system 100 that includes components capable of removing a carious region 115 from a tooth 110. Advantageously, the system 100 can remove the carious region 115 in a non-invasive manner without damaging healthy portions of the tooth 110, and the system 100 can more thoroughly remove the carious region 115 than conventional systems. Indeed, the disclosed system 100 can clean carious regions 115 on any suitable surface of the tooth, including surfaces that are hard to treat using conventional systems.

The system 100 can include a console 106, a handpiece 108, an active energy outlet 114, and a fluid platform 101 configured to couple to the tooth 110 to be treated. The active energy outlet 114 can include a pressure wave generator 105, a fluid motion source, or both. The pressure wave generator 105 can be configured to generate pressure waves, and the fluid motion source can be configured to create movement of the fluid in the chamber, turbulence in the fluid in the chamber, circulation of the treatment fluid in the chamber and/or produce other dynamics in the fluid in the chamber. For example, the active energy outlet 114 can be configured to introduce fresh treatment liquid to the treatment site and/or to remove waste fluids from the treatment site. In some embodiments, the ingress and egress of treatment fluid from the treatment site is provided through one or more ports in the fluid platform 101. Additionally, in some embodiments, the pressure wave generator 105 can create movement of the fluid in the chamber (that is, also function as a fluid motion source), as explained further below. The console 106 can be in electrical, electromagnetic, photonic, and/or fluid communication with the handpiece 108 by way of, e.g., various conduits 113 (e.g., fluid conduits, fiber optics, optical mirrors, and/or electrical wires) and can supply the handpiece 108 with treatment fluid, electrical power, control signals, etc. For example, the console 106 can include a fluid reservoir, a degassing system configured to remove dissolved gases from the treatment fluid, a pump, one or more sensors configured to measure properties of the treatment fluid, a mixing system, a controller configured to control the operation of the treatment procedure, and a user interface. A clinician can interact with the user interface of the console 106 to operate the system 100 and to manage the treatment procedure. For example, the clinician can use the console 106 to control and monitor various parameters of the treatment procedure, such as the supply of treatment fluid to the fluid platform 101, the activation of the pressure wave generator 105 to clean the tooth 110, the current status of the procedure, and other suitable parameters.

The clinician can apply the fluid platform 101 to the treatment of one or more teeth 110. In some embodiments, the fluid platform 101 can be part of the handpiece 108, in which case the clinician can use the handpiece 108 to couple the fluid platform 101 to the tooth 110. In other embodiments, the fluid platform 101 can be separate from the handpiece 108 and can be applied to the tooth 110 without using the handpiece 108. The clinician can use the handpiece 108 to position the pressure wave generator 105 near or against the tooth 110 and to manipulate the fluid platform 101 and/or pressure wave generator 105 during treatment. The pressure wave generator 105 can be activated to generate pressure waves in, on, or through the fluid platform 101. In various embodiments, the fluid platform 101 can facilitate the cleaning procedure by retaining treatment fluid to act as a medium for propagation of the pressure waves generated by the pressure wave generator 105. In addition, the fluid platform 101 can include various components for facilitating aspiration, irrigation, fluid movement within the fluid platform 101, and/or the mixing of fluids before, during, and/or after treatment.

As explained herein with reference to the disclosed embodiments, the disclosed system 100 can thereby be configured to remove substantially all of a carious region 115 from a tooth 110, regardless of the surface on which the carious region 115 is formed. Advantageously, the cleaning procedure can remove the carious region 115 non-invasively without damaging healthy tooth matter and without otherwise harming the patient. Using a pressure wave generator 105 and fluid platform 101 to remove caries can advantageously allow clinicians to treat caries without mechanically (or otherwise) exploring the tooth surface, which can harm the tooth 110 if healthy dentin or other parts of the tooth 110 are damaged.

Additionally, the disclosed embodiments can enable a clinician to detect caries that may otherwise be difficult to find. For instance, if the existence of caries is suspected, but not positively identified, in a particular tooth 110 (e.g., on a proximal or occlusal surface), conventional techniques often involve the use of invasive tools and procedures to confirm the existence of the caries before treating the tooth. In the embodiments disclosed herein, the system 100 (e.g., the fluid platform 101) can be applied to the tooth 110 and can remove the caries at an early stage without requiring any invasive instruments to be used. For example, if a region of the tooth 110 is suspected as including caries, the fluid platform 101 can be applied to the tooth 110 to remove even undetected and/or unconfirmed caries from the tooth 110.

Furthermore, the cleaning and disinfecting of both non-cavitated and cavitated caries can be performed non-invasively. Although non-cavitated caries may undergo no or minimal treatment using conventional dental techniques, the embodiments disclosed herein can stop or slow the progression of non-cavitated caries into more substantial decay, helping to maintain the health of the tooth 110. Moreover, the embodiments disclosed herein can clean and disinfect cavitated caries without removing substantially any healthy dentin. The gentle action of the technology can clean deep cavities near the pulp with no or minimal risk of breaking the thin dentin wall and exposing the pulp. The disclosed embodiments can also clean the decayed dentin and caries underneath the enamel without requiring the removal of healthy and salvageable enamel, e.g., the disclosed pressure wave generators can generate pressure waves that can propagate through the already-existing hole in the enamel to clean beneath the enamel.

Various details of pressure wave generators and fluid platforms can be found in U.S. patent application Ser. No. 11/737,710, filed Apr. 19, 2007, published Oct. 25, 2007, as U.S. Patent Publication No. 2007/0248932, entitled "APPARATUS AND METHODS FOR TREATING ROOT CANALS OF TEETH;" in U.S. patent application Ser. No. 12/945,791, filed Nov. 12, 2010, published May 19, 2011, as U.S. Patent Publication No. US 2011/0117517, entitled "LIQUID JET APPARATUS AND METHODS FOR DENTAL TREATMENTS;" in U.S. patent application Ser. No. 13/279,199, filed Oct. 21, 2011, published Sep. 20, 2012, as U.S. Patent Publication No. 2012/0237893, titled "APPARATUS, METHODS, AND COMPOSITIONS FOR ENDODONTIC TREATMENTS;" in U.S. Provisional Patent Application No. 61/767,746, filed Feb. 21, 2013, entitled "APPARATUS AND METHODS FOR SEALING TEETH;" and in U.S. Provisional Patent Application No. 61/614,463, filed Mar. 22, 2012, entitled "APPARATUS AND METHODS FOR CLEANING TEETH," each of which is incorporated by reference herein in its entirety and for all purposes.

II. Example Features of the Disclosed Systems

A. Example Fluid Platforms

As explained herein, various fluid platforms can be used to clean carious regions from one or more teeth. Various components of such fluid platforms 101 are described herein. Note that the components of the fluid platforms 101 disclosed herein are generally applicable and suitable for each embodiment disclosed herein, e.g., the embodiments of FIGS. 1A-10. This disclosure should not be interpreted as limiting a particular feature of a fluid platform 101 to any particular embodiment disclosed herein.

In some embodiments, the fluid platform 101 can be used for maintaining treatment liquid in a substantially enclosed volume, such as a chamber of a cap. Creating a generally sealed volume for retaining a volume of treatment fluid can advantageously enable cleaning of a caries. In some arrangements, a fluid platform 101 can include components for enhancing aspiration, irrigation, moving, circulating, and mixing. In some implementations, the fluid platform 101 can include embodiments of some or all of the following elements or features (and the elements or features disclosed above), which are intended to illustrate but not to limit the scope of the disclosure. Additional details of fluid platforms 101 that may be suitable for use with the embodiments disclosed herein may be found, e.g., in ¶¶ [0005], [0041]-[0049], [0058]-[0086] and various other portions of U.S. Patent Publication No. US 2012/0237893, published Sep. 20, 2012, which is incorporated by reference herein for all purposes.

1. Fluid Retainer or Cap

The fluid platform 101 can include a fluid retainer, flow restrictor or cap to maintain a generally sealed liquid connection between the carious region 115 and the handpiece 108 to provide a body of fluid in which the pressure wave generator 105 can operate. In some embodiments, the cap can be coupled to or integrally formed with a distal portion of the handpiece 108. In another embodiment, the cap can be a separate piece from the handpiece 108, and can be mechanically and/or magnetically coupled to a distal portion of the handpiece 108. The cap can include or define a chamber configured to retain treatment fluid in the cap. In some arrangements, the sealed cap can direct substantially all liquid entering the enclosed volume or chamber through the handpiece 108 to leave through the handpiece 108 as well. Liquid can be introduced into the chamber through a fluid inlet connected to, or disposed in or on, the handpiece 108. Waste treatment liquid can be removed through the cap by way of a fluid outlet and further into the handpiece 108.

In one embodiment, the path between the cap and the handpiece 108 (e.g., through an inlet and/or outlet) can include a permeable material through which liquid can flow. In addition, the connection created between the sealing cap and the tooth 110 can be flexible such that it can accommodate movements in the handpiece 108 relative to the chamber while maintaining the liquid connection. In some arrangements utilizing a handpiece 108, the pressure may be low enough for the operator to comfortably apply the cap during the procedure without using excessive force to create a positive seal. In some embodiments, the handpiece 108 may not be handheld, in which case the handpiece 108 can be operated without an excessive clamping or holding force. The cap can be used throughout the procedure and can be configured to withstand chemical exposure (such as irrigants introduced during the procedure).

The cap can be formed of a flexible material in some embodiments. For example, the cap can be formed of an elastic material to properly seal the handpiece 108 to the tooth 110. In some arrangements, the cap can include a sponge. The cap can include, for example, polyvinyl foam, polyethylene, polyvinyl alcohol (PVA), cellulose foam, silicone foam, etc. In other embodiments, the cap can comprise silicone, elastomer, rubber, latex, etc. In one embodiment, a material with substantially little acoustic dampening is chosen. By allowing only minimal or no acoustic dampening, the cap may not attenuate the pressure waves generated during the treatment procedure. In yet other embodiments, the cap can be made from one or more materials with different elasticities and/or degrees of firmness. It should be appreciated that the caps can have different shapes, depending on which tooth 110 is being treated (e.g., molar, incisor, canine, etc.) or the location of the carious region 115 on the tooth 110 (e.g., on a proximal surface, occlusal surface, lingual surface, buccal surface, etc.).

Additional details of fluid retainers, flow restrictors or caps that may be suitable for use with the embodiments disclosed herein may be found, e.g., in ¶¶ [0052]-[0053], [0115]-[0117] and various other portions of U.S. Patent Publication No. US 2011/0117517, published May 19, 2011; in ¶¶ [0040]-[0043], [0170]-[01 [0293]-[0299], [0316]-[0319] and various other portions of U.S. Patent Publication No. US 2012/0237893, published Sep. 20, 2012; and in FIG. 1 and the accompanying disclosure of U.S. Provisional Patent Application No. 61/767,746, filed Feb. 21, 2013, entitled "APPARATUS AND METHODS FOR SEALING TEETH," each of which is incorporated by reference herein for all purposes.

2. Components for Enhancing Aspiration and Irrigation

Some fluid platforms 101 can include various components that enhance aspiration and irrigation before, during, and/or after the treatment procedure. In some embodiments, treatment liquid can enter the chamber of the cap via a fluid inlet, such as a treatment liquid inflow conduit. The fluid inlet can pass through or along the handpiece 108. Under steady state operation, the amount of liquid entering the enclosed volume can be substantially the same as the amount of liquid leaving the enclosed volume through the fluid outlet in some embodiments. More fluid will enter the enclosed volume when the clinician initiates the supply of fluid to the enclosed volume. In some embodiments, as described above, the fluid inlet can be driven by a pump, which can be controlled by the console 106. Furthermore, the fluid inlet can be the same as the pressure wave generator 105 in some embodiments, such as in embodiments that employ a liquid jet device. Additional details of fluid inlets that may be suitable for use with the embodiments disclosed herein may be found, e.g., in ¶¶ [0075]-[0078] and various other portions of U.S. Patent Publication No. US 2012/0237893, published Sep. 20, 2012, which is incorporated by reference herein for all purposes.

As explained above, the fluid platforms 101 disclosed herein can also have a fluid outlet, e.g., an outflow conduit to transfer liquid out of the enclosed volume of the chamber during the procedure. In some embodiments, waste treatment liquid can be allowed to spill directly into the patient's mouth. In other embodiments, however, waste treatment liquid (as well as removed material and byproduct gases) can be transferred through the fluid outlet, which can pass through or along the handpiece 108. As explained herein, the fluid outlet may be active or passive. In the case of a passive fluid outlet, the waste treatment liquid can move through the fluid outlet due to capillary forces, gravity, or because of a slight overpressure created in the enclosed volume or chamber. In the case of an actively pumped fluid outlet, the waste liquid can be transferred using a pump, suction, or other device that draws liquid out through the outlet. In one example, the fluid outlet is connected to the suction system and/or vacuum lines in the clinician's office. Additional details of fluid outlets that may be suitable for use with the embodiments disclosed herein may be found, e.g., in ¶¶ [0079]-[0081] and various other portions of U.S. Patent Publication No. US 2012/0237893, published Sep. 20, 2012, which is incorporated by reference herein for all purposes.

As explained herein, the fluid platform 101 can also include one or more vents to regulate pressure of the treatment fluid. The vents can be disposed in a portion of the handpiece 108 in some arrangements, such as along a waste line or fluid outlet. The vents can take the form of a permeable or semi-permeable material (e.g., a sponge), openings, pores, or holes, etc. Additional details of vents that may be suitable for use with the embodiments disclosed herein may be found, e.g., in ¶¶ [0071]-[0073], [0082]-[0086], [0177]-[0194] and various other portions of U.S. Patent Publication No. US 2012/0237893, published Sep. 20, 2012, which is incorporated by reference herein for all purposes.

B. Handpiece

The systems disclosed herein can also include a handpiece 108, e.g., the handpieces disclosed herein with respect to FIGS. 1A through 9B. The handpiece 108 can be configured to apply the fluid platform 101 (e.g., the fluid retainer or cap) to the tooth 110 and to position the pressure wave generator 105 relative to the carious region 115. In the disclosed embodiments, the handpiece 108 can be used to create a substantially closed liquid circuit as the handpiece 108 engages the fluid platform 101 with the tooth 110. When the handpiece 108 couples the fluid platform 101 to the tooth 110, the handpiece 108 can form an enclosed volume within a chamber of a cap. Treatment liquids can be transferred into and out of the enclosed volume by way of lumens or tubes in the handpiece 108.

In addition, the handpiece 108 can provide the operator or clinician with a handheld device to hold during the procedure. For example, the handpiece 108 can include user-friendly grips and a user-friendly shape to grasp. The clinician can manipulate the handpiece 108 to accurately position the fluid platform 101 and/or pressure wave generator 105 at a desired position on or near the tooth 110. In addition, the handpiece 108 can allow the clinician to move or rotate the fluid platform 101 and pressure wave generator 105 during the procedure so as to dispose the pressure wave generator 105 at a desirable position relative to the carious region 115. Alternatively, the handpiece 108 can also provide a device for the operator to clamp or attach to the tooth 110 such that the handpiece 108 does not require substantial user intervention during the procedure. The handpiece 108 can be disposable (e.g., single-use), or the handpiece 108 can be reusable. In one embodiment, the handpiece 108 is disposable, but the pressure wave generator 105 is reusable. The handpiece 108 can be formed of any suitable material. In some embodiments, the handpiece 108 can be formed of a plastic material. In other embodiments, the handpiece 108 can be formed of a metal. Additional details of handpieces that may be suitable for use with the embodiments disclosed herein may be found, e.g., in ¶¶ [0107], [0138]-[0142], [0156]-[0161] and various other portions of U.S. Patent Publication No. US 2012/0237893, published Sep. 20, 2012, which is incorporated by reference herein for all purposes.

C. Sealing Material

A sealant or sealing material disclosed herein can be configured to temporarily fill the space between the teeth 110 or the areas which are not accessible to the fluid platform 101 to help enclose the carious region 115. The sealing material can therefore act to assist in the retention of fluid in the fluid platform 101 (e.g., the cap), which can improve the cleaning of the carious regions 115 using pressure waves. For example, the tooth seal can help create an enclosed volume around the carious region 115. The sealant can be configured to flow into spaces, such as the gaps between adjacent teeth, and can be configured to set and/or harden to hold its shape during treatment. In addition, the sealing material can be easily removed or pulled from the tooth 110 after use. In some arrangements, the sealing material can easily be reshaped using tools such as a dental bur, knife, etc. For example, in various embodiments, the sealing material can be shaped (e.g., planarized) to support a flat coupling surface (e.g., a washer, one or more support magnets, etc.). The handpiece 108 can couple to the coupling surface, and the pressure wave generator 105 (e.g., a liquid jet device) can extend through a hole in the coupling surface such that a distal portion of the pressure wave generator 105 is disposed near the treatment site. Additional details of using a sealing material or attachment media for engaging the handpiece 108 may be found in FIG. 1 and the accompanying description of U.S. Provisional Patent Application No. 61/767,746, filed Feb. 21, 2013, entitled "APPARATUS AND METHODS FOR SEALING TEETH," which is incorporated by reference herein.

The sealing material can be any suitable sealant. For example, the sealing material can be a substantially semi-flexible material that can set or harden in less than about 30 seconds. The sealing material can be any suitable material that is able to seal the tooth 110, but that also can easily be removed from the tooth 110. Examples of suitable sealing materials can include silicones, impression materials, bite registration materials, etc. In some embodiments, for example, the sealing materials can include 3M Imprint™ Bite, Jet Blue Bite by Colténe Whaledent®, LuxaBite bite registration material by DMG America, Alpha-Dam™ LC Gingival Dam Material or any other suitable sealant. In other embodiments, however, the tooth seal may not be used.

D. Pressure Wave Generator

As explained herein, the disclosed pressure wave generator 105 is configured to generate pressure waves with energy sufficient to clean carious regions 115 of a tooth 110, e.g., to remove decayed tissue from the tooth 110. The pressure wave generator 105 can be a device that converts one form of energy into pressure waves within the treatment liquid. The pressure wave generator 105 can induce, among other phenomena, fluid dynamic motion of the treatment liquid (e.g., in the chamber), fluid circulation, turbulence, and other conditions that can enable the cleaning of the tooth. The pressure wave generators disclosed in FIGS. 1A-9B can be any suitable type of pressure wave generator.

The pressure wave generator 105 can be used to clean tooth surfaces (e.g., to treat dental caries), to remove tooth decay, etc. As explained herein, the pressure wave generator 105 creates pressure waves that propagate through the treatment liquid in a chamber of the fluid platform 101 (e.g., the cap). In some implementations, as explained herein, the pressure wave generator 105 can also create cavitation, acoustic streaming, turbulence, etc. In various embodiments, the pressure wave generator 105 can generate pressure waves or acoustic energy having a broadband power spectrum. For example, the pressure wave generator 105 can generate acoustic waves at multiple different frequencies, as opposed to only one or a few frequencies. Without being limited by theory, it is believed that the generation of power at multiple frequencies can help to remove various types of organic and/or inorganic materials that have different material or physical characteristics at various frequencies.

The pressure wave generator 105 (e.g., high-speed liquid jet, ultrasonic transducer, a laser fiber, etc.) can be placed at the desired location relative to the tooth 110 so as to create pressure waves within the liquid inside the enclosed volume of the chamber to clean the carious region 115, as described herein. In various embodiments, the pressure wave generator 105 can be coupled or attached to the handpiece 108 and/or to a portion of the cap or other part of the fluid platform 101. A portion of the pressure wave generator 105, such as a distal portion, can be submerged in the treatment fluid in the chamber. For example, the pressure wave generator 105 can be disposed inside the enclosed area formed by the chamber of the cap around the carious region 115. The pressure wave generator 105 can be located in close proximity to the carious region 115. In some arrangements, the clinician can use the handpiece 108 to manipulate the pressure wave generator 105 to be at a desired location and/or angle relative to the carious region 115 of the tooth 110. In some implementations, for a given amount of energy emitted by the pressure wave generator 105, the pressure waves can have an increased effect on cleaning and disinfecting. The energy source for the pressure wave generator 105 can be positioned in any suitable location. For example, the energy source that provides the energy for the pressure wave generator 105 can be located outside the handpiece 108, inside the handpiece 108, integrated with the handpiece 108, etc.

For example, in some embodiments, the pressure wave generator 105 can comprise a liquid jet device. The liquid jet can be created by passing high pressure liquid through an orifice. The liquid jet can create pressure waves within the treatment liquid. In some embodiments, the pressure wave generator 105 comprises a coherent, collimated jet of liquid. The jet of liquid can interact with liquid in the enclosed volume (e.g., the chamber of the cap) and/or an impingement surface to create the pressure waves. In addition, the interaction of the jet and the treatment fluid and/or the interaction of spray and treatment fluid may induce cavitation and/or create acoustics to clean the tooth.

In various embodiments, the pressure wave generator 105 can comprise a positioning member (e.g., a guide tube) having a channel or lumen along which or through which the liquid jet can propagate. The distal end portion of the positioning member can include an impingement surface on which the liquid jet impinges and is deflected into jets or spray. The distal end portion of the positioning member can include one or more openings that permit the deflected liquid to exit the positioning member and interact with the surrounding environment in the tooth. In some treatment methods, the openings disposed at or near the distal end portion of the positioning member can be submerged in liquid that can be enclosed in the fluid platform 101 attached to or enclosing a portion of the tooth 110. In some embodiments, the liquid jet can pass through the guide tube and can impact an impingement surface. The impact of the jet on the impingement surface can generate the pressure waves in some implementations. In some embodiments, the liquid jet can directly impact the tooth 110 to clean the carious region 115. Additional details of a pressure wave generator that includes a liquid jet device may be found at least in ¶¶ [0045]-[0050], [0054]-[0077] and various other portions of U.S. Patent Publication No. US 2011/0117517, published May 19, 2011, and in ¶¶ [0136]-[0142] and various other portions of U.S. Patent Publication No. US 2012/0237893, published Sep. 20, 2012, each of which is incorporated by reference herein and for all purposes.

In some embodiments, a high-speed liquid jet device can be used as, in addition to, or instead of the disclosed pressure wave generator and can be configured to clean the carious region 115. In some aspects, the liquid jet device can be used without coupling a fluid platform to the tooth 110. For example, in some embodiments, the liquid jet can be directed against the tooth at or near the carious region 115. The liquid jet can be maintained in contact with the tooth until the carious region 115 (e.g., caries, diseased dentin, bacteria, etc.) is substantially removed. In some embodiments, a flow interrupter can be provided which can be configured to activate the liquid jet device only when the jet is directed against the treatment site. For example, the flow interrupter can be configured as a safety device to prevent activation of the jet before treatment so as to protect the clinician and/or the patient from accidental contact with the jet. In some embodiments, the liquid jet can be maintained against the tooth for a time period in a range of about 0.1 minutes to about 20 minutes to remove the carious region 115, depending on the extent and location of the caries and decay. For example, in some embodiments, the liquid jet can be maintained against the tooth for a time period in a range of about 0.1 minutes to about 5 minutes to remove the carious region 115. Furthermore, in some embodiments, various treatment solutions may be used in the jet, such as NaOCl, EDTA, fluoride treatments, degassed liquid, water, chlorhexidine, etc.

As explained herein, hydrodynamic impact of the jet against the tooth, acoustic cavitation, vibrations, pressure waves, and/or other acoustic phenomena may act alone or in combination to substantially remove the carious region 115 from the tooth 110, while leaving healthy dentin and enamel unaffected and unharmed. For example, various parameters of the jet may be adjusted to form a jet having sufficient energy to remove the carious region 115 without damaging healthy dentin or enamel. As an example, the pressure of the liquid jet can be at or below about 15,000 psi in some embodiments. In particular, the pressure of the liquid jet can be in a range of about 10,000 psi to about 15,000 psi in some arrangements. In various embodiments, the pressure of the liquid jet can be in a range of about 8,000 psi to about 10,000 psi. In addition, in some embodiments, a jet capable of removing the carious region 115 without damaging healthy tooth matter can be formed by passing pressurized liquid through a nozzle having a diameter at or below about 100 microns, for example a nozzle having a diameter in a range of about 40 microns to about 70 microns in some embodiments. In various embodiments, the nozzle can have a diameter in a range of about 55 microns to about 65 microns. Moreover, the liquid jet may be run at steady state or may be pulsed in various embodiments. For example, in some embodiments, the jet can be pulsed to enhance the removal of the carious region 115. For example, in some embodiments, the liquid jet can be pulsed at frequencies in a range of about 1 Hz to about 1000 Hz.

In some embodiments, the liquid jet can be a coherent, collimated jet. In other embodiments, the liquid jet may not be a coherent, collimated jet, for example, when the jet maintains high velocity and energy sufficient to clean the tooth 110 until impact with the tooth 110 (e.g., before it turns into a mist). Various examples of liquid jet devices suitable for use with the disclosed embodiments are described in U.S. Pat. Nos. 6,224,378; 6,497,572; and U.S. patent application Ser. No. 12/945,791, filed Nov. 12, 2010, published May 19, 2011, as U.S. Patent Publication No. US 2011/0117517, entitled "LIQUID JET APPARATUS AND METHODS FOR DENTAL TREATMENTS;" each of which is hereby incorporated by reference herein in its entirety so as to form part of this specification.

As has been described, a pressure wave generator 105 can be any physical device or phenomenon that converts one form of energy into pressure waves within the treatment fluid. Many different types of pressure wave generators 105 (or combinations of pressure wave generators) are usable with embodiments of the systems and methods disclosed herein.

(i) Mechanical Energy

Pressure wave generators 105 can include liquid jet devices, as explained above. Mechanical energy pressure wave generators 105 can also include rotating objects, e.g. miniature propellers, eccentrically-confined rotating cylinders, a perforated rotating disk, etc. These types of pressure wave generators 105 can also include vibrating, oscillating, or pulsating objects such as sonication devices that create pressure waves via piezoelectricity, magnetostriction, etc. In some pressure wave generators 105, electric energy transferred to a piezoelectric transducer can pressure waves in the treatment fluid. In some cases, the piezoelectric transducer can be used to create acoustic waves having ultrasonic frequencies.

(ii) Electromagnetic Energy

An electromagnetic beam of radiation (e.g., a laser beam) can propagate energy into a chamber, and the electromagnetic beam energy can be transformed into pressure waves as it enters the treatment fluid. In some embodiments, the laser beam can be directed into the chamber or space as a collimated and coherent beam of light. The collimated laser beam can be sufficient to generate pressure waves as the laser beam delivers energy to the fluid. Furthermore, in various embodiments, the laser beam can be focused using one or more lenses or other focusing devices to concentrate the optical energy at a location in the treatment fluid. The concentrated energy can be transformed into pressure waves sufficient to clean the carious regions. In one embodiment, the wavelength of the laser beam or electromagnetic source can be selected to be highly absorbable by the treatment fluid in the chamber (e.g., water) and/or by the additives in the treatment fluid (e.g., nanoparticles, etc.). For example, at least some of the electromagnetic energy may be absorbed by the fluid (e.g., water) in the chamber, which can generate localized heating and pressure waves that propagate in the fluid. The pressure waves generated by the electromagnetic beam can generate photo-induced or photo-acoustic cavitation effects in the fluid. The electromagnetic radiation from a radiation source (e.g., a laser) can be propagated to the chamber by an optical waveguide (e.g., an optical fiber), and dispersed into the fluid at a distal end of the waveguide (e.g., a shaped tip of the fiber, e.g., a conically-shaped tip). In other implementations, the radiation can be directed to the chamber by a beam scanning system.

The wavelength of the electromagnetic energy may be in a range that is strongly absorbed by water molecules. The wavelength may in a range from about 300 nm to about 3000 nm. In some embodiments, the wavelength is in a range from about 400 nm to about 700 nm, about 700 nm to about 1000 nm (e.g., 790 nm, 810 nm, 940 nm, or 980 nm), in a range from about 1 micron to about 3 microns (e.g., about 2.7 microns or 2.9 microns), or in a range from about 3 microns to about 30 microns (e.g., 9.4 microns or 10.6 microns). The electromagnetic energy can be in the ultraviolet, visible, near-infrared, mid-infrared, microwave, or longer wavelengths.

The electromagnetic energy can be pulsed or modulated (e.g., via a pulsed laser), for example with a repetition rate in a range from about 1 Hz to about 500 kHz. The pulse energy can be in a range from about 1 mJ to about 1000 mJ. The pulse width can be in a range from about 1 us to about 500 μs, about 1 ms to about 500 ms, or some other range. In some cases, nanosecond pulsed lasers can be used with pulse rates in a range from about 100 ns to about 500 ns. The foregoing are non-limiting examples of radiation parameters, and other repetition rates, pulse widths, pulse energies, etc. can be used in other embodiments.

The laser can include one or more of a diode laser, a solid state laser, a fiber laser, an Er:YAG laser, an Er:YSGG laser, an Er,Cr:YAG laser, an Er,Cr:YSGG laser, a Ho:YAG laser, a Nd:YAG laser, a CTE:YAG laser, a $CO_2$ laser, or a Ti:Sapphire laser. In other embodiments, the source of electromagnetic radiation can include one or more light emitting diodes (LEDs). The electromagnetic radiation can be used to excite nanoparticles (e.g., light-absorbing gold nanorods or nanoshells) inside the treatment fluid, which may increase the efficiency of photo-induced cavitation in the fluid. The treatment fluid can include excitable functional groups (e.g., hydroxyl functional groups) that may be susceptible to excitation by the electromagnetic radiation and which may increase the efficiency of pressure wave generation (e.g., due to increased absorption of radiation). During some treatments, radiation having a first wavelength can be used (e.g., a wavelength strongly absorbed by the liquid for instance water) followed by radiation having a second wavelength not equal to the first wavelength (e.g., a wavelength less strongly absorbed by water) but strongly absorbed by another element, e.g. dentin, or nanoparticles added to solution. For example, in some such treatments, the first wavelength may help create bubbles in the fluid, and the second wavelength may help disrupt the tissue.

The electromagnetic energy can be applied to the chamber for a treatment time that may be in a range from about one to a few seconds up to about one minute or longer. A treatment procedure may include one to ten (or more) cycles of applying electromagnetic energy to the tooth. The fluid platform 101 may be used to circulate a fluid in the chamber during the treatment process, which advantageously can inhibit heating of the tooth 110 (which may cause discomfort to the patient). The fluid platform 101 can include a fluid platform 101 (e.g., a fluid retainer or cap) to assist retaining fluid in the chamber. The fluid platform 101 can inhibit splashback of fluid, which can occur by hydraulic self-ejection during certain pulsed laser treatments. The circulation of treatment fluid (e.g., water with a tissue dissolving agent) by the fluid platform 101 can bring fresh treatment fluid to tissue and organic matter as well as flush out dissolved material from the treatment site. In some treatments using electromagnetic radiation, circulation of the treatment fluid can increase the effectiveness of the cleaning (as compared to a treatment with little or no fluid circulation).

In some implementations, electromagnetic energy can be added to other pressure wave generation modalities. For example, electromagnetic energy can be delivered to a chamber in which a mechanical energy pressure wave generator (e.g., a liquid jet) is used to generate the acoustic waves.

(iii) Acoustic Energy

Acoustic energy (e.g., ultrasound) can be generated from electric energy transferred to an ultrasound transducer or an ultrasonic tip (or file or needle) that creates pressure waves in the treatment fluid. The ultrasonic transducer can comprise a piezoelectric crystal that physically oscillates in response to an electrical signal or a magnetostrictive element that converts electromagnetic energy into mechanical energy. The transducer can be disposed in the treatment fluid, for example, in the fluid inside the chamber. As explained herein with respect to FIGS. 11A-11B, ultrasonic devices used with the embodiments disclosed herein are preferably broadband and/or multi-frequency devices. For example, unlike the power spectra of the conventional ultrasonic transducer shown in FIG. 11B, ultrasonic devices used with the disclosed embodiments preferably have broadband characteristics similar to those of the power spectra of FIG. 11A (acoustic power of a liquid jet device).

(iv) Further Properties of Some Pressure Wave Generators

A pressure wave generator 105 can be placed at a desired location with respect to the tooth 110. The pressure wave generator 105 creates pressure waves within the fluid inside a chamber, e.g., a chamber of a fluid platform 101 (the generation of pressure waves may or may not create or cause cavitation). The pressure waves propagate throughout the fluid inside the chamber, with the fluid in the chamber serving as a propagation medium for the pressure waves. The pressure waves can also propagate through tooth material (e.g., dentin). It is believed, although not required, that as a result of application of a sufficiently high-intensity pressure wave, acoustic cavitation may occur. The collapse of cavitation bubbles may induce, cause, or be involved in a number of processes described herein such as, e.g., sonochemistry, tissue dissociation, tissue delamination, sonoporation, and/or removal of calcified structures. In some embodiments, the pressure wave generator 105 can be configured such that the pressure waves (and/or cavitation) do not substantially break down natural dentin in the tooth 110. The pressure wave field by itself or in addition to cavitation may be involved in one or more of the above-mentioned processes.

In some implementations, the pressure wave generator 105 generates primary cavitation, which creates pressures waves, which may in turn lead to secondary cavitation. The secondary cavitation may be weaker than the primary cavitation and may be non-inertial cavitation. In other implementations, the pressure wave generator 105 generates pressure waves directly, which may lead to secondary cavitation.

Additional details of pressure wave generators that may be suitable for use with the embodiments disclosed herein may be found, e.g., in ¶¶ [0191]-[0217], and various other portions of U.S. Patent Publication No. US 2012/0237893, published Sep. 20, 2012, which is incorporated by reference herein for all purposes.

III. Treatment of Non-Cavitated and Cavitated Caries

Figure 1B:
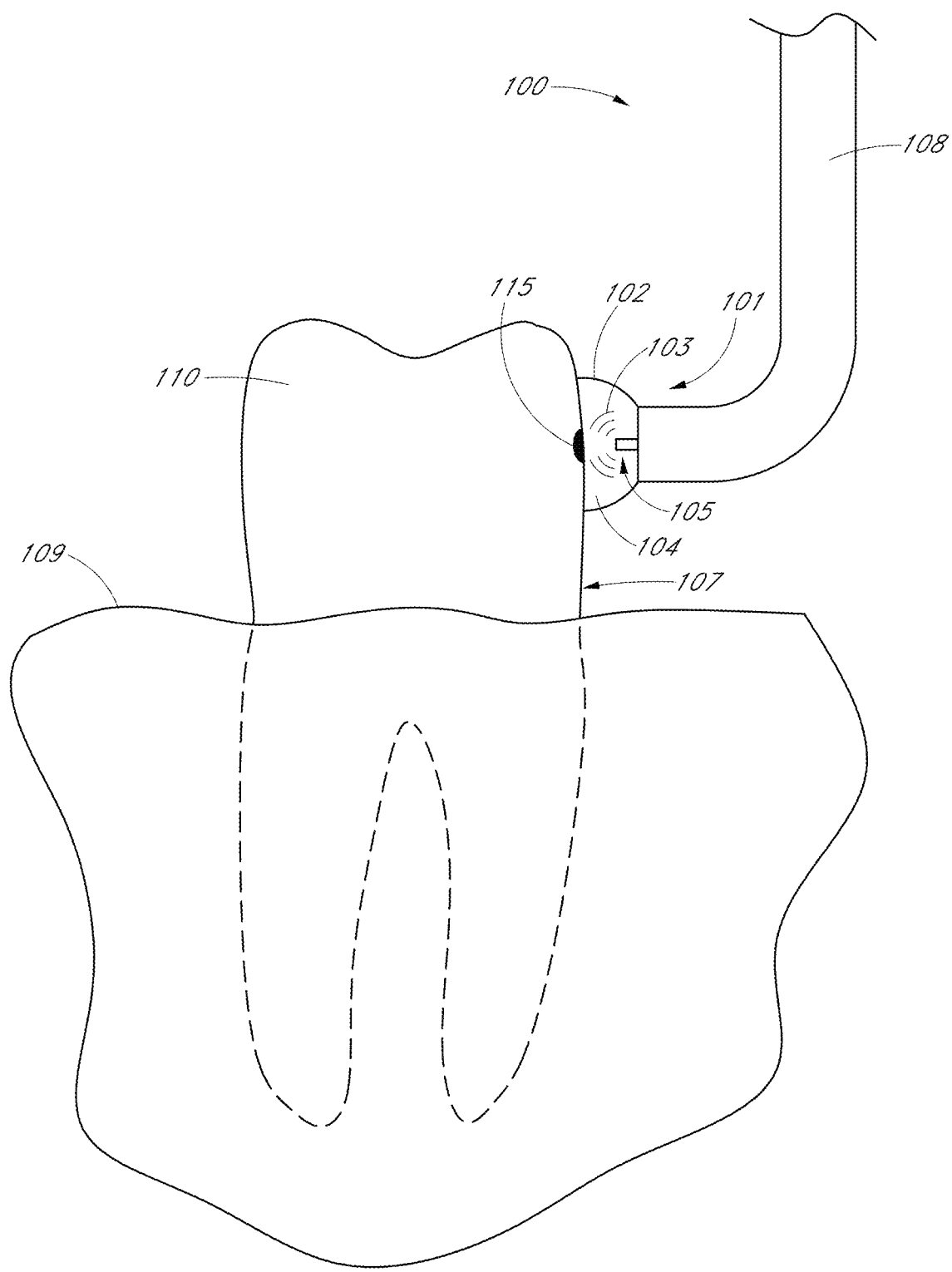
FIG. 1B is a schematic side cross-sectional view of the dental system of FIG. 1A illustrating a fluid platform coupled to a treatment tooth and that covers a relatively small carious region on the tooth.

FIG. 1B is a schematic side cross-sectional view of the dental system 100 having a fluid platform 101 coupled to a treatment tooth 110 and that covers, or is positioned proximate to, a relatively small carious region 115 on the tooth 110. The carious region 115 illustrated in FIG. 1B may include a non-cavitated caries, e.g., a caries in which decay has progressed within the enamel, but not below the enamel into dentin. The carious region 115 of FIG. 1B may be formed in a side surface 107 of the tooth 110, such as a buccal or lingual surface of the tooth 110, as shown in FIG. 1B. In the illustrated embodiment, the carious region 115 may be formed on the side surface 107 above a gum line 109 of the tooth 110.

The system 100 can include a handpiece 108, a fluid retainer or cap 102 configured to be attached to the tooth 110 over the carious region 115, and a pressure wave generator 105. The handpiece 108 can be provided to assist the clinician in positioning and coupling the cap 102 to the tooth 110. For example, the clinician can manipulate the handpiece 108 such that the cap 102 is disposed over and/or encloses the carious region 115. Furthermore, the handpiece 108 can be used by the clinician to position the cap 102 and the pressure wave generator 105 relative to the carious region 115 such that the pressure wave generator 105 is capable of generating sufficient acoustic energy to clean the carious region 115. For example, the clinician can use the handpiece 108 to position the cap 102 such that a distal portion of the pressure wave generator 105 is suitably spaced apart from and/or angled relative to the carious region 115 of the tooth 110. For example, the clinician, for various treatment reasons, may want to be able to position the pressure wave generator 105 at a particular distance from the carious region 115 and/or at a particular angle relative to the carious region 115 in order to achieve desirable treatment outcomes. In addition, as explained herein, the handpiece 108 can also, in some arrangements, include various inflow and outflow conduits to permit the transfer into and out of the cap 102 of suitable treatment fluids and/or waste fluids.

The cap 102 can be coupled to, or integrally formed with, the handpiece 108, e.g., at a distal portion of the handpiece 108. The cap 102 can be sized and shaped to retain fluid in a chamber 104 of the cap 102 when the cap 102 is attached or coupled to the tooth 110. In various embodiments, the chamber 104 of the fluid platform 101 can be at least partially filled with a liquid during treatment of the tooth 110. In some embodiments, for example, the chamber 104 can be substantially filled with liquid during treatment. For example, the chamber 104 can be filled above about 30% of the volume of the chamber 104, above about 50% of the volume of the chamber 104, above about 60% of the volume of the chamber 104, above about 75% of the volume of the chamber 104, above about 90% of the volume of the chamber 104, about 100% of the volume of the chamber 104, etc. The cap 102 can be configured to maintain a sealed liquid connection between the carious region 115 of the tooth 110 and the handpiece 108. For example, the cap 102 can be attached to the tooth 110 using an adhesive or sealant (not illustrated in FIG. 1B). The adhesive or sealant can act to couple the cap 102 to the tooth 110 and/or to provide a liquid seal between the tooth 110 (e.g., the carious region 115) and the handpiece 108. In various embodiments, described below, treatment fluid can be introduced by way of one or more inlets from the handpiece 108 to the chamber 104 of the cap 102. In some embodiments, when the pressure wave generator 105 is a liquid jet, for example, the pressure wave generator 105 can introduce liquid into the chamber 104. In still other embodiments, a separate fluid introducer can be provided to introduce fluid into the chamber 104. The connection created between the cap 102 and the tooth 110 can be flexible such that the interface between the cap 102 and tooth 110 can accommodate movements in the handpiece 108 relative to the chamber 104, while maintaining the sealed connection. For example, the sealed connection between the cap 102 and the tooth 110 can allow the clinician to adequately position a distal portion of the pressure wave generator 105 relative to the carious region 115 of the tooth 110. The cap 70 can be formed from a sufficiently durable, biocompatible substance such as metal or plastic.

The pressure wave generator 105 can be coupled to the cap 102, and at least a portion of the pressure wave generator 105 can be disposed in the chamber 104. For example, a distal portion of the pressure wave generator 105 can be disposed in the chamber 104. The pressure wave generator 105 can be activated inside the chamber 104 of the cap 102 to clean the carious region 115 using generated acoustic waves 103. In some embodiments, the distal end portion of the pressure wave generator 105 can be submerged in the fluid inside the chamber 104. In other embodiments, the distal end portion of the pressure wave generator 105 can be disposed outside the fluid in the chamber 104.

The pressure wave generator 105 can generate the acoustic or pressure waves 103 within the liquid inside the chamber 104 in some embodiments. The pressure waves 103 can propagate throughout the liquid inside the enclosed volume formed by the chamber 104 and the cap 102, which can be sealed or attached to the tooth 110. Without being limited by theory, it is believed, although not required, that by applying sufficiently high-intensity pressure waves 103, acoustic cavitation may occur. The collapse of cavitation bubbles may induce, cause, or be involved in a number of processes such as, e.g., sonochemistry, tissue dissociation, tissue delamination, sonoporation, etc. The pressure wave field by itself may also be involved in one or more of the abovementioned processes. In some arrangements, the generation of pressure waves may or may not create or cause cavitation.

The pressure wave generator 105 can be any suitable pressure wave generator. For example, in some embodiments, the pressure wave generator 105 can include a liquid jet device. In particular, a coherent, collimated liquid jet can be formed by an orifice near a proximal portion of a guide tube. The jet can pass through a channel of the guide tube and can impact an impingement surface in some arrangements. The impact of the jet on the impingement surface can create the pressure waves 103 shown in FIG. 1B. In some embodiments, the pressure waves 103 can propagate through the fluid that at least partially or substantially fills the chamber 104 of the cap 102. The pressure waves 103 can interact with the carious region 115 of the tooth to substantially remove decayed tooth matter, e.g., the caries. In some embodiments, the liquid that at least partially or substantially fills the chamber 104 can be a degassed liquid, which can improve cavitation and reduce the presence of gas bubbles inside the caries in some treatments. In other embodiments, the pressure wave generator 105 of FIG. 1B can include a mechanical pressure wave generator, an ultrasonic generator, an electromagnetic pressure wave generator (e.g., a laser), or a piezoelectric pressure wave generator. In still other embodiments, the pressure wave generator 105 can include a generator that transfers energy to particles within the treatment liquid that in turn creates pressure waves (e.g., photo-induced cavitation).

As explained herein, various conventional dental techniques may leave non-cavitated caries, such as the small caries shown in FIG. 1B, untreated, or may only minimally treat the caries. Advantageously, the embodiment of FIG. 1B can detect and clean the non-cavitated, carious region 115 without harming the enamel or the underlying dentin. Furthermore, the system 100 of FIG. 1B can detect and clean such small carious regions 115 that may otherwise go undetected or untreated using conventional dental techniques. By detecting and cleaning even small caries (whether non-cavitated or cavitated), the system 100 disclosed herein can prevent further progression or worsening of the caries and can improve the overall health of the tooth 110.

Figure 2:
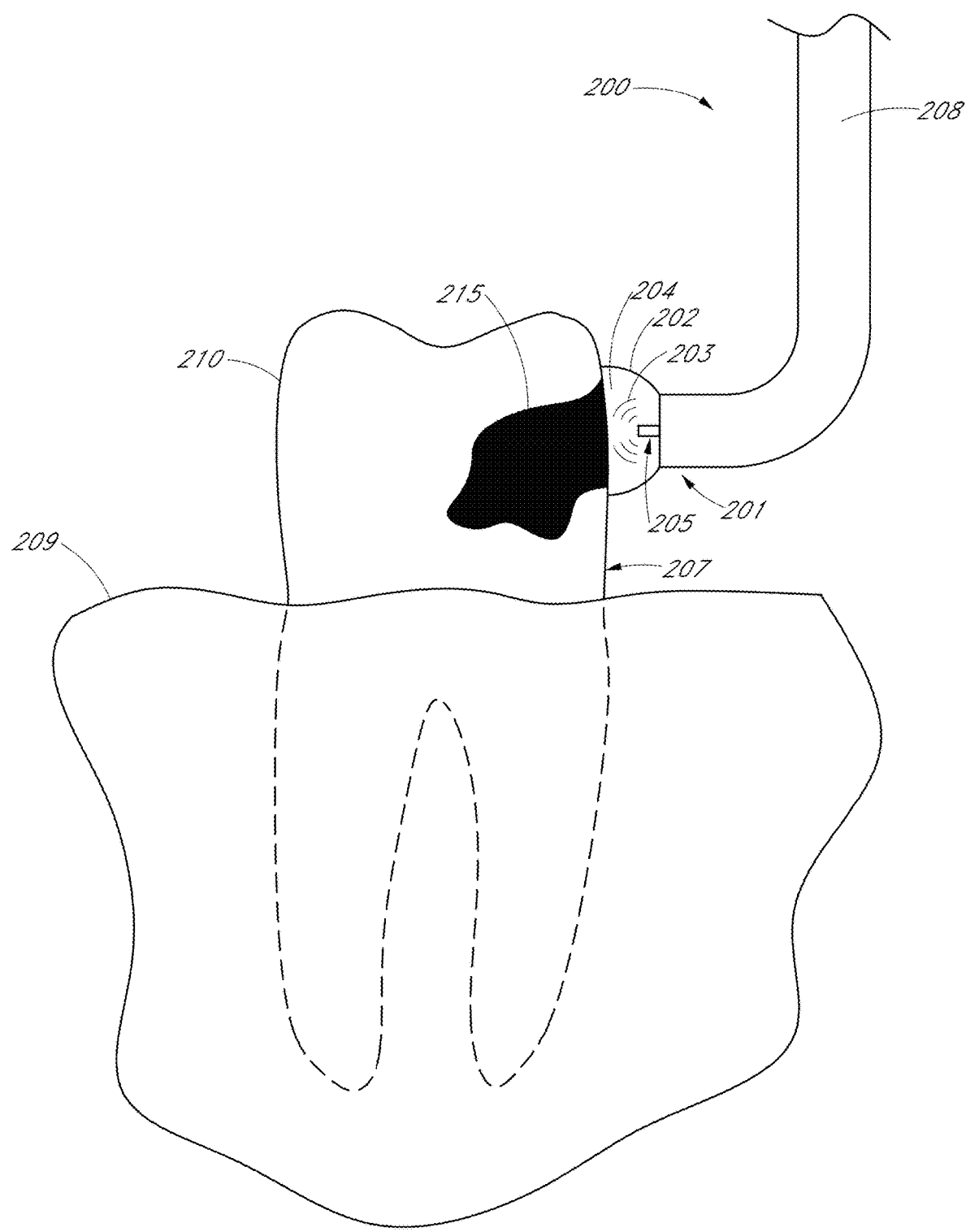
FIG. 2 is a schematic side cross-sectional view of a dental system having a fluid platform coupled to a treatment tooth and that covers a relatively large carious region on the tooth.

FIG. 2 is a schematic side cross-sectional view of a dental system 200 having a fluid platform 201 coupled to a treatment tooth 210 and that covers, or is positioned proximate to, a relatively large carious region 215 on the tooth 210. In FIG. 2, for example, the carious region 215 may be formed in a side surface 207 of the tooth 210, e.g., above a gum line 209. Unlike the carious region 115 of FIG. 1B, however, the carious region 215 of FIG. 2 may include a cavitated caries on the tooth 210. The cavitated caries in the carious region 215 may include a decayed region of the tooth that extends past the enamel of the tooth 210 and into at least a portion of the dentin. In some case, for example, the cavitated caries may extend into the dentin but may remain outside the pulp cavity.

Unless otherwise noted, components illustrated in FIG. 2 can be the same as or similar to components illustrated in FIG. 1B, except the reference numbers are incremented by 100. For example, as in FIG. 1B, the system 200 can include a handpiece 208, a fluid retainer or cap 202, and a pressure wave generator 205. The cap 202 can be coupled to a distal portion of the handpiece 208 and can include a chamber 204 that can be at least partially filled with a liquid during treatment of the tooth 210. For example, in some arrangements, the chamber 204 can be substantially filled with liquid during treatment. The fluid retainer or cap 202 can be disposed proximate to and/or enclosing the carious region 215. For example, the cap 202 can substantially or entirely cover the portion of the side surface 207 of the tooth 210 that is affected by the caries. The perimeter of the cap 202 can thus extend about a carious surface of the side surface 207 of the tooth 210.

The pressure wave generator 205 can be activated, which can generate pressure waves 203 sufficient to remove the carious region 215 from the tooth 210. As with FIG. 1B, a distal portion of the pressure wave generator 205 can be disposed inside the liquid filled chamber 204 of the cap 202, such that the distal portion of the pressure wave generator 205 is submerged in the treatment liquid. In other arrangements, the distal portion of the pressure wave generator 205 can be outside the treatment fluid in the chamber 204. In general, the components of FIG. 2 can interact and/or operate as the components described above with respect to FIG. 1B.

As shown in FIG. 2, therefore, the system 200 can advantageously clean large carious regions 215 (e.g., cavitated caries) from the tooth 210. For example, for caries that extend into the dentin of the tooth 210, the pressure wave generator 205 can generate pressure waves 203 sufficient to remove the decayed material (e.g., the caries) while leaving healthy dentin unharmed or unaffected. By contrast, conventional techniques that employ a mechanical apparatus (such as a bur, excavator, etc.) may harm healthy dentin because the clinician may be unable to determine the boundary between the carious regions and the healthy dentin. Thus, conventional techniques are susceptible to under-treatment (when only part of the caries is removed) and/or over-treatment (when healthy dentin is also removed or damaged). For example, when using conventional techniques, the clinician may erroneously remove healthy dentin and/or may erroneously leave carious portions of the tooth untreated. Accordingly, the disclosed embodiments for removing caries from the tooth can advantageously remove all or substantially all the caries from a tooth while protecting the healthy dentin.

Figure 3A:
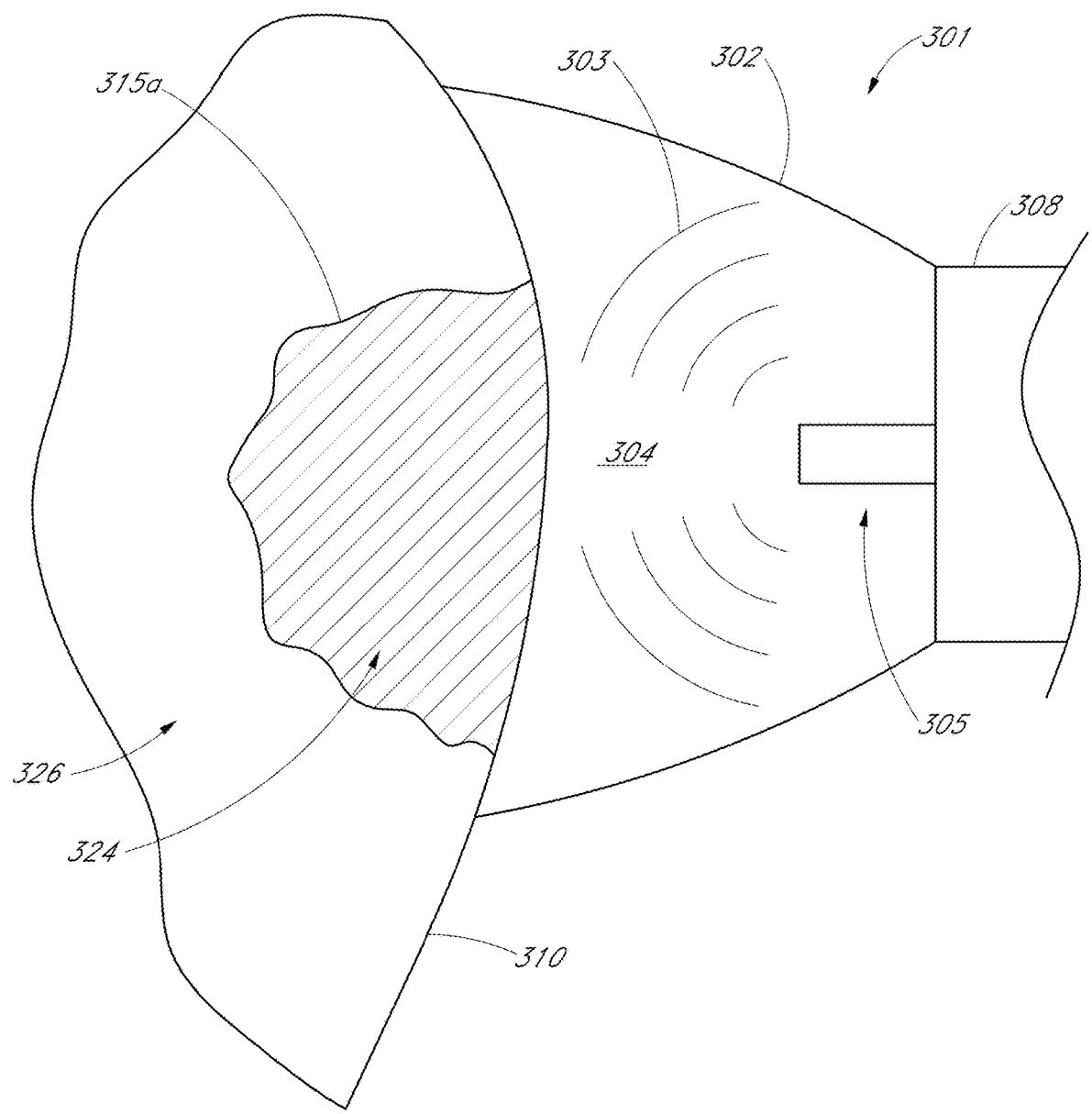
FIG. 3A illustrates a carious region of a tooth before or just after a dental cleaning procedure begins.
Figure 3B:
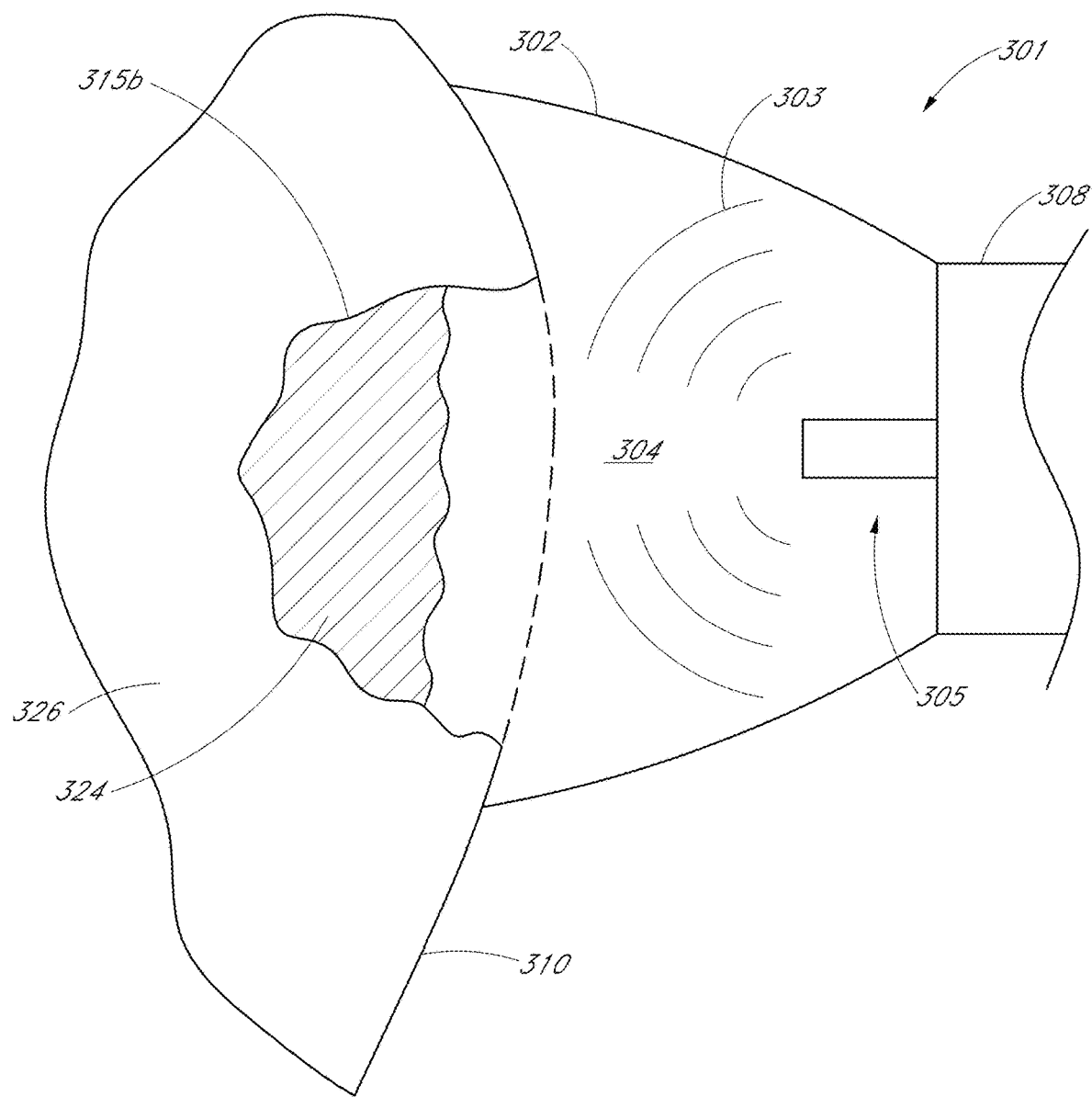
FIG. 3B illustrates the carious region of the tooth in FIG. 3A during the dental cleaning procedure.
Figure 3C:
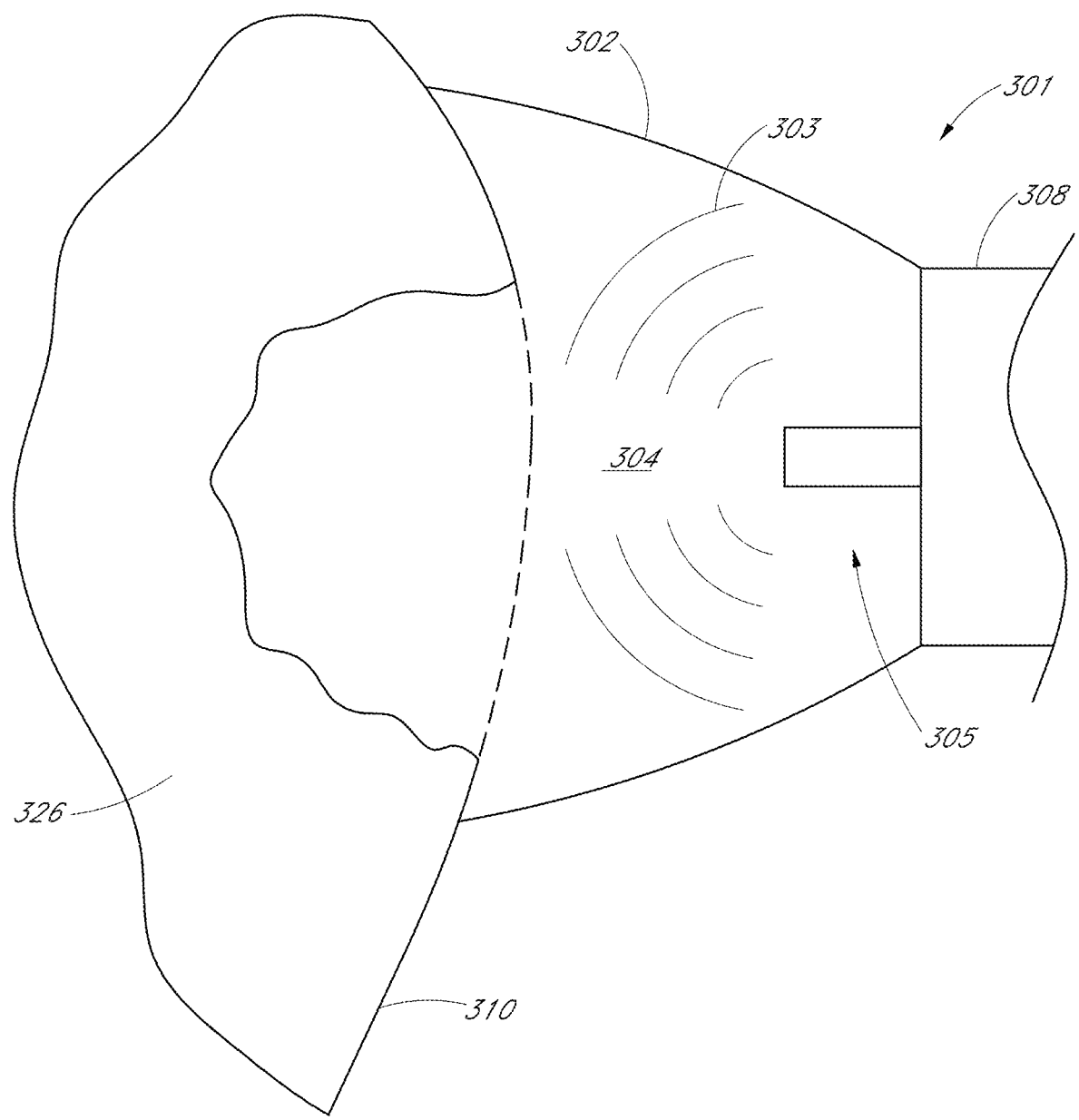
FIG. 3C illustrates the carious region of the tooth in FIG. 3A at the end of the dental cleaning procedure.

FIGS. 3A, 3B, and 3C are enlarged, schematic side cross-sectional views of a fluid platform 301 coupled to a treatment tooth 310 and that covers, or is positioned proximate to, a carious region 315 (e.g., regions 315a-b) on the tooth 310, which can be similar to the carious regions 115, 215 of FIGS. 1 and 2 above. In particular, FIGS. 3A-3C illustrate a dental cleaning procedure at various stages of treatment.

Unless otherwise noted, components illustrated in FIG. 3 can be the same as or similar to components illustrated in FIGS. 1A-2, except the reference numbers are incremented by 100 relative to FIG. 2. For example, as in FIGS. 1A-2, the fluid platform 301 can include a handpiece 308, a fluid retainer or cap 302 that includes or defines a chamber 304, and a pressure wave generator 305. In some arrangements, as above, the chamber 304 can be at least partially, or substantially, filled with liquid during treatment. The pressure wave generator 305 can be activated to generate pressure waves 303 inside the liquid filled cap 302 to remove decayed matter from the carious region 315a-b.

In particular, FIG. 3A shows the carious region 315a before treatment, or just after the treatment procedure begins. As illustrated in FIG. 3A, for example, the carious region 315a may include decayed tooth matter 324 that neighbors or is proximate healthy tooth matter 326 (e.g., healthy dentin or enamel). As explained above, the carious region 315a may be cavitated or non-cavitated. For example, the caries may extend only into a portion of the enamel, or the caries may extend into healthy dentin portions of the tooth 310. Without treatment, the carious region 315a may progress such that it extends farther into the healthy tooth matter 326. Further progression of the carious region 315a may seriously damage the tooth 310.

FIG. 3B shows the carious region 315b of the tooth 310 during a treatment procedure, wherein a portion of the caries or decayed tooth matter 324 is cleaned and removed while the healthy tooth matter 326 (e.g., dentin or enamel) remains unharmed by the procedure. For example, after attaching the cap 302 to the tooth 310 (e.g., using an adhesive or sealant in some embodiments), the chamber 304 of the fluid platform 301 can be at least partially filled with a treatment fluid, such as water. In some cases, the chamber 304 can be substantially filled with the treatment fluid, as explained above. In various arrangements, the treatment fluid can include a degassed liquid, as explained herein. The pressure wave generator 305 can be disposed in the chamber 304 and a portion of the pressure wave generator 305, such as a distal portion, can be submerged in the fluid filling the chamber 304. As above, the clinician can use the handpiece 308 to position the cap 302 and pressure wave generator 305 at a desirable position and angle. The pressure wave generator 305 can be activated, and the generated pressure waves 303 can propagate through the fluid in the chamber 304 to remove the decayed tooth matter 324 that remains in the carious region 315b. The generated pressure waves 303 have a magnitude and frequency designed such that the decayed tooth matter 324 is removed, while the healthy tooth matter 326 remains unaffected by the pressure waves 303.

FIG. 3C shows the end of the treatment procedure, wherein substantially all of the caries is cleaned and removed without affecting the healthy tooth matter 326 (e.g., dentin or enamel). As shown in FIG. 3C, therefore, the carious region 315b of FIG. 3B can be cleaned such that liquid in the chamber 304 flows into the region of the tooth 310 where the carious region 315b was originally present. In various embodiments, the pressure wave generator 305 can be activated for a time period sufficient to substantially remove the caries. For example, in some embodiments, pressure wave generator 305 can be activated for a time period less than about 15 minutes to substantially remove the caries. In some arrangements, the pressure wave generator 305 can be activated for a time period in a range of about 0.1 minutes to about 20 minutes depending on the extent and location of the caries to substantially remove the caries. For example, in some embodiments, the pressure wave generator 305 can be activated for a time period in a range of about 0.1 minutes to about 5 minutes to remove the caries.

IV. Treatment of Occlusal Surfaces of the Tooth

Figure 4:
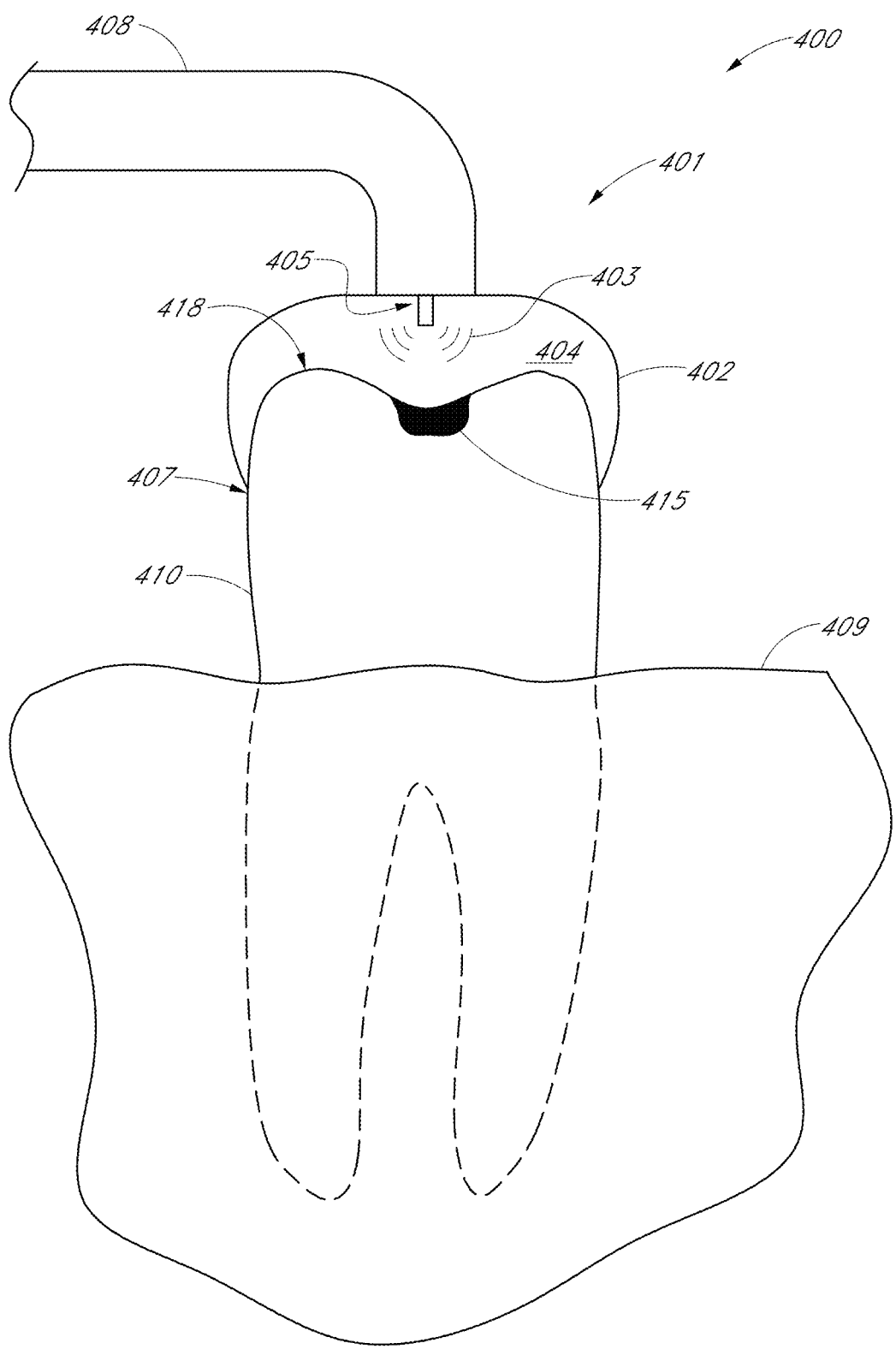
FIG. 4 is a schematic side cross-sectional view of a dental system having a fluid platform coupled to a treatment tooth and that is configured to treat a carious region on an occlusal surface of the tooth.

FIG. 4 is a schematic side cross-sectional view of a dental system 400 having a fluid platform 401 coupled to a treatment tooth 410 and that is configured to treat a carious region 415 on an occlusal surface 418 of the tooth 410. Unless otherwise noted, components illustrated in FIG. 4 can be the same as or similar to components illustrated in FIGS. 1A-3C, except the reference numbers are incremented by 100 relative to the components of FIGS. 3A-3C. For example, the system 400 can include a handpiece 408, a cap 402 that includes or defines a chamber 404, and a pressure wave generator 405 configured to generate pressure waves 403.

While the embodiments in FIGS. 1A-3C showed a fluid platform 101, 201, 301 configured to treat caries on side surfaces of the tooth (e.g., buccal or lingual surfaces), the fluid platform 401 of FIG. 4 is configured to treat caries on the occlusal surface 418 of the tooth 410. As shown in FIG. 4, the cap 402 can extend substantially around the crown of the tooth 410. For example, in some embodiments, the cap 402 can cover and/or enclose substantially the entire occlusal 418 or top surface of the tooth 410. A perimeter of the cap 402 can be coupled side surfaces 407 of the tooth 410, as shown in FIG. 4. In some arrangements, the perimeter or ends of the cap 402 can couple to the occlusal surface 418. The perimeter of the cap 402 can be attached to the tooth 410 using a suitable adhesive or sealant. In other arrangements, however, the cap can be flexible, such that when the cap 402 is urged over the tooth 410, the cap 402 engages the tooth 410 in a tight fit, in which case an adhesive or sealant may not be needed. In addition, although the cap 402 is illustrated in FIG. 4 as covering substantially the entire occlusal 418 or top surface of the tooth 410, in other arrangements, the cap 402 can cover only the carious region 415 of the occlusal surface 418. Sealants or adhesives can be used to fill any gaps that remain between the cap 402 and the tooth 410.

As above, the chamber 404 can be at least partially, or substantially, filled with liquid during treatment. The pressure wave generator 405 can be activated to generate pressure waves 403 inside the liquid filled cap 402 to remove decayed matter from the carious region 415. The pressure wave generator 405 can therefore remove the carious region 415 without damaging the healthy portions of the tooth. Thus, the disclosed embodiments can advantageously be used to remove caries from various surfaces of the tooth, including occlusal surfaces of the tooth.

V. Treatment of Proximal Surfaces of the Tooth

In addition to treating lingual and buccal surfaces and occlusal surfaces of teeth, the embodiments disclosed herein can also be configured to treat proximal surfaces of a tooth, such as mesial and distal surfaces of the tooth. Proximal surfaces of the tooth are side surfaces of the tooth that are between two adjacent teeth. Treating caries on proximal surfaces may be difficult because the clinician may have difficulty accessing the carious regions when the caries is located between two adjacent teeth. Conventional techniques, such as mechanical removal methods, may damage healthy portions of the teeth when the clinician tries to remove carious portions in the tight spaces between adjacent teeth. Accordingly, it can be advantageous to remove caries from proximal surfaces of a tooth while ensuring that the healthy portions of the tooth are not damaged.

Figure 5A:
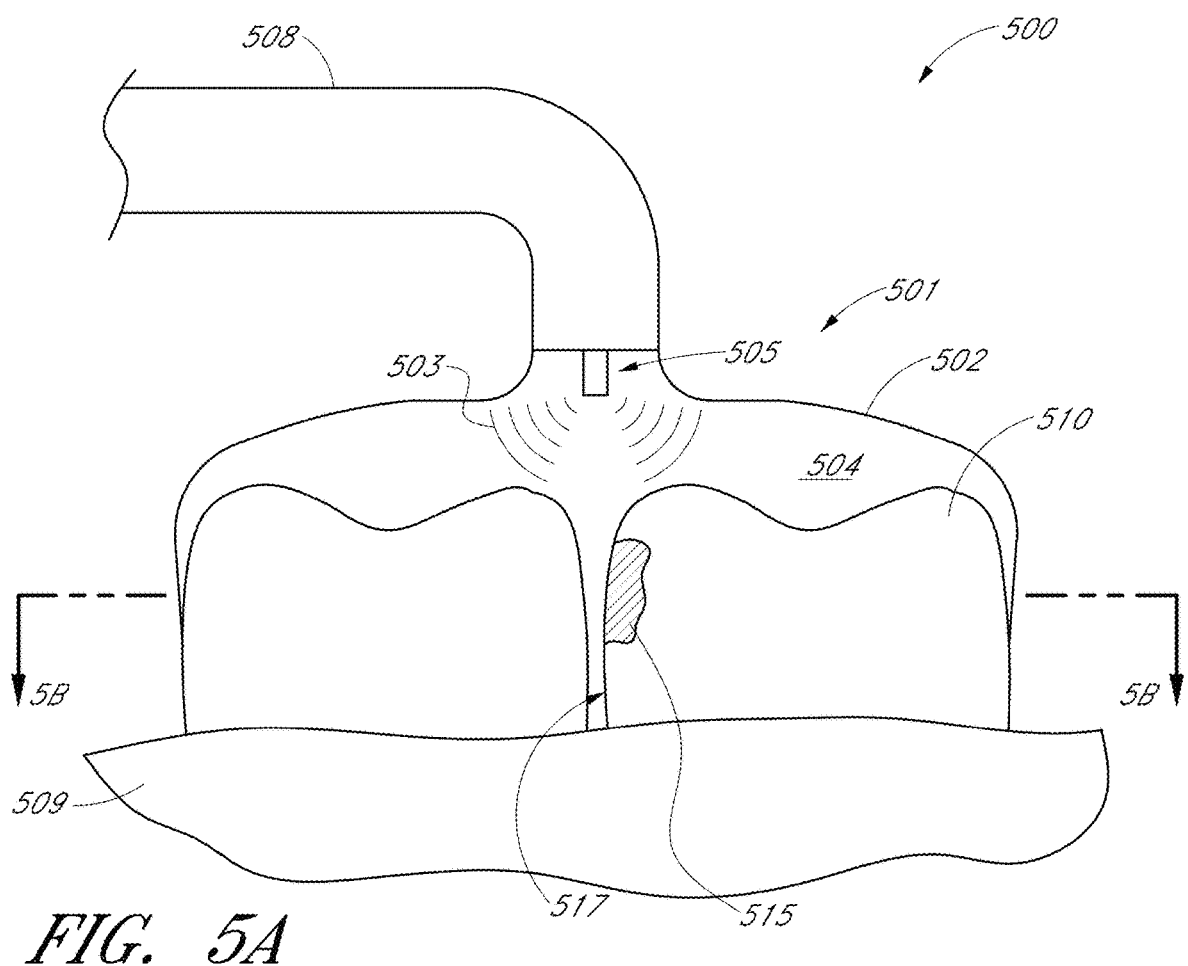
FIG. 5A is a schematic side cross-sectional view of a dental system having a fluid platform coupled to two adjacent teeth and that is configured to treat a carious region on a proximal surface of a tooth.
Figure 5B:
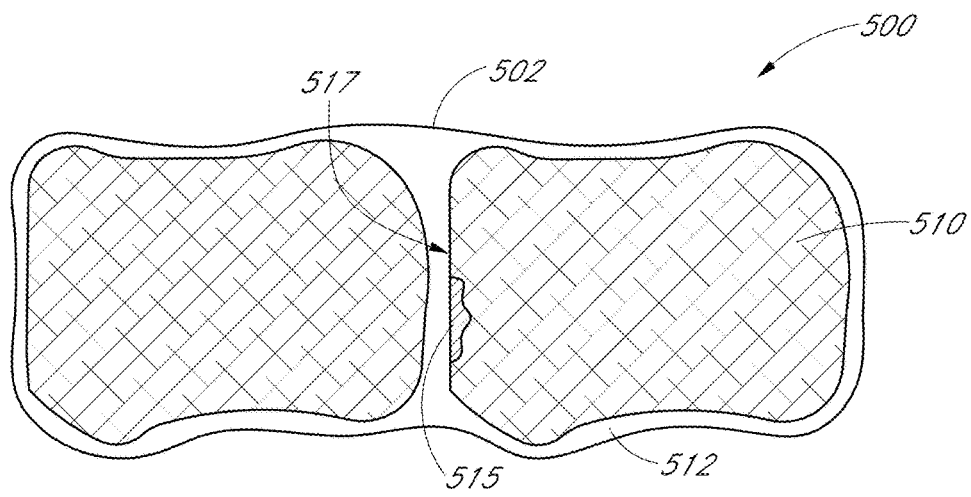
FIG. 5B is a bottom, cross-sectional view of the system of FIG. 5A, taken along line 5B-5B.

FIG. 5A is a schematic side cross-sectional view of a dental system 500 having a fluid platform 501 coupled to two adjacent teeth and that is configured to treat a carious region 515 on a proximal surface 517 of a tooth 510. FIG. 5B is a bottom, cross-sectional view of the system 500 of FIG. 5A, taken along line 5B-5B. Unless otherwise noted, components illustrated in FIGS. 5A-5B may be the same as or similar to components illustrated in FIGS. 1A-4, except the reference numbers are incremented by 100 relative to the components of FIG. 4. For example, the system 500 can include a handpiece 508, a cap 502 that includes or defines a chamber 504, and a pressure wave generator 505 configured to generate pressure waves 503.

The cap 502 can be applied about two adjacent teeth, including the tooth 510 to be treated and a neighboring tooth, which may be healthy. A perimeter of the cap 502 can extend over the crowns of the two neighboring teeth and can couple to side surfaces of the teeth, bottom portions of the teeth, and/or portions of a gum line 509 near the adjacent teeth. In some arrangements, a sealant 512 or adhesive can be used to attach the cap 502 to the teeth. As above, the chamber 504 can be at least partially, or substantially, filled with a treatment liquid. Indeed, because the carious region 515 is on the proximal surface 517 between two neighboring teeth, it can be desirable to form an enclosed volume that encloses both neighboring teeth and that seals the teeth from the outside environs. Fluid can thus be at least partially retained in a space between two adjacent teeth. Thus, liquid can be provided in the chamber 504 without leaking from the fluid platform 501.

The pressure wave generator 505 can be activated to generate the pressure waves 503, which can propagate through the treatment fluid to the carious region 515 located on the proximal surface 517 of the tooth 510. Advantageously, the pressure waves 503 can reach and clean the carious region 515 even though the carious region 515 is located at least partially between two adjacent teeth at a distance from the fluid platform 501. In some cases, the carious region 515 may be located entirely between two adjacent teeth. Furthermore, as explained above, the pressure waves 503 can remove the caries from the carious region 515 without damaging healthy portions of the two adjacent teeth covered by the cap 502. Thus, the embodiments disclosed herein can be used to treat any suitable surface of a tooth having a caries. Indeed, by generating pressure waves that can propagate through a treatment fluid, the disclosed pressure wave generators can clean carious regions of a diseased tooth that are at locations remote or at a distance from the fluid platform.

VI. Additional Fluid Platform Arrangements

Additional fluid platform arrangements may be used with the embodiments disclosed herein. The fluid platforms can provide an interface between the handpiece and the carious region to be treated. As explained above, the fluid platforms can include a fluid retainer or cap that can attach to a tooth. A pressure wave generator can be coupled to the fluid retainer and/or a handpiece. Furthermore, the fluid platforms can include inlets, outlets, vents, and other features to direct fluids through the dental apparatus and to the tooth.

Figure 6:
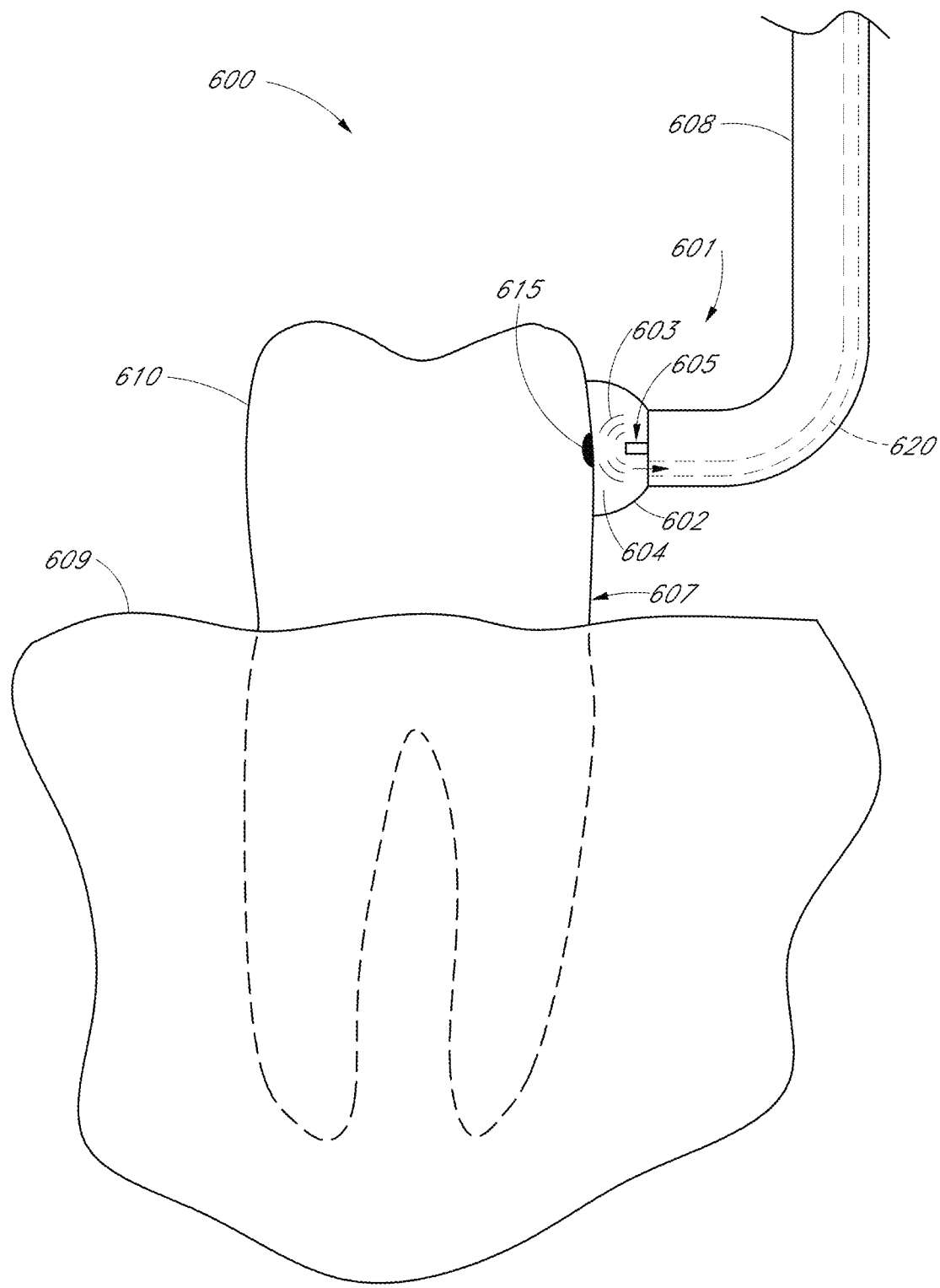
FIG. 6 is a schematic side cross-sectional view of a dental system that includes a fluid platform having a fluid outlet.

FIG. 6 is a schematic side cross-sectional view of a dental system 600 that includes a fluid platform 601 having a fluid outlet 620. As shown in FIG. 6, the system 600 can be coupled to a tooth 610 having a carious region 615 on a side surface 607 of the tooth 610, e.g., above a gum line 609. It should be appreciated that, while the carious region 615 is on the side surface 607 in FIG. 6, the components of the fluid platform 601 of FIG. 6 can also be used to treat caries on an occlusal or proximal surface, as well. Furthermore, unless otherwise noted, components illustrated in FIG. 6 may be the same as or similar to components illustrated in FIGS. 1A-5B, except the reference numbers are incremented by 100 relative to the components of FIGS. 5A-5B. For example, the system 600 can include a handpiece 608, a cap 602 that includes or defines a chamber 604, and a pressure wave generator 605 configured to generate pressure waves 603 sufficient to remove caries without damaging healthy portions of the tooth 610.

The fluid platform 601 of FIG. 6 also includes the fluid outlet 620. The fluid outlet 620 can act as a waste line, in which waste fluid from the chamber 604 can be expelled from the cap 602. The fluid outlet 620 can be incorporated to allow waste liquid to exit the cap 602 into a hose which can be connected to a collection canister or a drain. The fluid outlet 620 can be an active or passive outlet. For a passive fluid outlet 620, in some cases the waste treatment liquid moves through a conduit due to capillary forces, gravity, or because of a slight overpressure created in the enclosed volume. For an actively pumped fluid outlet 620, the waste liquid can be transferred using a pump, suction, or other device that draws liquid out through an outflow conduit. In some arrangements, for example, the fluid outlet 620 can be connected to the suction system and/or vacuum lines in the clinician's office.

The pressure wave generator 605 of FIG. 6 can be a liquid jet apparatus in some embodiments. As above, the liquid jet can create pressure waves 603 sufficient to remove decayed matter from the carious region 615 without damaging healthy portions of the tooth 610. In addition to cleaning the carious region 615, the liquid jet can also provide a fluid inlet, in which treatment fluid is introduced into the chamber 604 by way of the jet. The fluid platform 601 of FIG. 6 can act as a closed fluid system in some embodiments, such that substantially all the fluid that enters the chamber 604 exits through the fluid outlet 620.

Figure 7:
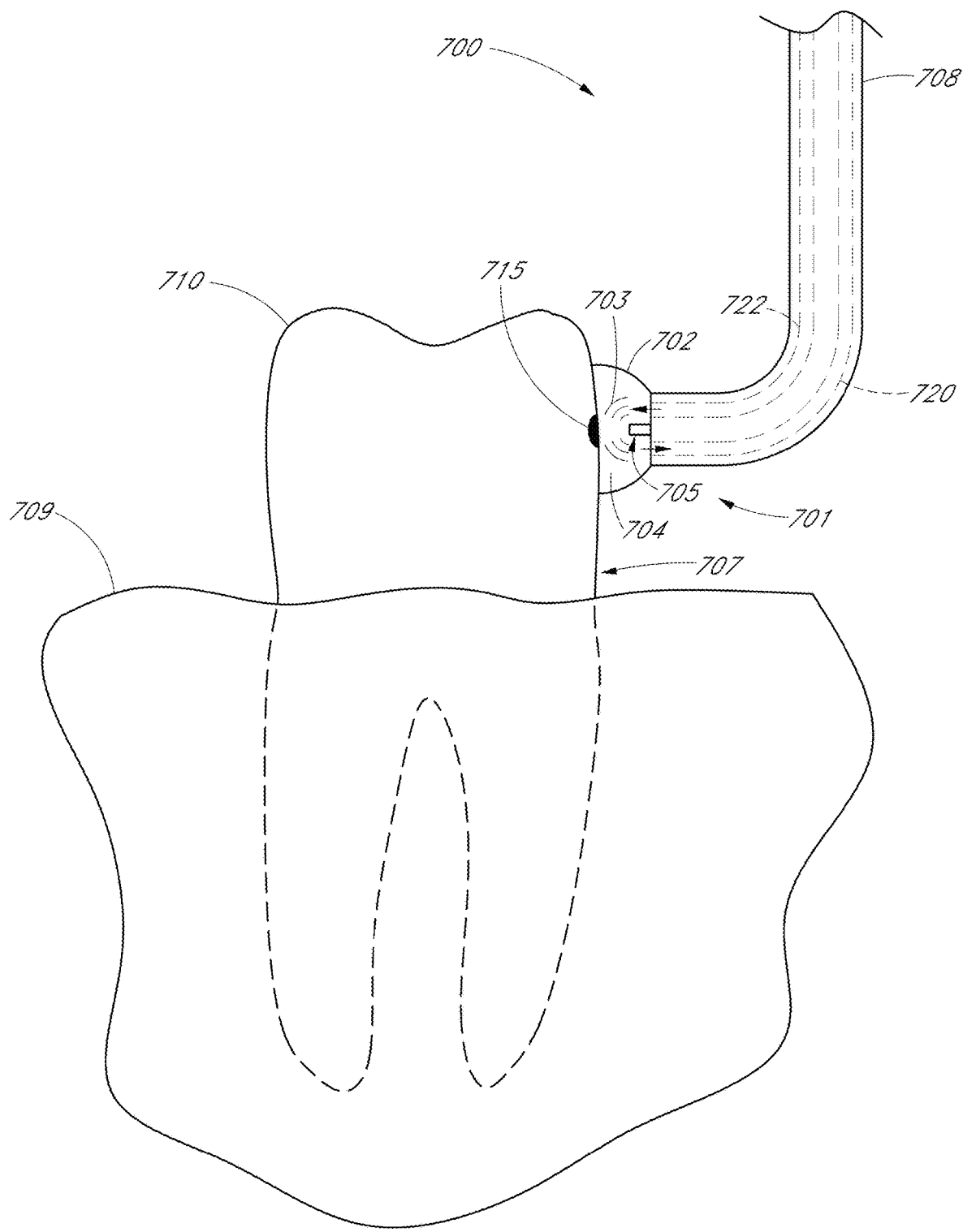
FIG. 7 is a schematic side cross-sectional view of a dental system that includes a fluid platform having a fluid outlet and a fluid inlet.

FIG. 7 is a schematic side cross-sectional view of a dental system 700 that includes a fluid platform 701 having a fluid outlet 720 and a fluid inlet 722. The system 700 can be coupled to a tooth 710 over a carious region 715, which is on a side surface 707 of the tooth 710 (e.g., above a gum line 709) in FIG. 7, although the carious region 715 can be on any other surface of the tooth 710, as explained above. Unless otherwise noted, components illustrated in FIG. 7 can be the same as or similar to components illustrated in FIGS. 1A-6, except the reference numbers are incremented by 100 relative to the components of FIG. 6. For example, the system 700 can include a handpiece 708, a cap 702 that includes or defines a chamber 704, and a pressure wave generator 705 configured to generate pressure waves 703 sufficient to remove caries without damaging healthy portions of the tooth 710.

The fluid platform 701 of FIG. 7 can also include a fluid outlet 720 and the fluid inlet 722. As explained above with respect to FIG. 6, the fluid outlet 720 can be configured to remove waste fluid from the chamber 704. The fluid inlet 722 can be an active inlet, such that a pump (not shown) can be activated to drive treatment fluid into the chamber 704. In some cases, the fluid inlet 722 can be the same as the pressure wave generator 705, e.g., when the pressure wave generator 705 is a liquid jet. The fluid inlet 722 can supply fresh treatment fluid to the chamber 704 of the cap 702 such that the chamber 704 remains at least partially, or substantially, filled with liquid during treatment. As above, the pressure wave generator 705 can be activated inside the liquid filled cap 702 to propagate pressure waves 703 through the fluid to remove decayed matter from the carious region 715. The fluid inlet 722 can be in fluid communication with a fluid reservoir, supply, or source that provides the fluid to be delivered to the tooth via the inlet 722. As explained above, the fluid can be delivered under pressure, for example, by use of one or more pumps or by using a gravity feed. The fluid platform 701 can include additional components (not shown) including, e.g., pressure regulators, pressure sensors, valves, etc.

Figure 8:
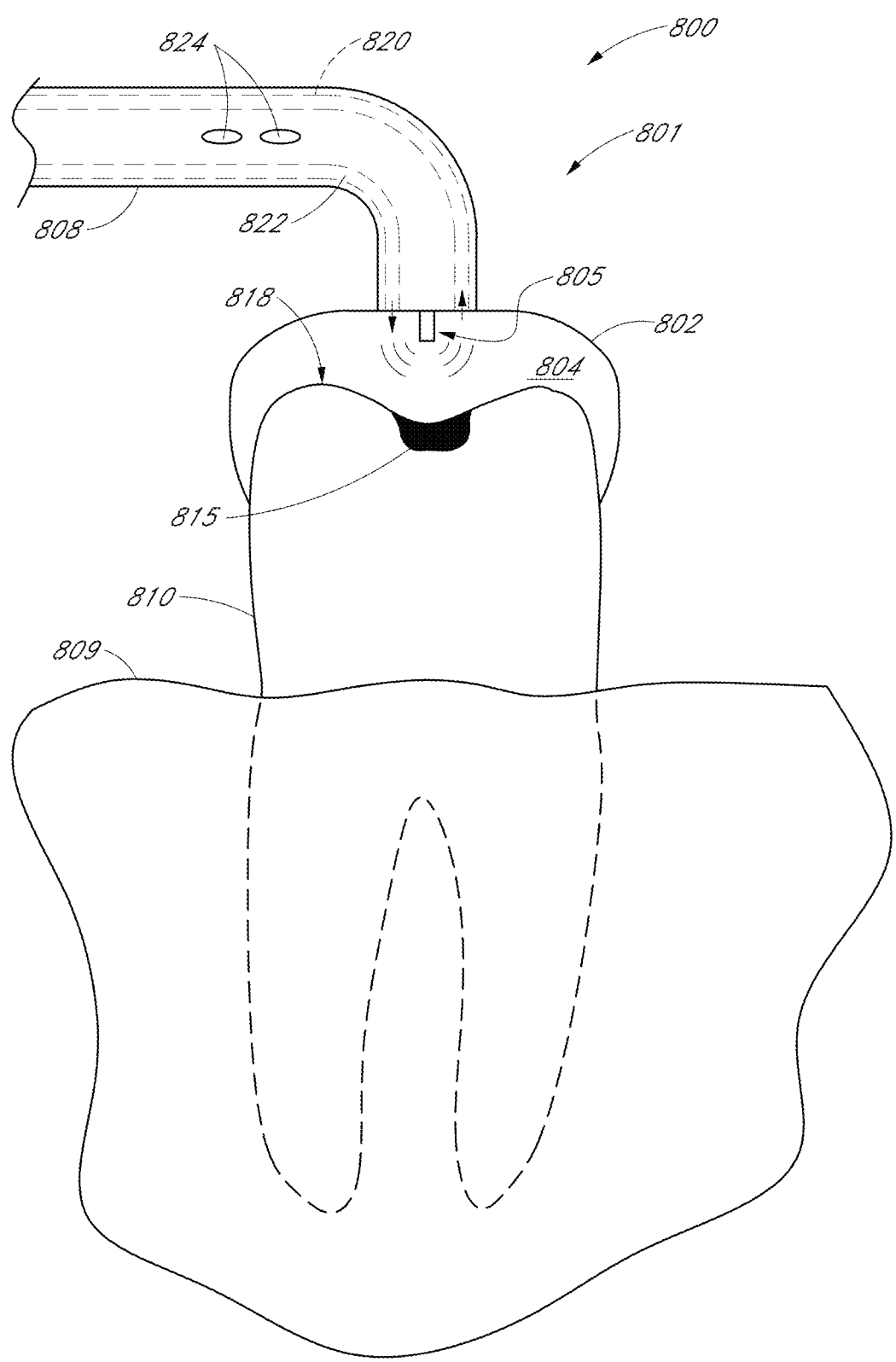
FIG. 8 is a schematic side cross-sectional view of a dental system that includes a fluid platform having a fluid outlet, a fluid inlet, and one or more vents.

FIG. 8 is a schematic side cross-sectional view of a dental system 800 that includes a fluid platform 801 having a fluid outlet 820, a fluid inlet 822, and one or more vents 824. In FIG. 8, the system 800 is coupled to a tooth 810 to treat a carious region 815 on an occlusal surface 818 of the tooth 810 (e.g., above a gum line 809), similar to the embodiment disclosed in FIG. 4. Of course, the fluid platform 801 of FIG. 8 can also be configured to treat caries on any surface of the tooth 810, such as a lingual, buccal, or proximal surface. Unless otherwise noted, components illustrated in FIG. 8 may be the same as or similar to components illustrated in FIGS. 1A-7, except the reference numbers are incremented by 100 relative to the components of FIG. 7. For example, the system 800 can include a handpiece 808, a cap 802 that includes or defines a chamber 804, and a pressure wave generator 805 configured to generate pressure waves 803 sufficient to remove caries without damaging healthy portions of the tooth 810. The chamber 804 can be at least partially or substantially filled with a treatment liquid, and the generated pressure waves 803 can propagate through the treatment liquid to remove the caries.

As with the embodiment of FIG. 7, the fluid inlet 822 and the fluid outlet 820 can be included in the fluid platform 801 to supply fresh treatment liquid to the chamber 804 of the cap 802 and to remove waste liquid from the chamber 804, respectively. Furthermore, in FIG. 8, the fluid platform 801 includes one or more vents 824. The vents 824 can act to at least partially regulate pressure of the liquid inside the chamber 804 of the cap 802. For example, the vents 824 can be disposed along the fluid outlet 820 (e.g., waste line).

In some vented fluid platforms, the inlet and outlet flow rates can be driven by independent driving forces. For example, in some implementations, the fluid inlet 822 can be in fluid communication with and driven by a pressure pump, while the fluid outlet 820 can be in fluid communication with and controlled via an evacuation system (e.g., a suction or vacuum pump). In other implementations, the fluid inlet 822 or outlet 820 can be controlled with a syringe pump. The pressures of the fluid inlet 822 and the fluid outlet 820 can be such that a negative net pressure is maintained in the chamber 804. Such a net negative pressure can assist delivering the treatment fluid into the chamber 804 from the fluid inlet 822.

In various embodiments described herein, the vents 824 can take the form of a permeable or semi-permeable material (e.g., a sponge), openings, pores, or holes, etc. The use of vents in a controlled fluid platform can lead to one or more desirable advantages. For example, the evacuation system can collect waste fluid from the chamber 804, as long as there is any available. If there is a pause in treatment (e.g. the time between treatment cycles), waste fluid flow may stop, and the evacuation system may start drawing air through the one or more vents 824 to at least partially compensate for the lack of fluid supplied to the evacuation system, rather than depressurizing the chamber 804. If the evacuation system stops working for any reason, the waste fluid may flow out through the one or more vents into the patient's mouth or onto a rubber dam (if used), where it can be collected by an external evacuation line. Therefore, the use of vent(s) can tend to dampen the effects of the applied pressure differential, and therefore can inhibit or prevent negative or positive pressure buildup. Also note that positive or negative pressure inside the chamber 804 can exert some amount of force on the sealing material(s), and as such a stronger seal may be required to withstand such force in some cases. Possible advantages of some vented systems include that the vent(s) help relieve pressure increases (or decreases) inside the chamber 804, reduce or eliminate the forces acting on the sealing material(s), and therefore render the sealing more feasible and effective.

Figure 9A:
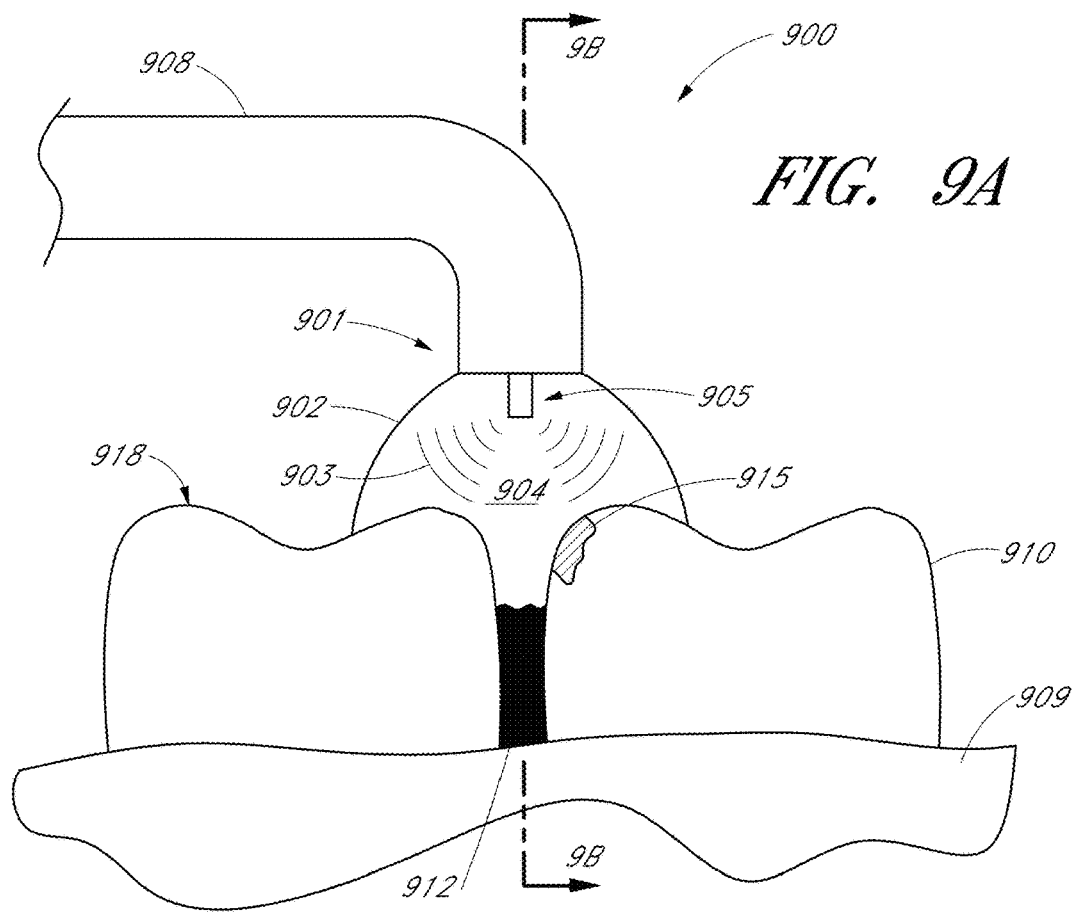
FIG. 9A is a schematic side cross-sectional view of a dental system that includes a fluid platform coupled to two adjacent teeth and configured to treat a carious region between the two teeth.
Figure 9B:
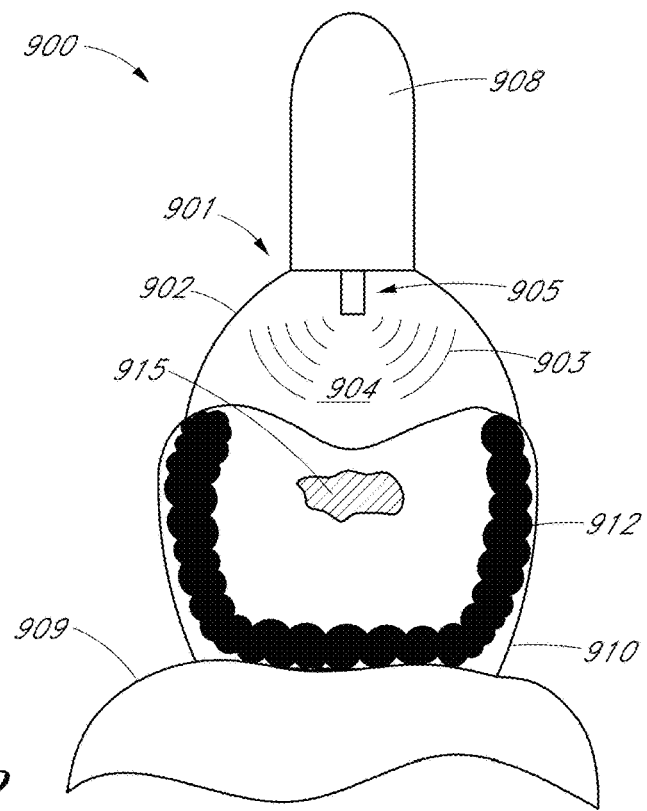
FIG. 9B is a side cross-sectional view of the system of FIG. 9A, taken along line 9B-9B.

FIG. 9A is a schematic side cross-sectional view of a dental system 900 that includes a fluid platform 901 coupled to two adjacent teeth and configured to treat a carious region 915 between the two teeth. FIG. 9B is a side cross-sectional view of the system 900 in FIG. 9A, taken along line 9B-9B. In particular, the carious region 915 in FIG. 9 is situated on a proximal surface of a tooth 910 to be treated. Unless otherwise noted, components illustrated in FIGS. 9A-9B may be the same as or similar to components illustrated in FIGS. 1A-8, except the reference numbers are incremented by 100 relative to the components of FIG. 8. For example, the system 900 can include a handpiece 908, a cap 902 that includes or defines a chamber 904, and a pressure wave generator 905 configured to generate pressure waves 903 sufficient to remove caries without damaging healthy portions of the tooth 910. The chamber 904 can be at least partially or substantially filled with a treatment liquid, and the generated pressure waves 903 can propagate through the treatment liquid to remove the caries.

In the embodiment of FIGS. 9A-9B, the cap 902 can be attached to the top or occlusal surfaces 918 of the tooth 910. For example, an adhesive or sealant can be applied to attach the cap 902 to portions of the occlusal surfaces 918 of the tooth 910 in some embodiments. It should be appreciated that when the cap 902 is coupled to the occlusal surfaces 918 of the tooth 910, there still may be gaps between the adjacent teeth, even when the cap 902 is sealed to the tooth 910. Such gaps may not be desirable, because treatment fluid may leak or flow out through the gaps, which may inhibit the operation and/or reduce the effectiveness of waves 903 generated by the pressure wave generator 905. It can therefore be advantageous to seal the gaps such that a fluid seal is formed between the cap 902, the two adjacent teeth, and a gum line 909 of the tooth 910. Providing such a fluid seal can act to retain the treatment fluid within the chamber 904 of the fluid platform 901.

In some embodiments, for example, the fluid platform 901 can include a sealing material 912 to seal the cap 902 to the tooth 910 and to close the gaps between adjacent teeth. In particular, the sealing material 912 or sealant (which can include, e.g., a bite registration material in some embodiments) can be used to provide a seal around the space between the two teeth and to maintain the chamber 904 substantially filled with liquid. For example, the sealing material 912 can be applied between the two teeth and can be applied from the cap 902 (e.g., where the cap 902 spans the gap), down along the sides between the two teeth and along the gum line 909 between the two teeth. The fluid platform 901 can therefore substantially enclose a volume defined by, e.g., the cap 902, the sealing material 912, and the two adjacent teeth.

As above, the pressure wave generator 905 can be activated such that pressure waves 903 propagate through the fluid to clean caries from the carious region 915 on the side of the tooth 910. For example, in some treatments, it can be advantageous to dispose the pressure wave generator in the vicinity of the caries. Although two teeth are shown in FIGS. 9A-9B, in other embodiments, the cap 902 can enclose three or more teeth.

VII. Example Treatment Methods

Figure 10:
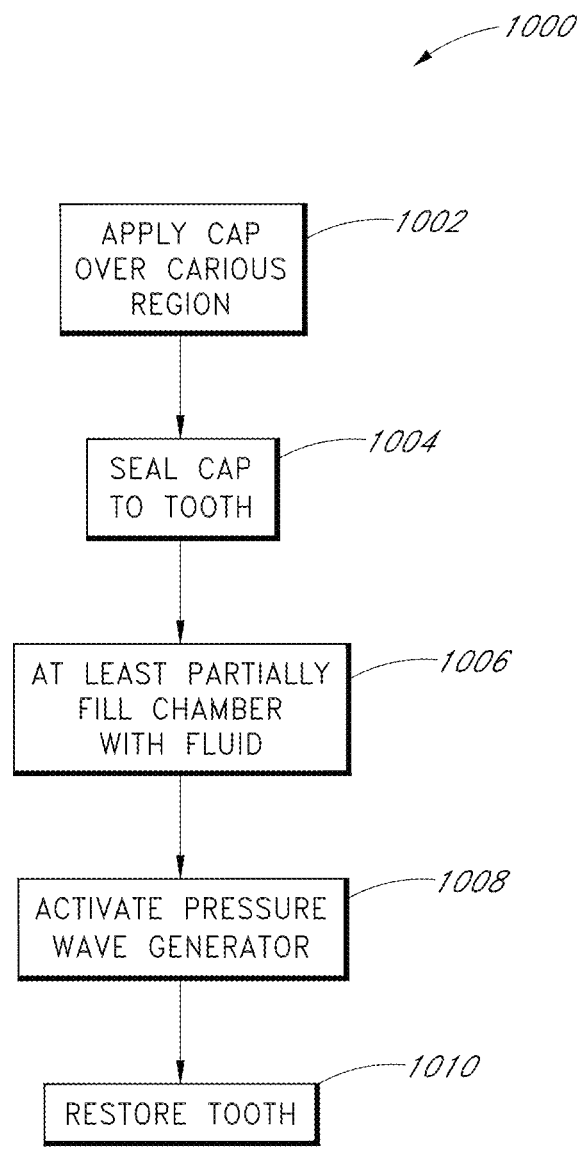
FIG. 10 is a flowchart illustrating one example method for cleaning caries from a tooth.

As explained herein, a clinician can use the embodiments disclosed herein to clean caries (e.g., cavities or holes in a tooth) on a tooth. FIG. 10 is a flowchart illustrating one example method 1000 for cleaning caries from a tooth. The method 1000 can begin in a block 1002, in which a cap is applied over a carious region of a tooth. As explained herein, the carious region may be large or small, cavitated or non-cavitated. Furthermore, the carious region may reside on any surface of the tooth, including side surfaces (e.g., lingual, buccal, proximal, etc.) and occlusal surfaces. The cap can be formed of a flexible material and can define or include a chamber configured to retain treatment fluid. The cap can be disposed or coupled to a distal portion of a handpiece. The clinician can use the handpiece to manipulate the cap over the carious region. Indeed, the cap can be applied only over a small portion of the carious region, such as only over a portion of the side surface of the tooth (see, e.g., FIG. 1B). In other embodiments, the cap can be applied over substantially the entire crown of the tooth (see, e.g., FIG. 4). In yet other embodiments, the cap can be applied over the entire occlusal surfaces and/or crowns of two or more adjacent teeth (see, e.g., FIG. 5). Further, the cap can be applied only over portions of occlusal surfaces of two or more adjacent teeth (see, e.g., FIGS. 9A-9B).

Turning to a block 1004, the cap can be sealed to the tooth. As explained above, it can be desirable to form a substantially sealed chamber or enclosed volume to accommodate treatment fluid. To seal the cap to the tooth, in some embodiments, a sealant or adhesive is applied around the perimeter of the cap to adhere the cap to a suitable surface of the tooth (or teeth). The seal can be any suitable sealant or adhesive, such as silicones, impression materials, bite registration materials, etc. Additional examples of sealing materials are 3M Imprint™ Bite, Jet Blue Bite by Colténe Whaledent®. Still other sealing materials may be suitable. Furthermore, as explained with respect to FIGS. 9A-9B, the sealing material can also be applied in gaps between two adjacent teeth. For example, the sealant can be applied between the applied cap, the teeth, and a gum line. The sealant can thereby create a substantially sealed chamber in which treatment fluid can be retained.

The method 1000 moves to a block 1006, in which a chamber of the cap is at least partially filled with fluid. In various embodiments disclosed herein, the fluid can be introduced with a fluid inlet. In some arrangements, the fluid inlet can also act as a pressure wave generator (e.g., when the pressure wave generator is a liquid jet device). In some embodiments, the chamber is substantially filled with a treatment fluid. For example, the chamber can be filled above about 30% of the volume of the chamber, above about 50% of the volume of the chamber, above about 60% of the volume of the chamber, above about 75% of the volume of the chamber, above about 90% of the volume of the chamber, about 100% of the volume of the chamber, etc. The treatment fluid can be any suitable treatment fluid, such as water, saline, etc. The solution can also be degassed to improve cavitation and reduce the presence of gas bubbles inside the caries in some treatments. It should be appreciated that, by at least partially filling or by substantially filling the chamber, pressure waves generated by the pressure wave generator can propagate through the fluid and interact with the carious regions to remove caries from the tooth.

Turning to a block 1008, a pressure wave generator is activated in the chamber to clean the carious region of the tooth. As explained above, a portion of the pressure wave generator, such as a distal portion, can be inserted in the chamber of the cap. In some arrangements, the distal portion of the pressure wave generator can be submerged in the treatment liquid. The pressure wave generator can be any suitable apparatus that creates sufficient pressure waves to clean caries from a tooth. For example, the pressure wave generator can include devices that generate mechanical energy (e.g., a liquid jet, a mechanical paddle or rotor), electromagnetic energy (e.g., a laser), acoustic energy (e.g., an ultrasound horn or a piezoelectric oscillator), etc.

To clean the caries, the pressure wave generator can be activated for any suitable period of time by a clinician. For example, in various embodiments, activating the pressure wave generator for a time period less than about 15 minutes can substantially remove the caries. In some arrangements, the pressure wave generator can be activated for a time period in a range of about 0.1 minutes to about 20 minutes to clean the carious region, depending on the extent and location of the caries to substantially remove the caries. For example, in some embodiments, the pressure wave generator can be activated for a time period in a range of about 0.1 minutes to about 5 minutes to clean the carious region, depending on the extent and location of the caries to substantially remove the caries. As explained herein, the generated pressure waves may in some cases create a cavitation cloud that removes the caries from healthy portions of the tooth. Indeed, the disclosed embodiments allow for the removal of caries in a non-invasive manner, such that substantially all the caries are removed while leaving healthy portions of the tooth unharmed.

The method moves to a block 1010 to restore the tooth. Once the caries have been substantially cleaned using the pressure wave generator, portions of the tooth structure may be missing, e.g., portion in the carious regions of the tooth. In some embodiments, the clinician can restore the tooth by applying a restoration material such as composite. In some cases, a crown can be applied over the treated tooth to restore the tooth. In other cases, however, the removed carious portions may be relatively small, such that no or minimal restoration is desirable. For example, when small caries are removed, a sealant and/or antimicrobial or fluoride agents can be applied to restore the treated tooth.

VIII. Treatment Solutions

The treatment solutions disclosed herein can be any suitable fluid, including, e.g., water, saline, etc. In some embodiments, the treatment solution can be degassed, which may improve cavitation and/or reduce the presence of gas bubbles inside the caries in some treatments. In some embodiments, the dissolved gas content can be less than about 1% by volume. Various chemicals can be added to treatment solution, including, e.g., tissue dissolving agents (e.g., NaOCl), disinfectants (e.g., chlorhexidine), anesthesia, fluoride therapy agents, EDTA, citric acid, and any other suitable chemicals. In some embodiments, chemicals and the concentrations of the chemicals can be varied throughout the procedure by the clinician and/or by the system to improve patient outcomes.

One example of a treatment solution comprises water or saline with 0.3% to 6% NaOCl. In some methods, tissue dissolution and caries removal in the presence of NaOCl may not occur when the NaOCl concentration is less than 1%. In some treatment methods disclosed herein, tissue dissolution and caries removal can occur at smaller (or much smaller) concentrations.

IX. Enhancing the Removal of Caries

As explained above, a pressure wave generator can remove dental caries by propagating pressure waves through a propagation medium to the carious region. Without being limited by theory, a few potential ways that the pressure waves are believed to clean caries are presented below. Note that these principles, and the principles described above, are generally applicable for each embodiment disclosed herein, e.g., each of the embodiments of FIGS. 1-10.

Pressure waves generated by the pressure wave generator can interact with diseased and damaged hard tissue as well as soft tissues, food and bacteria inside the carious regions. The generated pressure waves can be tuned to have no or minimal (negligible) effect on healthy dentin and enamel. When the pressure waves remove the caries and reach healthy dentin or enamel, the tissue removal action stops or slows down such that the health tooth matter is maintained. Thus, as compared with conventional mechanical treatments, the disclosed pressure wave generators can advantageously remove caries in a non-invasive manner and without damaging healthy tooth matter.

In some arrangements, cavitation may be induced by the generated pressure waves. Upon irradiation of a liquid (e.g., water) with high intensity pressure waves (e.g., sound or ultrasound), acoustic cavitation may occur. The oscillation or the implosive collapse of small cavitation bubbles can produce localized effects, which may further enhance the cleaning process, e.g., by creating intense, small-scale localized heat, shock waves, and/or microjets and shear flows. Therefore, in some treatment methods, acoustic cavitation may be responsible for or involved in enhancing the chemical reaction, sonochemistry, sonoporation, soft tissue/cell/ bacteria dissociation, delamination and breakup of biofilms.

For example, if the treatment liquid contains chemical(s) that act on hard and/or soft tissues, the pressure waves (acoustic field) and/or the subsequent acoustic cavitation may enhance the chemical reaction via agitation and/or sonochemistry. Furthermore, sonoporation, which is the process of using pressure waves (e.g., acoustic field, ultrasonic frequencies) and/or the subsequent acoustic cavitation to modify the permeability of the cell plasma membrane, may also expedite the chemical reaction that removes the carious regions from the tooth. It should also be appreciated that generated pressure waves, and/or the subsequent acoustic cavitation of certain frequencies, may result in cellular and bacterial rupture and death (e.g., lysis) as well as removal of decayed and weakened dentin and enamel. The cellular and bacterial rupture phenomenon may kill bacteria which might otherwise reinfect the tooth.

Generated pressure waves and/or the subsequent acoustic cavitation may also loosen the bond between the cells, bacteria, and biofilm, and/or the pressure waves may dissociate the tissue. In some cases, pressure waves and/or acoustic cavitation may loosen the bond between the cells and the dentin and/or delaminate the tissue from the tooth. Furthermore, the pressure waves and/or the subsequent acoustic cavitation may act on decayed hard tissue (which may be relatively weak and loosely connected) through vibrations and/or shock waves, and/or the microjets created as a result of cavitation bubble implosion, to remove decayed hard tissue from other healthy portions of the tooth.

Some properties can be adjusted or selected in various embodiments to enhance the cleaning process. For example, liquid properties such as, e.g., surface tension, boiling or vapor temperature, or saturation pressure can be adjusted or selected by the clinician to improve the cleaning process. Furthermore, the dissolved gas content of the treatment liquid can be adjusted or selected to reduce the energy loss of pressure waves that are created by hydrodynamic cavitation or other sources. As explained herein, for example, the treatment liquid can be degassed, which may help preserve the energy of the pressure waves and may increase the efficiency of the system.

In some arrangements, liquid circulation (e.g., convection) can enhance the cleaning of caries from a diseased tooth. Due to relatively short time scales of the reaction process as compared to that of diffusion mechanisms, a faster mechanism of reactant delivery such as "macroscopic" liquid circulation can be advantageous in some of the embodiments disclosed herein. For example, liquid circulation with a time scale comparable to (and preferably faster than) that of chemical reaction may help replenish the reactants at the chemical reaction front and/or may help to remove the reaction byproducts from the reaction site. The convective time scale, which may relate to effectiveness of the convection process, can be adjusted and/or optimized depending on, e.g., the location and characteristics of the source of circulation. Furthermore, it should be appreciated that the introduction of liquid circulation generally does not eliminate the diffusion process, which can still remain effective within a thin microscopic layer at the chemical reaction front. Liquid circulation can also cause a strong irrigation in the caries and may therefore result in loosening and/or removing larger pieces of debris from the caries.

In some arrangements, various properties can be adjusted to enhance liquid circulation, e.g., in the chamber of the cap. For example, the source of circulation relative to the location of the caries can be adjusted. In some cases, for example, the handpiece can be used to position the cap, fluid inlet, fluid outlet, and pressure wave generator to enhance circulation and caries removal. The geometry of the enclosed space with which the source of circulation and caries are enclosed may also be varied. For example, the disclosed embodiments illustrate various designs for the cap and chamber of the fluid platform. In other arrangements, however, the cap can be shaped in any other suitable shape or configuration to enhance the removal of the caries. It should also be appreciated that circulation may be affected by the viscosity of the treatment liquid and/or the mechanism of action of the source of circulation. For example, the circulation source, such as a jet of liquid ejected through the inlet opening, a stirrer such as a propeller or a vibrating object, etc., may be selected to enhance circulation of the fluid in the fluid retainer or cap. In some aspects, the input power of the source of liquid circulation can also be adjusted, such as the source of a pump that drives a liquid jet in some embodiments.

Various reaction chemistries can be adjusted or designed to improve the caries removal process. For example, to enhance the dissolution of organic tissue in the carious region, a tissue dissolving agent (e.g., sodium hypochlorite—NaOCl) can be added to the treatment liquid. The agent may react with organic tissue during a chemical reaction. In some cases, tissue dissolution may be a multi-step process. The agent may dissolve or dissociate organic matter and bacteria inside the caries, which may result in better patient outcomes. Furthermore, in some embodiments, a decalcifying agent (e.g., an acid such as EDTA or citric acid) can be added to the treatment liquid. The decalcifying agent may further soften the diseased hard tissue (dentin/enamel) facilitating the cleaning and removal of caries.

Sodium hydroxide can be generated from the sodium hypochlorite reaction when the tissue is dissolved and can react with organic and fat (triglycerides) molecules to produce soap (fatty acid salts) and glycerol (alcohol). This reaction may reduce the surface tension of the remaining solution, which in turn may facilitate the penetration of the treatment liquid into small or microscopic spaces inside the caries and to remove bubbles formed due to the chemical reaction. Sodium hydroxide can also act to neutralize amino acids that form amino acid salts and water. The consumption of NaOH can reduce the pH of the remaining solution.

Hypochlorous acid, a substance that can be present in sodium hypochlorite solution, e.g., the tissue dissolving agent, may release chlorine that can react with amino groups of proteins and amino acids to produce various chloramines derivatives. For example, hypochlorous acid can react with free amino acids in tissue to form N-chloro amino acids which are strong oxidizing agents that may have higher antiseptic activity than hypochlorite.

In some embodiments, the cavitation dynamics that result from the generated pressure waves can be modified by adjusting the chemicals used in the treatment fluid. For example, the chemical(s) in the fluid may affect the surface tension of the solution, which in turn may change the cavitation phenomenon. For example, a solution of an inorganic chemical such as, e.g., sodium hypochlorite in water, may increase the ion concentration in the solution which may increase the surface tension of the solution. Increasing the surface tension can advantageously result in stronger cavitation in some cases, which can enhance the cleaning action of the procedure. In some cases, the magnitude of a cavitation inception threshold may increase with increasing surface tension, and the cavitation inducing mechanism (e.g., pressure wave generator) may need to generate waves that are sufficiently intense to pass the threshold in order to have inception of cavitation bubbles. Without being limited by theory, however, it is believed that once the cavitation threshold is passed, increased surface tension may typically result in stronger cavitation. For example, the solution of sodium hypochlorite in water can result in the following equilibrium reaction, which may increase the ionic concentration of the liquid and therefore may improve cavitation in some arrangements.

$$NaOCl+H_2 \leftrightarrow NaOH+HOCl \leftrightarrow Na^+ + OH^- + H^+ + OCl^-$$

In some embodiments, accelerated bubble removal from the site of caries may be arranged. For example, in some methods, a chemical, such as NaOCl, may cause saponification. The removal of bubbles created or trapped inside the caries may be accelerated due to local reduction of surface tension at the chemical reaction front as a result of local saponification. Although in some methods it may be desirable to have a relatively high surface tension at the pressure wave source (e.g., the pressure wave generator), inside the caries it may be beneficial to have locally reduced surface tension to accelerate bubble removal. The accelerated bubble removal phenomenon may happen as tissue dissolving agent(s) react with the tissue. For example, sodium hypochlorite can act as a solvent to degrade fatty acids and to transform them into fatty acid salts (soap) and glycerol (alcohol) that can reduce the surface tension of the remaining solution at the chemical reaction front.

Other properties or variables can be adjusted or selected to enhancing the cleaning procedure. For example, a chemical reaction rate can be adjusted for each chemical reaction, which may determine the overall speed of reaction. In some cases, for example, the temperature can be adjusted to adjust the reaction rate. In addition, a concentration of reactants can be an important factor that may affect the time for the reaction to complete, e.g., the time to complete the cleaning of the carious region. For instance, a 5% NaOCl solution generally may be more aggressive than a 0.5% NaOCl solution and may tend to dissolve tissue faster. In some cases, a reactant refreshment rate can be adjusted. For example, bubbles may form and stay at the chemical reaction front (e.g., due to surface tension forces) and may act as barriers at the chemical reaction front impeding or preventing fresh reactants from reaching the reaction front. The circulation of the treatment liquid can help remove the bubbles and the reaction byproducts, and may replace them with fresh treatment liquid.

In some embodiments, the introduction of heat can increase the chemical reaction rate. Heat can be introduced into the system through a variety of source(s). For example, the treatment fluid can be preheated using any suitable heating technique. Further, heat can be generated from cavitation or from other internal or external dissipative sources. In some arrangements, heat can be produced from exothermic chemical reactions that may further enhance or increase reaction rates, which can increase the speed of the cleaning process.

In some arrangements, sonication can occur. For example, upon irradiation of a liquid (e.g. water) with high intensity pressure waves (including, e.g., sonic or ultrasonic waves) acoustic cavitation may occur. The oscillation and/or implosive collapse of the cavitation bubbles can produce intense local heating and high pressures with short lifetimes. Experimental results have shown that at the site of the bubble collapse, the temperature and pressure may reach around 5000 K and 1000 atm, respectively. This phenomenon, known as sonochemistry, can create extreme physical and chemical conditions in otherwise cold liquids. Sonochemistry, in some cases, has been reported to enhance chemical reactivity by as much as a millionfold. Such high temperatures and pressures can assist in removing caries from the tooth. In yet other aspects, however, when acoustic cavitation does not occur (or occurs at a relatively low amplitude), the vibration and agitation of reactants, due to the pressure waves, may enhance the chemical reaction as it assists in replacing the byproducts by fresh reactants. The pressure waves generated by the pressure wave generator can therefore effectively and quickly remove caries from the tooth to be treated.

X. Examples of Acoustic Power Generated by Pressure Wave Generators

Figure 11A:
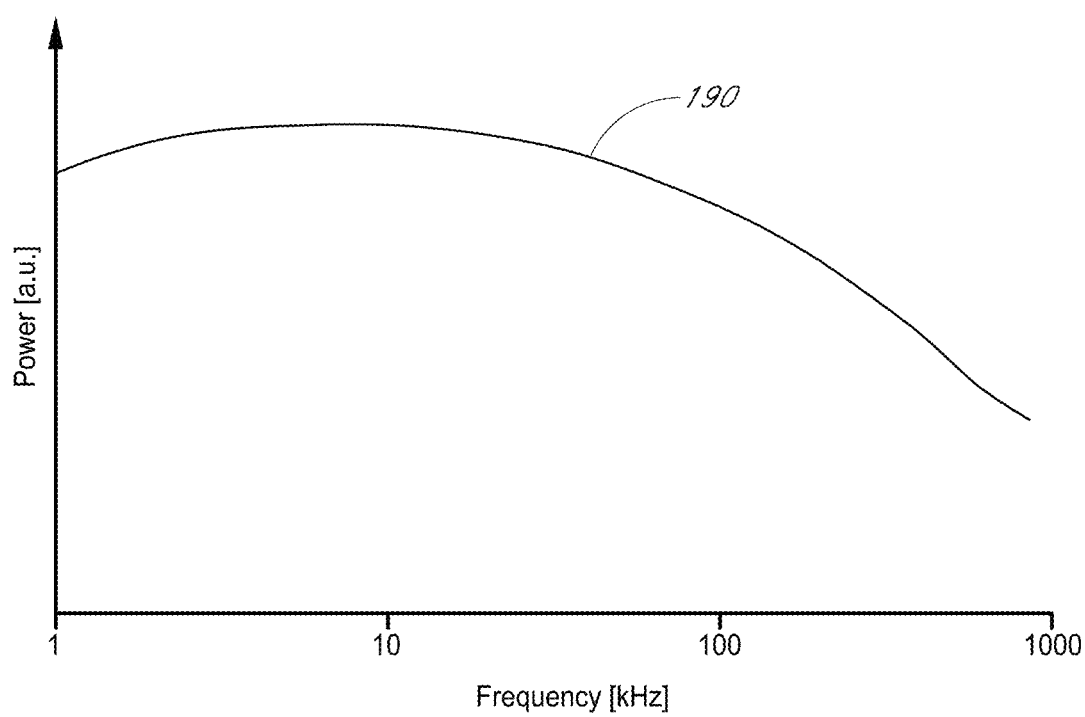
FIG. 11A schematically illustrates an example of acoustic power generated by a liquid jet impacting a surface disposed within a chamber on or around the tooth that is substantially filled with liquid and by the interaction of the liquid jet with fluid in the chamber.
Figure 11B:
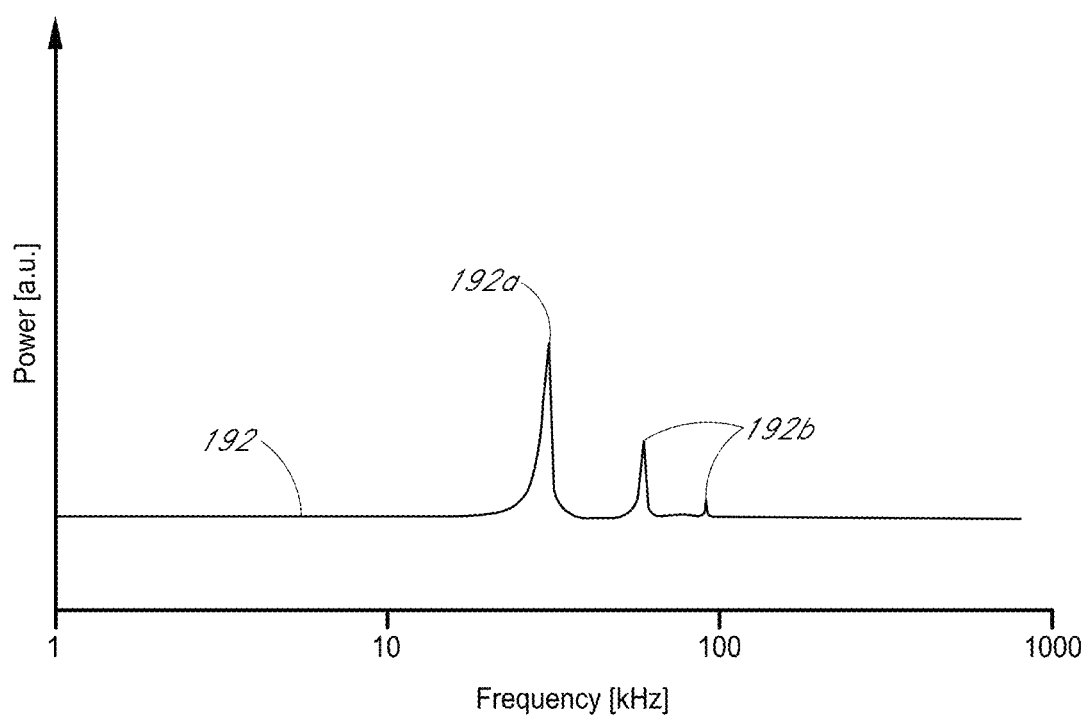
FIG. 11B schematically illustrates an example of acoustic power generated by an ultrasonic transducer disposed in a chamber on or around the tooth that is substantially filled with liquid.

FIGS. 11A and 11B are graphs that schematically illustrate possible examples of acoustic power that could be generated by different embodiments of the pressure wave generator. These graphs schematically show acoustic power (in arbitrary units) on the vertical axis as a function of acoustic frequency (in kHz) on the horizontal axis. The acoustic power in the tooth can influence, cause, or increase the strength of effects including, e.g., acoustic cavitation (e.g., cavitation bubble formation and collapse, microjet formation), acoustic streaming, microerosion, fluid agitation, fluid circulation, sonoporation, sonochemistry, and so forth, which may act to dissociate organic material in or on the tooth and effectively clean the organic and/or inorganic materials and caries. In various embodiments, the pressure wave generator can produce an acoustic wave including acoustic power (at least) at frequencies above: about 1 Hz, about 0.5 kHz, about 1 kHz, about 10 kHz, about 20 kHz, about 50 kHz, about 100 kHz, or greater. The acoustic wave can have acoustic power at other frequencies as well (e.g., at frequencies below the aforelisted frequencies).

The graph in FIG. 11A represents a schematic example of acoustic power generated by a liquid jet impacting a surface disposed within a chamber on or around the tooth that is substantially filled with liquid and by the interaction of the liquid jet with fluid in the chamber. This schematic example shows a broadband spectrum 190 of acoustic power with significant power extending from about 1 Hz to about 1000 kHz, including, e.g., significant power in a range of about 1 Hz to about 100 kHz, and e.g., significant power in a range of about 1 kHz to about 1000 kHz (e.g., the bandwidth can be about 1000 kHz). The bandwidth of the acoustic energy spectrum can, in some cases, be measured in terms of the 3-decibel (3-dB) bandwidth (e.g., the full-width at half-maximum or FWHM of the acoustic power spectrum). In various examples, a broadband acoustic power spectrum can include significant power in a bandwidth in a range from about 1 Hz to about 500 kHz, in a range from about 1 kHz to about 500 kHz, in a range from about 10 kHz to about 100 kHz, or some other range of frequencies. In some implementations, a broadband spectrum can include acoustic power above about 1 MHz. In some embodiments, the pressure wave generator can produce broadband acoustic power with peak power at about 10 kHz and a bandwidth of about 100 kHz. In various embodiments, the bandwidth of a broadband acoustic power spectrum is greater than about 10 kHz, greater than about 50 kHz, greater than about 100 kHz, greater than about 250 kHz, greater than about 500 kHz, greater than about 1 MHz, or some other value. In some cleaning methods, acoustic power between about 1 Hz and about 200 kHz, e.g., in a range of about 20 kHz to about 200 kHz, can be particularly effective at cleaning teeth. The acoustic power can have substantial power at frequencies greater than about 1 kHz, greater than about 10 kHz, greater than about 100 kHz, or greater than about 500 kHz. Substantial power can include, for example, an amount of power that is greater than 10%, greater than 25%, greater than 35%, or greater than 50% of the total acoustic power (e.g., the acoustic power integrated over all frequencies). In some arrangements, the broadband spectrum 190 can include one or more peaks, e.g., peaks in the audible, ultrasonic, and/or megasonic frequency ranges.

The graph in FIG. 11B represents a schematic example of acoustic power generated by an ultrasonic transducer disposed in a chamber on or around the tooth that is substantially filled with liquid. This schematic example shows a relatively narrowband spectrum 192 of acoustic power with a highest peak 192a near the fundamental frequency of about 30 kHz and also shows peaks 192b near the first few harmonic frequencies. The bandwidth of the acoustic power near the peak may be about 5 to 10 kHz, and can be seen to be much narrower than the bandwidth of the acoustic power schematically illustrated in FIG. 11A. In other embodiments, the bandwidth of the acoustic power can be about 1 kHz, about 5 kHz, about 10 kHz, about 20 kHz, about 50 kHz, about 100 kHz, or some other value. The acoustic power of the example spectrum 192 has most of its power at the fundamental frequency and first few harmonics, and therefore the ultrasonic transducer of this example can provide acoustic power at a relatively narrow range of frequencies (e.g., near the fundamental and harmonic frequencies). The acoustic power of the example spectrum 190 exhibits relatively broadband power (with a relatively high bandwidth compared to the spectrum 192), and the example liquid jet can provide acoustic power at significantly more frequencies than the example ultrasonic transducer. For example, the relatively broadband power of the example spectrum 190 illustrates that the example jet device provides acoustic power at these multiple frequencies with energy sufficient to break the bonds between the decayed and healthy material so as to substantially remove the decayed material from the carious region.

It is believed, although not required, that acoustic waves having broadband acoustic power (see, e.g., the example shown in FIG. 11A) can generate acoustic cavitation or other means of cleaning and disinfection that is more effective at cleaning teeth (including cleaning, e.g., dental caries or carious regions in or on the tooth) than cavitation generated by acoustic waves having a narrowband acoustic power spectrum (see, e.g., the example shown in FIG. 11B). For example, a broadband spectrum of acoustic power can produce a relatively broad range of bubble sizes in the cavitation cloud and on the surfaces on the tooth, and the implosion of these bubbles can be more effective at disrupting tissue than bubbles having a narrow size range. Relatively broadband acoustic power can also allow acoustic energy to work on a range of length scales, e.g., from the cellular scale up to the tissue scale. Accordingly, pressure wave generators that produce a broadband acoustic power spectrum (e.g., some embodiments of a liquid jet) can be more effective at tooth cleaning for some treatments than pressure wave generators that produce a narrowband acoustic power spectrum. In some embodiments, multiple narrowband pressure wave generators can be used to produce a relatively broad range of acoustic power. For example, multiple ultrasonic tips, each tuned to produce acoustic power at a different peak frequency, can be used.

XI. Degassed Treatment Fluids

As will be described below, the treatment fluid (and/or any of solutions added to the treatment fluid) can be degassed compared to normal liquids used in dental offices.

For example, degassed distilled water can be used (with or without the addition of chemical agents or solutes).

(1) Examples of Possible Effects of Dissolved Gases in the Treatment Fluid

In some procedures, the fluid may include dissolved gases (e.g., air). For example, the fluids used in dental offices generally have a normal dissolved gas content (e.g., determined from the temperature and pressure of the fluid based on Henry's law). During cleaning procedures using a pressure wave generator, the acoustic field of the pressure wave generator and/or the flow or circulation of fluids in the chamber can cause some of the dissolved gas to come out of solution and form bubbles.

The bubbles can block small passageways or cracks or surface irregularities in the tooth, and such blockages can act as if there were a "vapor lock" in the small passageways. In some such procedures, the presence of bubbles may at least partially block, impede, or redirect propagation of acoustic waves past the bubbles and may at least partially inhibit or prevent cleaning action from reaching, for example, proximal caries or other difficult-to reach carious regions. The bubbles may block fluid flow or circulation from reaching these difficult-to-reach, or otherwise small, regions, which may prevent or inhibit a treatment solution from reaching these areas of the tooth.

In certain procedures, cavitation is believed to play a role in cleaning the tooth. Without wishing to be bound by any particular theory, the physical process of cavitation inception may be, in some ways, similar to boiling. One possible difference between cavitation and boiling is the thermodynamic paths that precede the formation of the vapor in the fluid. Boiling can occur when the local vapor pressure of the liquid rises above the local ambient pressure in the liquid, and sufficient energy is present to cause the phase change from liquid to a gas. It is believed that cavitation inception can occur when the local ambient pressure in the liquid decreases sufficiently below the saturated vapor pressure, which has a value given in part by the tensile strength of the liquid at the local temperature. Therefore, it is believed, although not required, that cavitation inception is not determined by the vapor pressure, but instead by the pressure of the largest nuclei, or by the difference between the vapor pressure and the pressure of the largest nuclei. As such, it is believed that subjecting a fluid to a pressure slightly lower than the vapor pressure generally does not cause cavitation inception. However, the solubility of a gas in a liquid is proportional to pressure; therefore lowering the pressure may tend to cause some of the dissolved gas inside the fluid to be released in the form of gas bubbles that are relatively large compared to the size of bubbles formed at cavitation inception. These relatively large gas bubbles may be misinterpreted as being vapor cavitation bubbles, and their presence in a fluid may have been mistakenly described in certain reports in the literature as being caused by cavitation, when cavitation may not have been present.

In the last stage of collapse of vapor cavitation bubbles, the velocity of the bubble wall may even exceed the speed of sound and create strong shock waves inside the fluid. The vapor cavitation bubble may also contain some amount of gas, which may act as a buffer and slow down the rate of collapse and reduce the intensity of the shockwaves. Therefore, in certain procedures that utilize cavitation bubbles for tooth cleaning, it may be advantageous to reduce the amount of the dissolved air in the fluid to prevent such losses.

The presence of bubbles that have come out of solution from the treatment fluid may lead to other disadvantages during certain procedures. For example, if the pressure wave generator produces cavitation, the agitation (e.g. pressure drop) used to induce the cavitation may cause the release of the dissolved air content before the water molecules have a chance to form a cavitation bubble. The already-formed gas bubble may act as a nucleation site for the water molecules during the phase change (which was intended to form a cavitation bubble). When the agitation is over, the cavitation bubble is expected to collapse and create pressure waves. However, cavitation bubble collapse might happen with reduced efficiency, because the gas-filled bubble may not collapse and may instead remain as a bubble. Thus, the presence of gas in the treatment fluid may reduce the effectiveness of the cavitation process as many of the cavitation bubbles may be wasted by merging with gas-filled bubbles. Additionally, bubbles in the fluid may act as a cushion to damp pressure waves propagating in the region of the fluid comprising the bubbles, which may disrupt effective propagation of the pressure waves past the bubbles. Some bubbles may either form on or between tooth surfaces, or be transferred there by the flow or circulation of fluid in the tooth. The bubbles may be hard to remove due to relatively high surface tension forces. This may result in blocking the transfer of chemicals and/or pressure waves into the irregular surfaces and small spaces in and between teeth, and therefore may disrupt or reduce the efficacy of the treatment.

(2) Examples of Degassed Treatment Fluids

Accordingly, it can be advantageous in some systems and methods to use a degassed fluid, which may inhibit, reduce, or prevent bubbles from coming out of solution during treatments as compared to systems and methods that use normal (e.g., non-degassed) fluids. In dental procedures in which the treatment fluid has a reduced gas content (compared with the normal fluids) tooth surfaces or tiny spaces between teeth may be free of bubbles that have come out of solution. Acoustic waves generated by the pressure wave generator can propagate through the degassed fluid to reach and clean the surfaces, cracks, and tooth spaces and cavities. In some procedures, the degassed fluid can be able to penetrate spaces as small as about 500 microns, 200 microns, 100 microns, 10 microns, 5 microns, 1 micron, or smaller, because the degassed fluid is sufficiently gas-free that bubbles are inhibited from coming out of solution and blocking these spaces (as compared to use of fluids with normal dissolved gas content).

For example, in some systems and methods, the degassed fluid can have a dissolved gas content that is reduced when compared to the "normal" gas content of water. For example, according to Henry's law, the "normal" amount of dissolved air in water (at 25 C and 1 atmosphere) is about 23 mg/L, which includes about 9 mg/L of dissolved oxygen and about 14 mg/L of dissolved nitrogen. In some embodiments, the degassed fluid has a dissolved gas content that is reduced to approximately 10%-40% of its "normal" amount as delivered from a source of fluid (e.g., before degassing). In other embodiments, the dissolved gas content of the degassed fluid can be reduced to approximately 5%-50% or 1%-70% of the normal gas content of the fluid. In some treatments, the dissolved gas content can be less than about 70%, less than about 50%, less than about 40%, less than about 30%, less than about 20%, less than about 10%, less than about 5%, or less than about 1% of the normal gas amount.

In some embodiments, the amount of dissolved gas in the degassed fluid can be measured in terms of the amount of dissolved oxygen (rather than the amount of dissolved air), because the amount of dissolved oxygen can be more readily measured (e.g., via titration or optical or electrochemical sensors) than the amount of dissolved air in the fluid. Thus, a measurement of dissolved oxygen in the fluid can serve as a proxy for the amount of dissolved air in the fluid. In some such embodiments, the amount of dissolved oxygen in the degassed fluid can be in a range from about 1 mg/L to about 3 mg/L, in a range from about 0.5 mg/L to about 7 mg/L, or some other range. The amount of dissolved oxygen in the degassed fluid can be less than about 7 mg/L, less than about 6 mg/L, less than about 5 mg/L, less than about 4 mg/L, less than about 3 mg/L, less than about 2 mg/L, or less than about 1 mg/L.

In some embodiments, the amount of dissolved gas in the degassed fluid can be in a range from about 2 mg/L to about 20 mg/L, in a range from about 1 mg/L to about 12 mg/L, or some other range. The amount of dissolved gas in the degassed fluid can be less than about 20 mg/L, less than about 18 mg/L, less than about 15 mg/L, less than about 12 mg/L, less than about 10 mg/L, less than about 8 mg/L, less than about 6 mg/L, less than about 4 mg/L, or less than about 2 mg/L.

In other embodiments, the amount of dissolved gas can be measured in terms of air or oxygen percentage per unit volume. For example, the amount of dissolved oxygen (or dissolved air) can be less than about 5% by volume, less than about 1% by volume, less than about 0.5% by volume, or less than about 0.1% by volume.

The amount of dissolved gas in a liquid can be measured in terms of a physical property such as, e.g., fluid viscosity or surface tension. For example, degassing water tends to increase its surface tension. The surface tension of non-degassed water is about 72 mN/m at 20° C. In some embodiments, the surface tension of degassed water can be about 1%, 5%, or 10% greater than non-degassed water.

In some treatment methods, one or more secondary fluids can be added to a primary degassed fluid (e.g., an antiseptic solution can be added to degassed distilled water). In some such methods, the secondary solution(s) can be degassed before being added to the primary degassed fluid. In other applications, the primary degassed fluid can be sufficiently degassed such that inclusion of the secondary fluids (which may have normal dissolved gas content) does not increase the gas content of the combined fluids above what is desired for a particular dental treatment.

In various implementations, the treatment fluid can be provided as degassed liquid inside sealed bags or containers. The fluid can be degassed in a separate setup in the operatory before being added to a fluid reservoir. In an example of an "in-line" implementation, the fluid can be degassed as it flows through the system, for example, by passing the fluid through a degassing unit attached along a fluid line (e.g., the fluid inlet). Examples of degassing units that can be used in various embodiments include: a Liqui-Cel® MiniModule® Membrane Contactor (e.g., models 1.7×5.5 or 1.7×8.75) available from Membrana—Charlotte (Charlotte, North Carolina); a PermSelect® silicone membrane module (e.g., model PDMSXA-2500) available from MedArray, Inc. (Ann Arbor, Michigan); and a FiberFlo® hollow fiber cartridge filter (0.03 micron absolute) available from Mar Cor Purification (Skippack, Pennsylvania). The degassing can be done using any of the following degassing techniques or combinations of thereof: heating, helium sparging, vacuum degassing, filtering, freeze-pump-thawing, and sonication.

In some embodiments, degassing the fluid can include de-bubbling the fluid to remove any small gas bubbles that form or may be present in the fluid. De-bubbling can be provided by filtering the fluid. In some embodiments, the fluid may not be degassed (e.g., removing gas dissolved at the molecular level), but may be passed through a de-bubbler to remove the small gas bubbles from the fluid.

In some embodiments, a degassing system can include a dissolved gas sensor to determine whether the treatment fluid is sufficiently degassed for a particular treatment. A dissolved gas sensor can be disposed downstream of a mixing system and used to determine whether mixing of solutes has increased the dissolved gas content of the treatment fluid after addition of solutes, if any. A solute source can include a dissolved gas sensor. For example, a dissolved gas sensor can measure the amount of dissolved oxygen in the fluid as a proxy for the total amount of dissolved gas in the fluid, since dissolved oxygen may be measured more readily than dissolved gas (e.g., nitrogen or helium). Dissolved gas content can be inferred from dissolved oxygen content based at least partly on the ratio of oxygen to total gas in air (e.g., oxygen is about 21% of air by volume). Dissolved gas sensors can include electrochemical sensors, optical sensors, or sensors that perform a dissolved gas analysis. Examples of dissolved gas sensors that can be used with embodiments of various systems disclosed herein include a Pro-Oceanus GTD-Pro or HGTD dissolved gas sensor available from Pro-Oceanus Systems Inc. (Nova Scotia, Canada) and a D-Opto dissolved oxygen sensor available from Zebra-Tech Ltd. (Nelson, New Zealand). In some implementations, a sample of the treatment can be obtained and gases in the sample can be extracted using a vacuum unit. The extracted gases can be analyzed using a gas chromatograph to determine dissolved gas content of the fluid (and composition of the gases in some cases).

Accordingly, fluid delivered to the tooth from a fluid inlet and/or the fluid used to generate the jet in a liquid jet device can comprise a degassed fluid that has a dissolved gas content less than normal fluid. The degassed fluid can be used, for example, to generate the high-velocity liquid beam for generating pressure waves, to substantially fill or irrigate a chamber (e.g., the chamber between the fluid retainer and tooth), to provide a propagation medium for acoustic waves, to inhibit formation of air (or gas) bubbles in the chamber (e.g., in small spaces or cracks in or between teeth), and/or to provide flow of the degassed fluid into small spaces in the tooth (e.g., cracks, irregular surfaces, tubules, etc.). In embodiments utilizing a liquid jet, use of a degassed fluid can inhibit bubbles from forming in the jet due to the pressure drop at a nozzle orifice where the liquid jet is formed.

Thus, examples of methods for endodontic treatment comprise flowing a degassed fluid onto a tooth or tooth surface or into a chamber. The degassed fluid can comprise a tissue dissolving agent and/or a decalcifying agent. The degassed fluid can have a dissolved oxygen content less than about 9 mg/L, less than about 7 mg/L, less than about 5 mg/L, less than about 3 mg/L, less than about 1 mg/L, or some other value. A fluid for treatment can comprise a degassed fluid with a dissolved oxygen content less than about 9 mg/L, less than about 7 mg/L, less than about 5 mg/L, less than about 3 mg/L, less than about 1 mg/L, or some other value. The fluid can comprise a tissue dissolving agent and/or a decalcifying agent. For example, the degassed fluid can comprise an aqueous solution of less than about 6% by volume of a tissue dissolving agent and/or less than about 20% by volume of a decalcifying agent.

Although the tooth schematically depicted in some of the figures is a molar, the procedures can be performed on any type of tooth such as an incisor, a canine, a bicuspid, a pre-molar, or a molar. Further, although the tooth may be depicted as a lower (mandibular) tooth in the figures, this is for purposes of illustration, and is not limiting. The systems, methods, and compositions can be applied to lower (mandibular) teeth or upper (maxillary) teeth. Also, the disclosed apparatus and methods are capable of any portions of a tooth. Moreover, the disclosed apparatus, methods, and compositions can be applied to human teeth (including juvenile teeth) and/or to animal teeth.

Reference throughout this specification to "some embodiments" or "an embodiment" means that a particular feature, structure, element, act, or characteristic described in connection with the embodiment is included in at least one embodiment. Thus, appearances of the phrases "in some embodiments" or "in an embodiment" in various places throughout this specification are not necessarily all referring to the same embodiment and may refer to one or more of the same or different embodiments. Furthermore, the particular features, structures, elements, acts, or characteristics may be combined in any suitable manner (including differently than shown or described) in other embodiments. Further, in various embodiments, features, structures, elements, acts, or characteristics can be combined, merged, rearranged, reordered, or left out altogether. Thus, no single feature, structure, element, act, or characteristic or group of features, structures, elements, acts, or characteristics is necessary or required for each embodiment. All possible combinations and subcombinations are intended to fall within the scope of this disclosure.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

The foregoing description sets forth various example embodiments and other illustrative, but non-limiting, embodiments of the inventions disclosed herein. The description provides details regarding combinations, modes, and uses of the disclosed inventions. Other variations, combinations, modifications, equivalents, modes, uses, implementations, and/or applications of the disclosed features and aspects of the embodiments are also within the scope of this disclosure, including those that become apparent to those of skill in the art upon reading this specification. Additionally, certain objects and advantages of the inventions are described herein. It is to be understood that not necessarily all such objects or advantages may be achieved in any particular embodiment. Thus, for example, those skilled in the art will recognize that the inventions may be embodied or carried out in a manner that achieves or optimizes one advantage or group of advantages as taught herein without necessarily achieving other objects or advantages as may be taught or suggested herein. Also, in any method or process disclosed herein, the acts or operations making up the method or process may be performed in any suitable sequence and are not necessarily limited to any particular disclosed sequence.

What is claimed is:

1. A system for treating a tooth having a carious region on an external surface of the tooth, the system comprising:
   a fluid platform having a chamber sized and shaped to retain fluid, the chamber configured to be coupled to and at least partially seal against the external surface of the tooth over the carious region;
   a pressure wave generator configured to generate pressure waves in the retained fluid sufficient to clean the carious region; and
   a vent configured to at least partially regulate pressure of the fluid retained in the chamber;
   wherein the pressure wave generator is configured to produce pressure waves with acoustic power in a broadband acoustic power spectrum that has a bandwidth measured in terms of a 3-decibel bandwidth greater than 1 kHz.

2. The system of claim 1, wherein the fluid platform comprises a cap comprising the chamber, and a seal configured to seal the cap to the tooth.

3. The system of claim 2, wherein the cap is configured to be coupled to at least two adjacent teeth.

4. The system of claim 1, wherein the pressure wave generator comprises a liquid jet device, a laser, a mechanical rotor, an ultrasonic horn, or a piezoelectric oscillator.

5. The system of claim 1, wherein the fluid platform comprises an outlet configured to remove waste fluids from the chamber.

6. The system of claim 1, wherein the fluid platform comprises an inlet configured to deliver fluid to the chamber.

7. The system of claim 1, wherein the broadband acoustic power spectrum comprises multiple frequencies which comprise at least one continuous range of frequencies.

8. The system of claim 1, further comprising a handpiece having a distal end and carrying the pressure wave generator.

9. The system of claim 8, wherein the fluid platform is configured to be coupled to the distal end of the handpiece.

10. The system of claim 1, wherein the broadband acoustic power spectrum has acoustic power in a range of 1 kHz to 1000 kHz.

11. The system of claim 1, wherein the broadband acoustic power spectrum includes acoustic power above 1 MHz.

12. The system of claim 1, further comprising a console, the console comprising a controller configured to control the operation of a treatment procedure.

13. The system of claim 1, wherein the system is configured to supply degassed liquid to the chamber.

14. The system of claim 1, wherein the broadband acoustic power spectrum includes a total amount of the acoustic power, wherein an amount greater than 10% of the total acoustic power is included in the broadband acoustic power spectrum at frequencies greater than 10 kHz, and wherein the total acoustic power is equivalent to the acoustic power integrated over frequencies between 1 Hz and 1000 kHz.

15. The system of claim 1, wherein the broadband acoustic power spectrum includes a total amount of the acoustic power, wherein an amount greater than 25% of the total acoustic power is included in the broadband acoustic power spectrum at frequencies greater than 10 kHz, and wherein the total acoustic power is equivalent to the acoustic power integrated over frequencies between 1 Hz and 1000 kHz.

16. The system of claim 1, wherein the broadband acoustic power spectrum includes a total amount of the acoustic power, wherein an amount greater than 35% of the total acoustic power is included in the broadband acoustic power spectrum at frequencies greater than 1 kHz, and wherein the total acoustic power is equivalent to the acoustic power integrated over frequencies between 1 Hz and 1000 kHz.

17. The system of claim 1, wherein the broadband acoustic power spectrum includes a total amount of the acoustic power, and wherein an amount greater than 50% of the total acoustic power is included in the broadband acoustic power spectrum at frequencies greater than 1 kHz, and wherein the total acoustic power is equivalent to the acoustic power integrated over frequencies between 1 Hz and 1000 kHz.

18. The system of claim 1, wherein the broadband acoustic power spectrum has a bandwidth measured in terms of a 3-decibel bandwidth in a range from 10 kHz to 100 kHz or in a range from 20 kHz to 200 kHz.

19. The system of claim 1, wherein the broadband acoustic power spectrum has a bandwidth measured in terms of a 3-decibel bandwidth greater than about 10 KHz.

* * * * *